(12) United States Patent
Namiki et al.

(10) Patent No.: US 7,228,949 B2
(45) Date of Patent: Jun. 12, 2007

(54) LINEAR DAMPER

(75) Inventors: Shinpei Namiki, Tokyo (JP); Kenji Takahashi, Tokyo (JP)

(73) Assignee: Tok Bearing Co., Ltd., Tokyo (JP)

( * ) Notice: Subject to any disclaimer, the term of this patent is extended or adjusted under 35 U.S.C. 154(b) by 147 days.

(21) Appl. No.: 10/766,630

(22) Filed: Jan. 27, 2004

(65) Prior Publication Data

US 2004/0245060 A1  Dec. 9, 2004

(30) Foreign Application Priority Data

Jan. 29, 2003  (JP) ............................. 2003-019929

(51) Int. Cl.
F16F 11/00 (2006.01)

(52) U.S. Cl. ...................... 188/381; 267/134

(58) Field of Classification Search ............... 188/381; 267/134

See application file for complete search history.

(56) References Cited

U.S. PATENT DOCUMENTS

| | | | | |
|---|---|---|---|---|
| 2,426,661 A * | 9/1947 | Anderson | .................... | 267/134 |
| 2,449,516 A * | 9/1948 | Shakespeare et al. | ......... | 74/503 |
| 2,705,633 A * | 4/1955 | Potter, Jr. et al. | ........... | 267/211 |
| 3,866,724 A * | 2/1975 | Hollnagel | .................... | 188/129 |
| 3,951,238 A * | 4/1976 | Dent et al. | .................. | 188/381 |
| 3,990,542 A * | 11/1976 | Dent et al. | .................... | 188/67 |
| 4,442,870 A * | 4/1984 | Jankovsky | .................... | 139/185 |
| 5,133,435 A * | 7/1992 | Taylor | ........................ | 188/381 |
| 6,615,450 B2 * | 9/2003 | Salice | ............................ | 16/85 |
| 6,672,575 B2 * | 1/2004 | Flower et al. | .............. | 267/205 |
| 2002/0185348 A1 * | 12/2002 | Flower et al. | ......... | 188/322.19 |

* cited by examiner

Primary Examiner—Robert A. Siconolfi
(74) Attorney, Agent, or Firm—Wolf Block Schorr & Solis-Cohen LLP

(57) ABSTRACT

Linear dampers are capable of offering an expected damping force without the use of oil or gas. A casing body 10 has a cylindrical portion 14 and a damping groove 15 continuing with each other and axially extending. The side face of the damping groove 15 are tapering faces 17 between which the space gradually opens up toward the opening of the damping groove 15. A slider 18 constituted of a first moving member 19 and a second moving member 20 is inserted into the casing 10. When the slider 18 is inserted into the casing 10, an inclined face 28 of the second moving member 20 and an inclined face 24 of the first moving member 19 are in contact with each other and tapering faces 29 of the second moving member 20 and the tapering faces 17 are in contact with each other.

10 Claims, 57 Drawing Sheets

Fig. 57 *Prior Art*
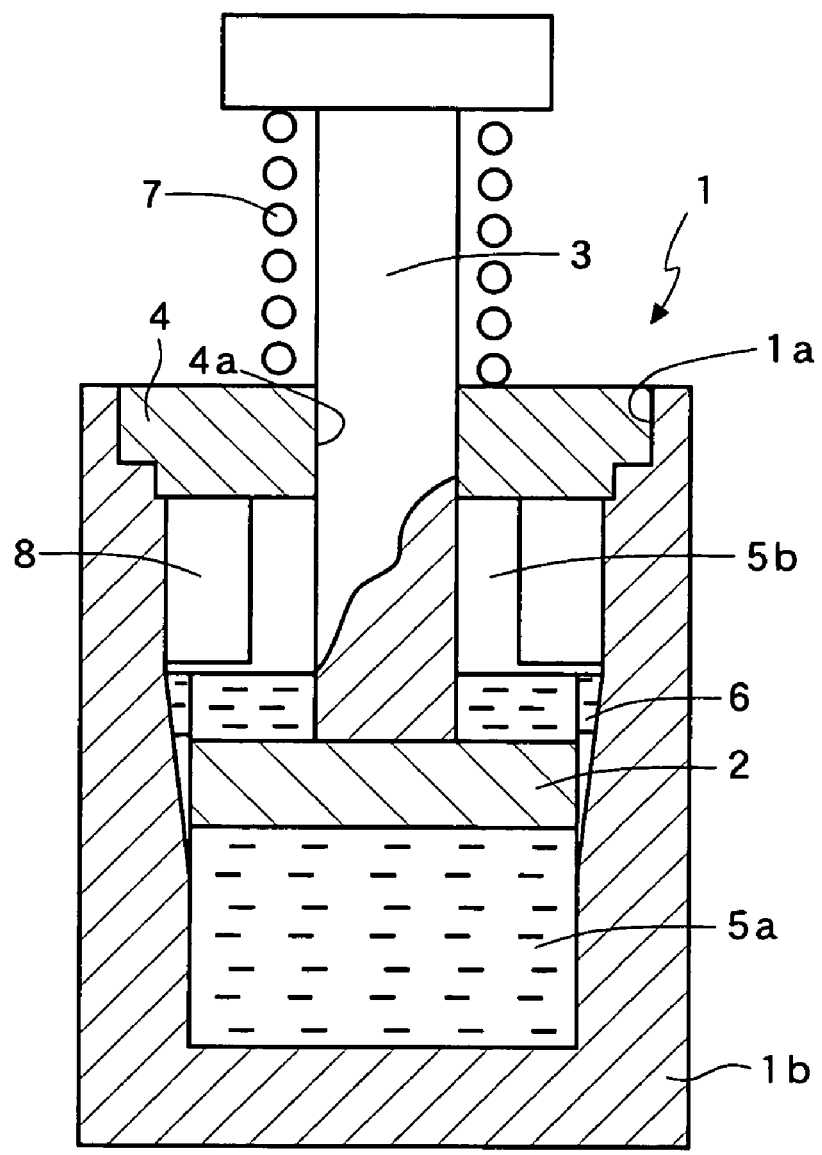

LINEAR DAMPER

BACKGROUND OF THE INVENTION

1. Field of the Invention

This invention relates to a linear damper exerting an effective damping force without the use of fluid.

2. Description of the Related Art

FIG. 57 illustrates a conventionally known linear damper exerting a damping effect on movement in the axial direction.

The conventional linear damper includes a cylindrical-shaped casing 1, a piston 2 sliding in contact with the inner surface of the casing 1, and a rod 3 connected to the piston 2. The casing 1 has an open end 1a and a closed end 1b. The open end 1a is covered with a cap 4 for enclosure.

The piston 2 divides the inside of the enclosed casing 1 into two chambers 5a and 5b which contain viscous fluid.

The casing 1 has a groove 6 formed on the inner peripheral surface thereof. The groove 6 formed serves as a passageway allowing the flow of the viscous fluid along the sliding surface between the casing 1 and the piston 2.

The cap 4 has a rod hole 4a that supports the rod 3 protruding from casing 1 through the cap 4 to the outside.

An external force pushes the rod 3 against the spring force of a spring 7, whereupon the piston 2 moves downward in the casing 1. Upon release of the external force, the spring force of the spring 7 moves the piston 2 upward in the casing 1.

Such a downward movement of the piston 2 causes the viscous fluid to move from the chamber 5a through the groove 6 into the chamber 5b. The resistance of the viscous fluid produced at this point activates the damping effect.

An accumulator 8 is provided in the chamber 5b for absorbing the fluid up to an amount equivalent to the volume of the rod 3.

In the conventional damper described above as an example, because the casing 1 holds viscous fluid, there is a need to seal the area between the rod 3 and the rod hole 4a with a seal member (not shown) for the prevention of leakage of the fluid.

The rod 3 slides inside the rod hole 4a with one end thereof fixed to the piston 2. Therefore, the exacting dimensions of both the rod 3 and the rod hole 4a must be determined with extreme precision for the smooth sliding of the rod 3 in the rod hole 4a.

Such a linear damper is also described in Japanese unexamined patent publication No. 3-277839 (page 2 and FIG. 2).

As described hitherto, the conventional linear damper is an oil damper of which the casing 1 accommodates viscous fluid and the flow resistance of the viscous fluid is used to produce the damping effect. For this reason, oil is absolutely necessary. This brings with it the need to provide a seal member for preventing the leakage of fluid. But however tight the seal is applied, the oil adhering to the rod or the like will inevitably leak to the outside. A complete elimination of oil leakage is virtually impossible in reality. Such characteristics of the oil damper produce the problem of the impossibility of using the oil damper in a situation where the adhesion of the oil to food or the like must be absolutely avoided.

Although the complete elimination of oil leakage is close to impossible in reality, in order to approach a complete elimination as closely as possible, there is a need to increase the precision of the seal structure. In this respect, however, the problem is that the higher the precision of the seal structure, the higher the cost.

If the seal function is to be performed satisfactorily without an increase in the seal precision, an increase in the tightening force of the seal is needed. However, as the tightening force of the seal becomes increased, the friction increases. This in turn causes impairment in the sliding performance of the rod and thus adversely affects the damping effect.

Further, a seal groove is required to hold the seal member, but the formation of the seal groove in itself requires time and effort. This also becomes a factor in increasing the cost.

For the prevention of oil leakage and a reduction in slide resistance to a minimum, moreover, the surface of the rod 3 is required to be finished with a high degree of accuracy, naturally resulting in an increase in the cost. In addition, another problem is that as compared with the machining techniques for resin and the like, metal work requires time and effort, so that the higher the degree of accuracy of machining metal is required, the higher the cost.

Whatever the case, the conventional oil dampers face the inescapable problems of not only a limited use but also a substantial increase in production costs.

On the other hand, an air damper having a cylinder filled with a gas is conventionally known as a damper compensating for the drawback, e.g. the oil leakage, in the oil dampers as described above. However, if the gas leaks, it becomes next to impossible to expect a damping effect from the air damper. In addition, to completely prevent the leakage of a gas composed of extremely small particles is much more difficult than to block the oil leakage.

As a result, though the air damper has no structural problems, the problem is that the air damper becomes functionally unusable due to the gas leakage.

Moreover, due to the high degree of compressibility of the gas or the like, the air damper has the characteristic of response inferior to that of the oil damper.

In other words, the oil damper is capable of having a long life to a certain extent, and promising to offer a strong damping force, but has the problem of the impossibility of being used in a situation where oil leakage is forbidden. The air damper has no problems in respect to oil leakage, but has the problems of a short life and a somewhat inadequate response.

SUMMARY OF THE INVENTION

It is accordingly an object of the present invention to provide a linear damper capable of compensating for the drawbacks of oil dampers and air dampers while directly and effectively adopting the good points of the oil and air dampers, more particularly, a linear damper capable of offering the expected damping force without the use of oil or gas.

In a first feature of the present invention, a linear damper comprises: a casing; a slider inserted into the casing and moving relatively to the casing, and having a working portion; a damping groove provided in one of the casing and the slider, and having tapering faces formed on the side faces thereof and inclined to taper an inner width of the damping groove in one of a depth direction and an opening direction; a damping portion that is provided in the other of the casing and the slider to be fitted into the damping groove with allowance for a sliding movement, and has tapering faces facing the tapering faces of the damping groove; and a conversion mechanism for producing a force pressing the damping portion in a direction tapering the inner width of the damping groove when a force is applied to the working portion to move the slider in the axis direction.

The tapering faces are not necessarily required to be formed on both side faces of the damping groove. The present invention includes the structure of a damping groove having a tapering face formed on only one of the side faces. It is essential only that the space between the side faces of the damping groove is gradually lessened in the depth direction or the opening direction.

In a second feature, the slider includes a first moving member provided with the working portion and a second moving member formed independently of the first moving member and provided with one of the damping groove and the damping portion. The conversion mechanism moves the second moving member in conjunction with a movement of the first moving member in the axis direction, to produce the force pressing the damping portion in the direction tapering the inner width of the damping groove.

In a third feature, the second moving member is provided movably in the depth direction of the damping groove. The conversion mechanism includes inclined faces provided in one of the first and second moving members, and contact portions provided in the other moving member to come into contact with the individual inclined faces. The conversion mechanism exerts a moving force of the first moving member on the second moving member via the inclined faces, so that when the moving force of the first moving member is exerted on the second moving member, the second moving member is moved in the depth direction of the damping groove to press the damping portion in the direction tapering the inner width of the damping groove.

The contact portion in the third feature may be formed by inclining the face coming into contact with the inclined face.

In fourth feature, the linear damper comprises, in addition to the conversion mechanism, a release mechanism that is provided for removing the force pressing the damping portion in the direction tapering the inner width of the damping groove, and that includes inclined faces provided in at least one of the first and second moving members, and contact portions provided in the other moving member to come into contact with the individual inclined faces. The inclined face of the release mechanism is inclined in the same direction as that of the inclined face of the conversion mechanism.

Needless to say, the inclined face of the conversion mechanism and the inclined face of the release mechanism may be designed either parallel to or not parallel to each other. The parallel design for the inclined faces is not necessarily required because the magnitude of a pressing force, the speed of removing the pressing force and the like can be adjusted by adjusting an inclined angle of each inclined face.

The contact portion can be also formed by inclining a contact face of the contact portion.

In a fifth feature, when the first moving member is moved in one of forward and backward directions of the axis of the first moving member, the conversion mechanism moves the second moving member in the depth direction of the damping groove to produce the force pressing the damping portion in the direction tapering the inner width of the damping groove. When the first moving member is moved in the other direction of the forward and backward directions of the axis, the release mechanism removes the force pressing the damping portion in the direction tapering the inner width of the damping groove. The linear damper further comprises a spring for exerting a spring force in a direction removing the pressing force on the first moving member.

In a sixth feature, the second moving members are provided in plural around the first moving member. The inclined face is provided in one of the first and second moving member, and the contact portion is provided in the other moving member to come into contact with the inclined face. The inclined face provided in one of the first and second moving members and the contact portion provided in the other moving member face each other.

In a seventh feature, the slider is integrally formed by combining the working portion and the damping portion or the damping groove. The axis of the working portion is eccentric to the axis of the damping portion or damping groove.

The working portion and the damping portion or damping groove need to be substantially combined with each other, and are not required to be formed in a one-piece form in the strict sense. As long as the working portion and the damping portion or damping groove are capable of integrally moving together, they are not necessary required to be in a one-piece form in the strict sense.

In an eighth feature, the damping groove provided in the casing 10 is shaped in form of a dovetail groove, and the damping portion provided in the slider is fitted into the dovetail groove with allowance for a sliding movement.

In a ninth feature, the working portion of the slider has a shaft portion. The casing has a shaft hole through which the shaft portion passes, and a clearance for allowing the shaft portion to move in a direction opposite to the damping portion.

In a tenth feature, when the slider is moved one of forward and backward directions of the axis of the slider, the conversion mechanism exerts the force pressing the damping portion in the direction tapering the inner width of the damping groove. The spring exerts a spring force in a direction returning the damping portion to a normal position on the damping portion.

According to the first to tenth features, it is possible to exert a damping effect by use of the damping portion and the damping groove. Thus, the linear damper is operated without viscous fluid used in conventional oil dampers. Hence, the linear damper is capable of being used in a place where use of oil is undesirable, for example, in a place where food is handled. This makes it possible to extend the boundaries of environmental condition for use of dampers. There is no need of oil or air, and naturally no leak of oil or air. Hence a seal member for preventing the oil or air leakage is unnecessary, leading to cost reduction. Further, because of no use of the sealing member, it is possible to avoid damper effect degradation caused by an adverse effect of the tightening force of the seal.

Because a damping force is produced by pressing the damping portion against the damping groove, it is possible to provide a damper of further high response as compared with the case of using a gas of high compression, such as an air damper.

According to the fifth embodiment, the release mechanism is provided for removing a fore pressing the damping portion in the direction tapering the inner width of the damping groove. The spring for exerting the spring force in the direction removing the pressing force is provided in the first moving member. As a result, it is possible to quickly return the first moving member to the normal position.

BRIEF DESCRIPTION OF THE DRAWINGS

FIG. 57 is a diagram showing a conventional damper.

DETAILED DESCRIPTION OF THE PREFERRED EMBODIMENTS

FIG. 1 to FIG. 6 illustrate a first embodiment according to the present invention.

Figure 1:
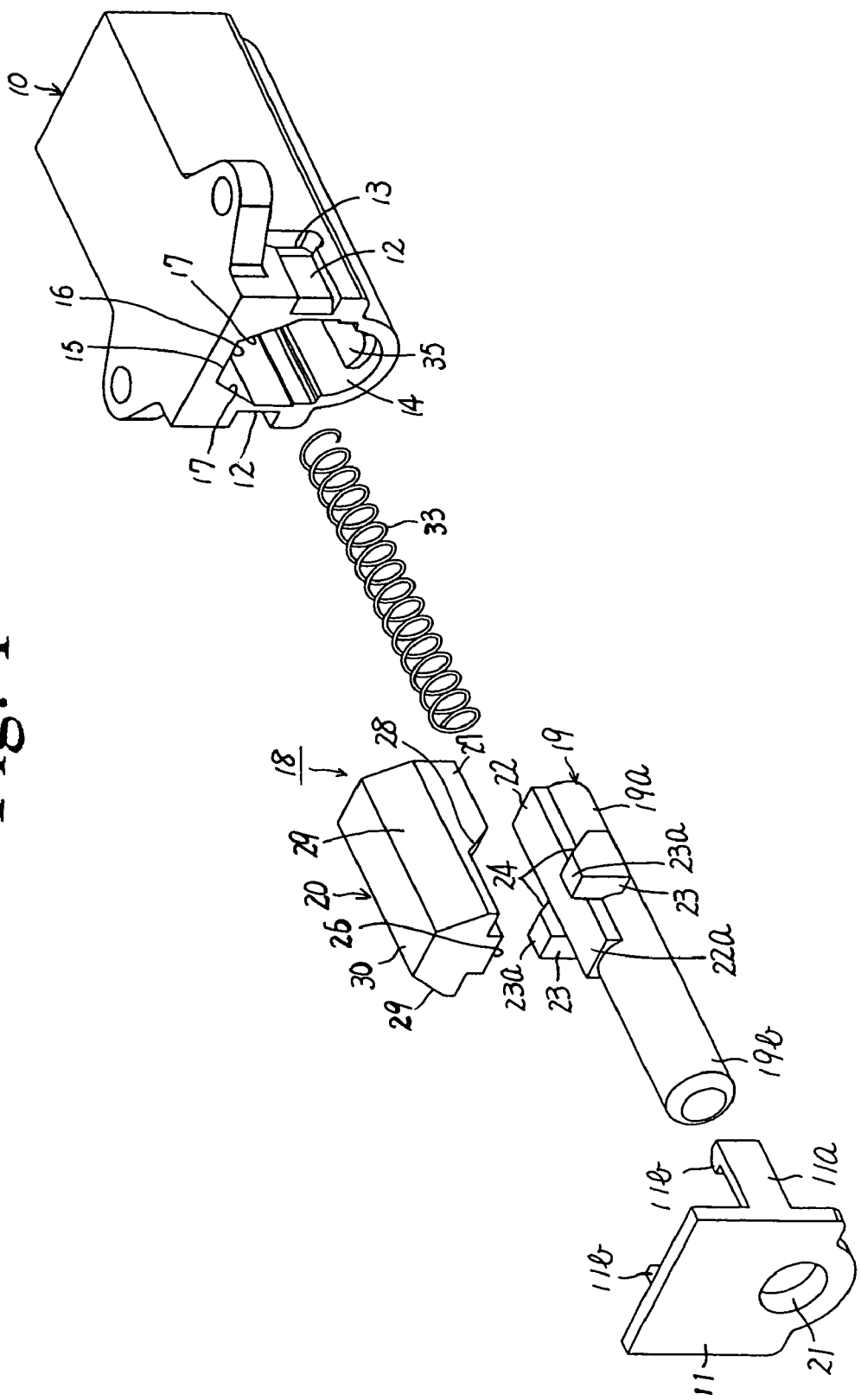
FIG. 1 is an exploded view of a first embodiment.

As shown in FIG. 1, a casing according to the present invention is constituted of a cylindrical-shaped casing body 10 and a cap 11. The casing body 10 has a closed end and an open end having an opening closed with the cap 11.

The cap 11 forming part of the casing has a pair of hooks 11a extending from the side faces of the cap 11. A pallet 11b is formed at the leading end of each hook 11a.

The casing body 10, correspondingly, has a pair of grooves 12 formed in both sides of the opening thereof. Each hook 11a snugly fits into the corresponding groove 12 when the cap 11 is fitted on the casing body 10. The groove 12 has an engaging recess 13 formed therein for receiving the pallet 11b when the hook 11a is snugly fitted into the groove 12. The pallets 11b of the hooks 11a are individually fitted into the engaging recesses 13 in this manner in order to prevent the cap 11 from disjoining from the opening of the casing body 10.

As is clear from FIG. 1, the casing body 10 has a cylindrical portion 14 and a damping groove 15 formed inside in the axial direction. The cylindrical portion 14 and the damping groove 15 have axes extending parallel to each other but the axis of the damping groove 15 is eccentric with respect to the cylindrical portion 14. The cylindrical portion 14 and the damping groove 15 are connected continuously to each other in the vertical direction.

The cylindrical portion 14 has an arc-shaped inner bottom portion formed opposite the damping groove 15. The damping groove 15 has a flat ceiling face 16 opposing the cylindrical portion 14. The side faces of the damping groove 15 are formed as two tapering faces 17 between which the space opens up gradually toward the cylindrical portion 14, i.e. the opening of the damping groove 15. In other words, the damping groove 15 tapers toward the ceiling face 16 to form a trapezoid in section.

A slider 18 is inserted into the aforementioned casing body 10 with allowance for a sliding movement therein. The slider 18 includes a first moving member 19 and a second moving member 20.

Figure 3:
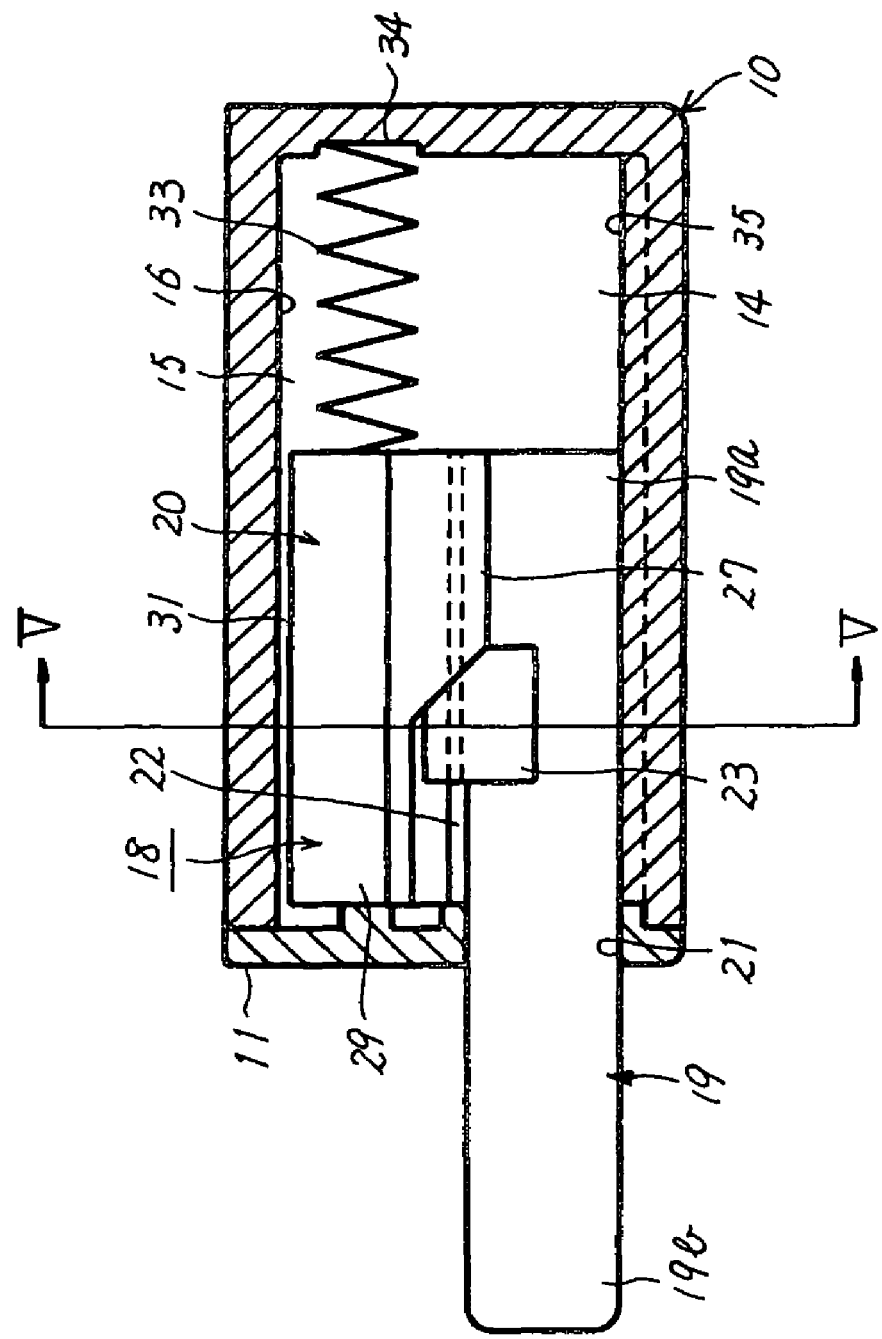
FIG. 3 is a partial sectional view of the first embodiment.
Figure 4:
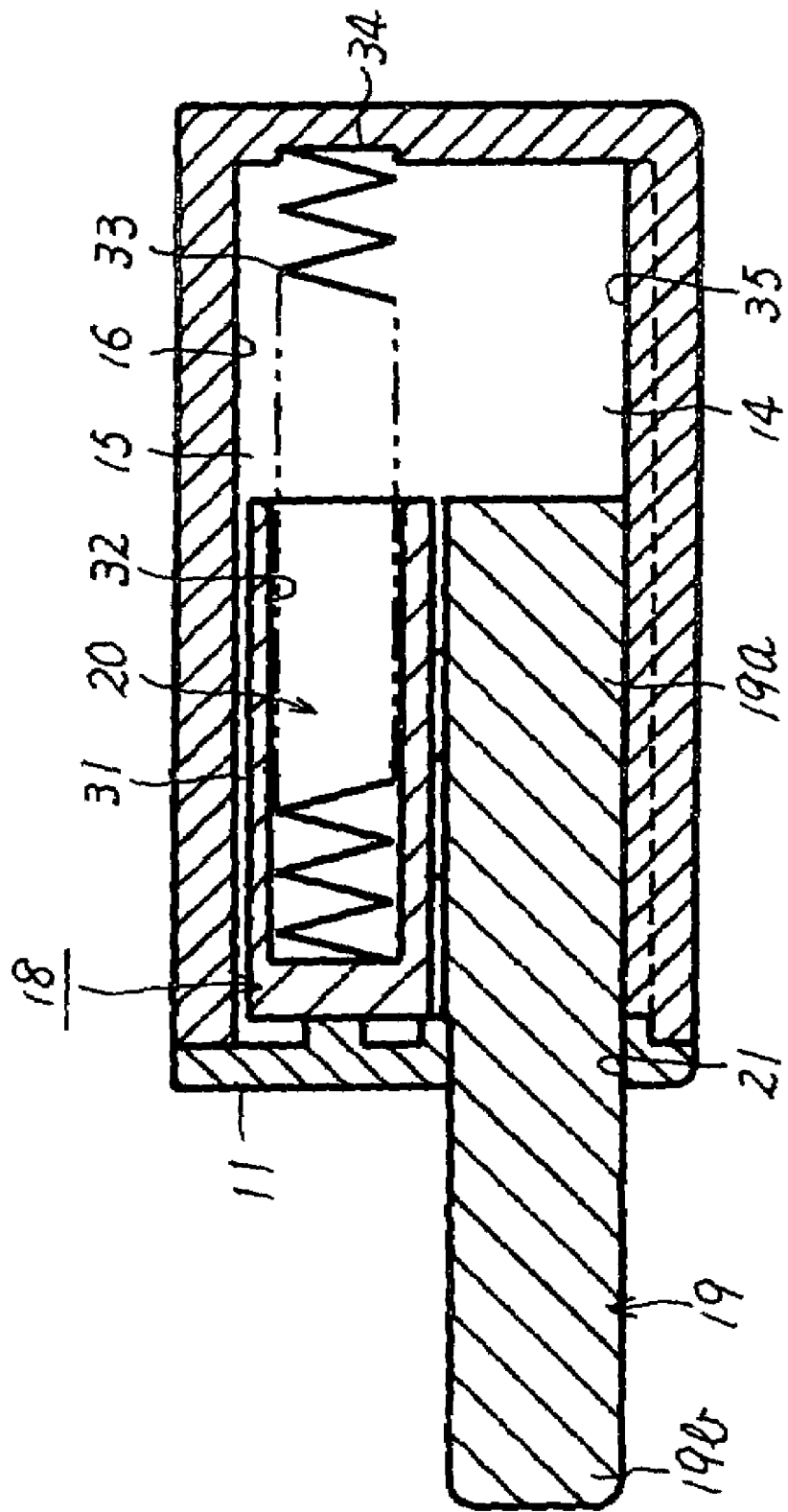
FIG. 4 is a sectional view through section IV-IV of FIG. 5.

The first moving member 19 has a coupling portion 19a and a working portion 19b acted upon by a force. The coupling portion 19a and the working portion 19b are integrally formed of a single shaft and naturally use the same axis. The working portion 19b protrudes toward the outside from a shaft hole 21 formed in the cap 11 as shown in FIGS. 3 and 4 when the first moving member 19 is incorporated in the casing body 10.

Further, as shown in FIG. 1, a raised plate-shaped portion 22 extends along the axis on the coupling portion 19a, and has a flat sliding face 22a formed thereon. The raised plate-shaped portion 22 further has paired projecting portions 23 formed individually on opposite sides thereof. Tops 23a of the projecting portions 23 are on a higher level than the sliding face 22a, that is, the tops 23a protrude toward the second moving member 20. An inclined face 24 is formed on each of the projecting portions 23. The inclined face 24 continues from each of the tops 23a and is gradually inclined down therefrom toward the end of the coupling portion 19a.

Figure 2:
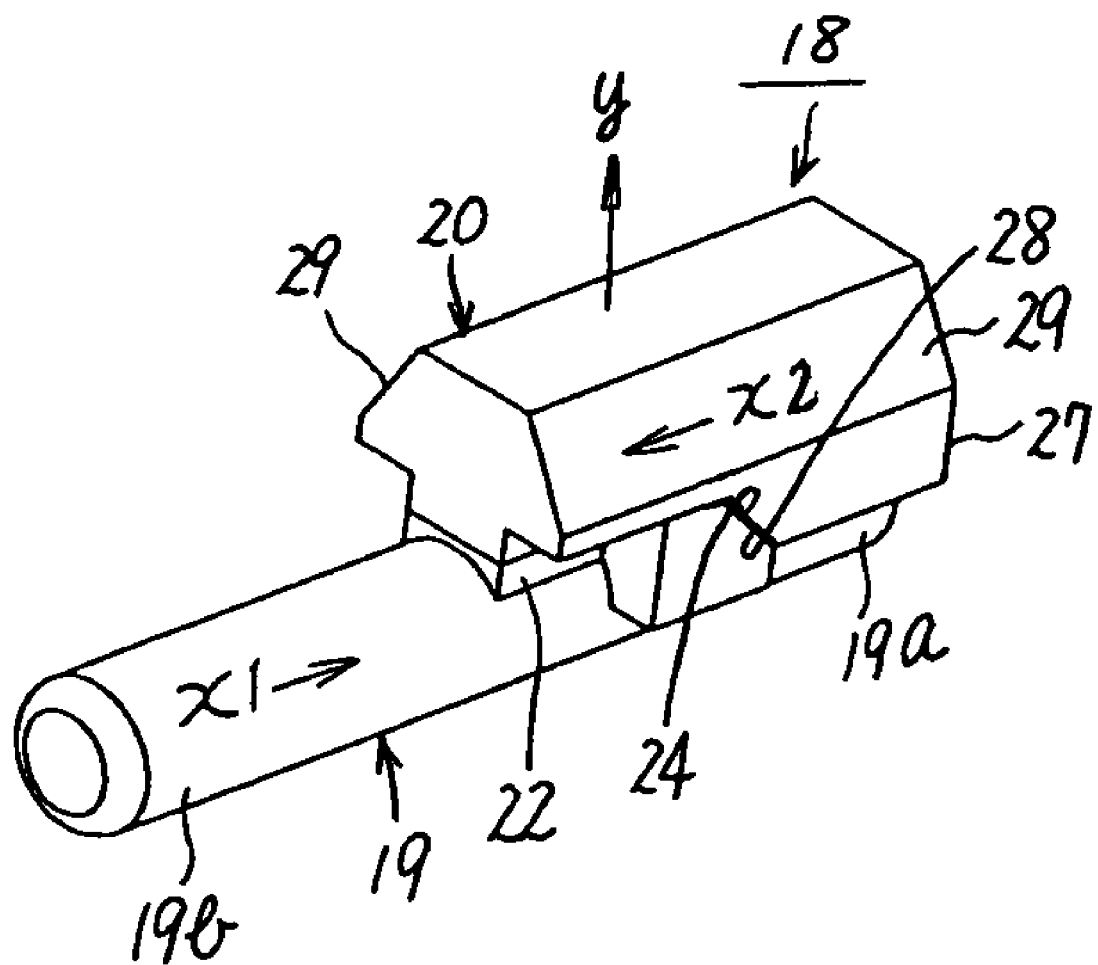
FIG. 2 is a perspective view of a slider of the first embodiment.
Figure 6:
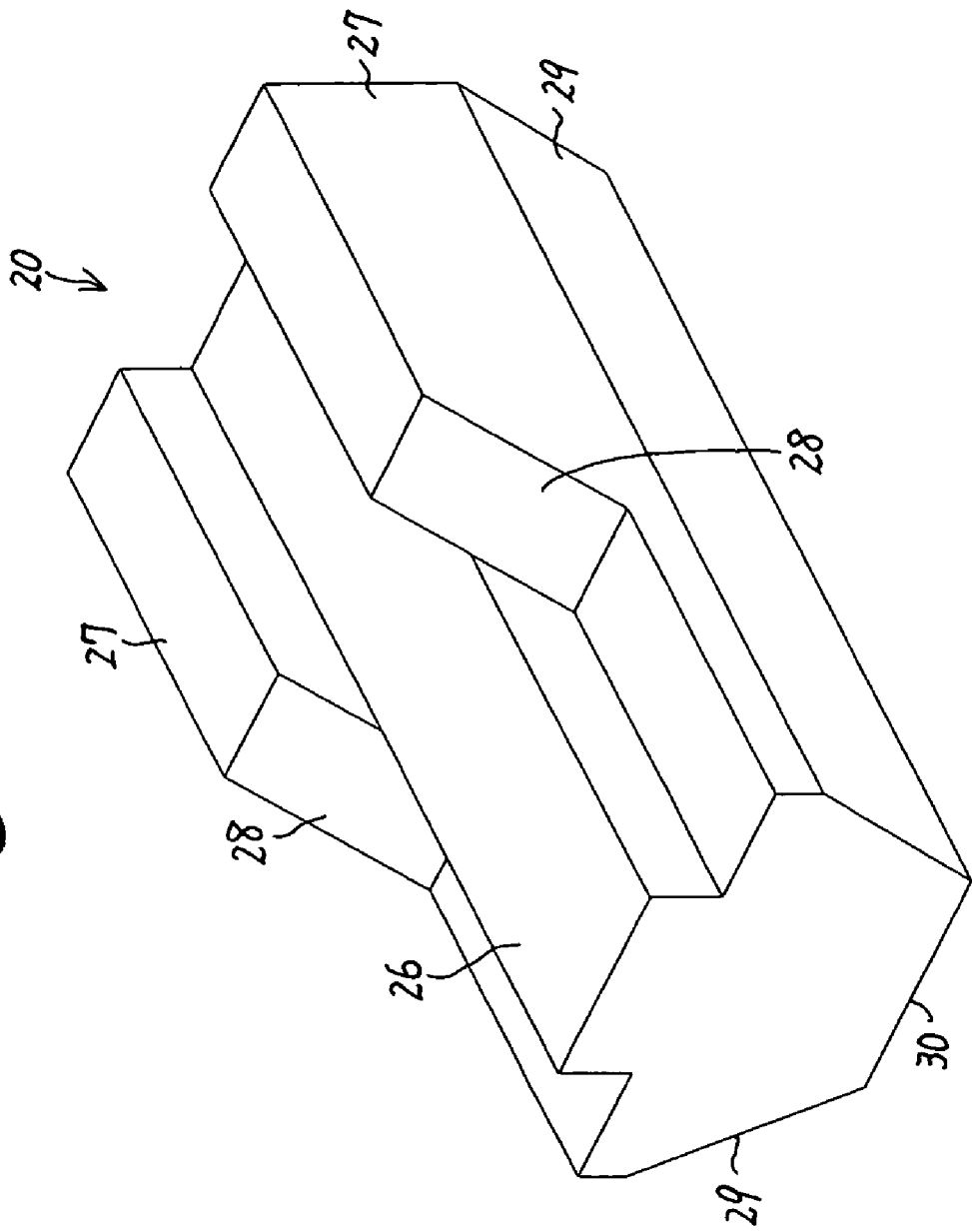
FIG. 6 is a perspective view of a second moving member of the first embodiment when viewed from the back of FIG. 1.

As shown in FIG. 6, the second moving member 20 has a sliding face 26. The width of the sliding face 26 is equal to that of the sliding face 22a of the first moving member 19. Paired guiding portions 27 protrude individually adjacent to the sides of the sliding face 26. The space between the paired guiding portions 27 is approximately equal to the width of the raised plate-shaped portion 22 of the first moving member 19. In other words, as shown in FIG. 2, when the first and second moving members 19 and 20 are laid over each other with exact alignment between the sliding faces 22a and 26, the raised plate-shaped portion 22 is fitted between the guiding portions 27 with allowance for the sliding movement. Hence, during the relative movement of the first and second moving members 19 and 20, the positional relationship between the moving members 19 and 20 is maintained. Put another way, when the first and second moving members 19 and 20 are moved relatively, the axes of the moving members 19 and 20 are not displaced in the width direction of the sliding face 22a and the sliding face 26.

Each of the guiding portions 27 has an inclined face 28 formed to face the corresponding inclined face 24 formed on the first moving member 19 when the first and second moving members 19 and 20 are laid over each other, in which case the inclined faces 24 and 28 are allowed to come into a face-to-face contact with each other. Hence, the first moving member 19 is acted upon by a force in the direction indicated by the arrow x1 (hereinafter referred to as "the direction x1") as shown in FIG. 2 and the second moving member 20 is acted upon by a force in the direction indicated by the arrow x2 (hereinafter referred to as "the direction x2"). Thereupon, the inclined faces 24 and 28 of the respective moving members 19 and 20 are acted upon by a force component in the vertical direction (hereinafter referred to as "vertical force component") and a force component in the horizontal direction (hereinafter referred to as "horizontal force component"). This vertical force component results in a force y in the direction separating the moving members 19 and 20 from each other (see FIG. 2).

Figure 5:
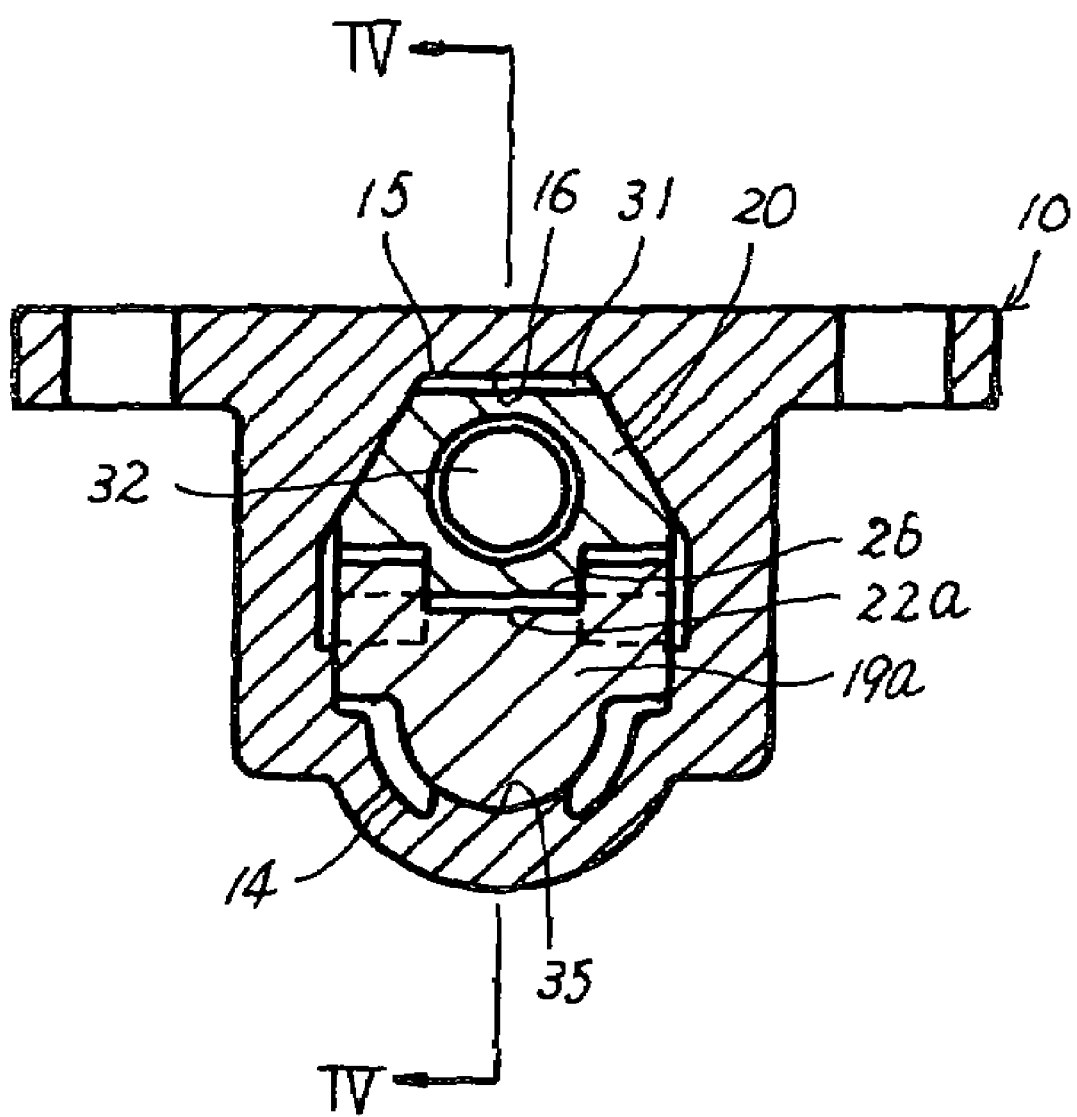
FIG. 5 is a sectional view through section V-V of FIG. 3.

The second moving member 20 further has tapering faces 29 respectively facing the tapering faces 17 formed on the casing body 10, and an opposing face 30 facing the ceiling face 16 formed in the casing body 10. That is, the second moving member 20 is shaped in a trapezoidal section corresponding to that of the damping groove 15, and yet when the second moving member 20 is fitted into the damping groove 15, a slight space 31 is formed between the ceiling face 16 and the opposing face 30 as shown in FIG. 5. Hence, the force y acts in the state where the space 31 is created, whereupon the second moving member 20 is engaged more strongly in the damping groove 15 to further increase the frictional force between the tapering faces 29 of the second moving member 20 and the tapering faces 17 of the damping groove 15. The tapering faces 29 and the opposing face 30 designed as described above form the damping portion of the present invention.

As shown in FIGS. 3 and 4, the second moving member 20 has a spring-receiving hole 32 formed therein along the axis thereof to receive a spring 33. An end of the spring 33 fitted into the spring-receiving hole 32 is aligned with a recess 34 formed in the closed end of the casing body 10 in order to allow for the action of an initial load pressing the second moving member 20 toward the cap 11.

On the other hand, in the casing body 10, the arc-shaped lower portion of the cylindrical portion 14 is provided with a supporter 35 formed in an arc shape of the same curvature as those of the coupling portion 19a and the working portion 19b of the first moving member 19. The coupling portion 19a and the working portion 19b are placed on the supporter 35, so that the contact area between the casing body 10 and the first moving member 19 is reduced to decrease the slide resistance between them.

To fit the first moving member 19 and the second moving member 20 into the casing body 10 as described above, the first and second moving members 19 and 20 are combined (see FIG. 2) under the conditions of the alignment between the sliding faces 22a and 26 of the respective moving members 19 and 20 and the face-to-face contact between the inclined faces 24 and 28 of the respective moving members 19 and 20. This combination of the moving members 19 and 20 constitutes the slider 18 of the present invention.

In such a slider 18, the spring 33 is pre-installed in the spring-receiving hole 32 formed in the second moving member 20.

Then, the slider 18 is housed in the casing body 10: the coupling portion 19a and the working portion 19b of the first moving member 19 of the slider 18 are inserted into the cylindrical portion 14 of the casing body 10, and the second moving member 20 with the extending spring 33 preinstalled in the spring-receiving hole 32 is fitted in the damping groove 15 of the casing body 10.

After the slider 18 has been inserted into the casing body 10, the casing body 10 is closed by the cap 11. At this point, the working portion 19b protrudes from the shaft hole 21 of the cap 11, and the pallets 11b of the hooks 11a are engaged with the engaging recesses 13. In the normal position illustrated in FIG. 3, an end of the raised plate-shaped portion 22 is in contact with the cap 11 to prevent the first moving member 19 from separating from the casing body 10.

With the insertion of the slider 18 into the casing body 10 in this way, the spring force of the spring 33 fitted in the second moving member 20 is allowed to act on the second moving member 20 as the force in the direction x2. The force acting on the second moving member 20 acts also on the first moving member 19 as described earlier. Therefore, the first moving member 19 and the second moving member 20 are maintained in the normal position, illustrated in FIGS. 3 and 4, by the action of the spring force of the spring 33. In the normal position, the second moving member 20 is in contact with the cap 11 and the working portion 19b protrudes to the outside from the shaft hole 21 formed in the cap 11.

The reason why the spring-receiving hole 32 is formed in the second moving member 20 is in order for both the first moving member 19 and the second moving member 20 to return to the normal state. That is, if the spring-receiving hole 32 is formed in the first moving member 19 to exert the spring force of the spring on the first moving member 19, the first moving member 19 will be able to return to its normal state by the spring force, but the second moving member 20 will be left in the moved position.

The following is the relative relationship between the casing body 10 and the components of the slider 18 when the slider 18 is inserted into the casing body 10 as described above.

When the slider 18 is incorporated in the casing body 10 in the foregoing manner, in the positional relationship illustrated in FIG. 3, the inclined faces 28 of the second moving member 20 are in contact with the inclined faces 24 formed on the first moving member 19, and the tapering faces 29 of the second moving member 20 are in contact with the tapering faces 17 formed on the casing body 10.

The second moving member 20 is fitted into the damping groove 15 of the casing body 10, and the tapering faces 29 and the tapering faces 17 are in contact with each other. In this condition, the space 31 as shown in FIGS. 3 to 5 is created between the ceiling face 16 formed in the damping groove 15 and the opposing face 30 formed on the second moving member 20 as described earlier. Because the space 31 is created, the second moving member 20 is capable of moving in the depth direction of the damping groove 15.

Further, the supporter 35 is formed in the bottom portion of the cylindrical portion 14, and has the same curvature as those of the coupling portion 19a and the working portion 19b. For this reason, the coupling portion 19a and the working portion 19b are able to slide while being supported by the supporter 35.

Next, the operation in the first embodiment will be described.

In the normal position illustrated in FIG. 3, the force in the direction x1 acts on the working portion 19b, whereupon the entire first moving member 19 moves in the direction x1 which is the direction of the force. Upon the movement of the first moving member 19, this moving force is transferred via the inclined faces 24 and 28 to the second moving member 20. The second moving member 20 moves against the spring force of the spring 33. Thus, the second moving member 20 is acted upon by the force in the direction x1 which is the moving force of the first moving member 19 and the force in the direction x2 which is the spring force of the spring 33.

However, the force in the direction x1 and the force in the direction x2 are opposite to each other, so that between the inclined face 24 and the inclined face 28, a vertical force component and a horizontal force component come into action. When the vertical force component thus acts on the second moving member 20, the second moving member 20 is pressed toward the damping groove 15 of the casing body 10. This is because the first moving member 19 is supported on the supporter 35 so as to be incapable of further moving in a direction at right angles to the axis.

The action of the force pushing up the second moving member 20 toward the damping groove 15 results in the fact that the second moving member 20 particularly presses the tapering faces 29 thereof into the tapering faces 17 of the damping groove 15 on the same principle as in the case of driving in a wedge. The pressing force thus produced results in a slide resistance on the part of the second moving member 20. This slide resistance on the part of the second moving member 20 is exerted also on the first moving member 19 as slide resistance. Hence, the slide resistance thus produced serves as a braking force to exert a damping effect.

Note that this damping force varies with the magnitude of the force acting on the first moving member 19 and the moving speed. Specifically, with a large force and a high moving speed, the second moving member 20 is strongly pressed against the damping groove 15 in one stroke. Thus a large braking force, i.e., a damping force is exerted at a fast pace. On the other hand, when the force acting on the first moving member 19 is small and the moving speed is slow, the second moving member 20 is gradually pressed against the damping groove 15 at a slow pace. Thus a braking force, i.e., a damping force gradually increases in accordance with the stroke.

The fact that the conditions of exerting the damping force vary with the moving speed and the magnitude of the force as described above means that it is possible to provide an appropriate damping force at all times according to the use of the linear damper or the circumstances of use.

After the slider 18 has moved inside the casing body 10 while exerting the damper effect, the force acting on the working portion 19b decreases so as to be lower than the spring force of the spring 33. Thereupon, the spring force of the spring 33 moves the second moving member 20 and the first moving member 19 in the direction of returning to the normal position illustrated in FIGS. 3 and 4. At this point, since a vertical force component and a horizontal force component are exerted between the inclined faces 24 and 28, the braking force is also exerted when the moving members return. However, at this point, the slider 18 is returned to the normal position only by the spring force of the spring 33, and therefore the moving force and the moving speed are dependent on the spring force of the spring 33. Hence, changing the spring constant of the spring 33 makes it possible to freely set the returning speed.

In this manner, it is possible to freely determine the returning speed of the slider 18 by use of the spring force of the spring 33. However, since the spring force of the spring 33 has an effect on the damping force exerted by the braking force on the slider 18, the spring force of the spring 33 for setting the returning speed of the slider 18 is naturally determined in consideration of the relative relationship with the required damping force.

When assembling the linear damper according to the first embodiment designed as described above, the inner surface of the casing body 10 may be coated with grease to allow the slider 18 to slide to a certain extent. For example, when the slider 18 is inserted into the casing body 10 without application of grease, the friction between the slider 18 and the casing body 10 becomes too high to allow the sliding movement of the slider 18. In this case, grease may be used as desired to allow the slider 18 to slide to a certain extent. However, whether or not grease is used or the extent to which grease is applied depends on the materials of the casing body 10 and the slider 18, the magnitude of the force, and the like.

According to the first embodiment, the linear damper is capable of being operated without having to use a viscous fluid such as is used in the conventional oil damper, and therefore being used in a place where use of oil is undesirable, for example, in a place where food is handled.

Further, the conventional use of the air dampers and the oil dampers involves the risks of gas leakage and oil leakage. However, the first embodiment is carried out without using air or oil, and has no risk of its leaking. Accordingly, the linear damper has no need of a sealing member for preventing leakage, resulting in a reduction in costs.

Further, operation without the use of any sealing member makes it possible to avoid the adverse effect of the damper effect being decreased by the tightening force of the seal. Moreover, due to the non-occurrence of gas or oil leakage, there is no problem of the damping effect being decreased by gas or oil leakage.

Still further, the present invention eliminates the need of a machining process involving an extremely fine tolerance for preventing the gas or oil leakage, making it possible to further reduce the costs.

In the first embodiment, the braking force is produced by pressing the damping portion against the damping groove. Thus, the compressibility of the gas such as in the air dampers is insignificant, leading to an improvement in response.

That is to say, the linear damper in the first embodiment according to the present invention is the first of its type, i.e. a newly-developed damper, operated without the use of either oil or gas, and moreover capable of ensuring the expected damping force, which represents a milestone.

Figure 7:
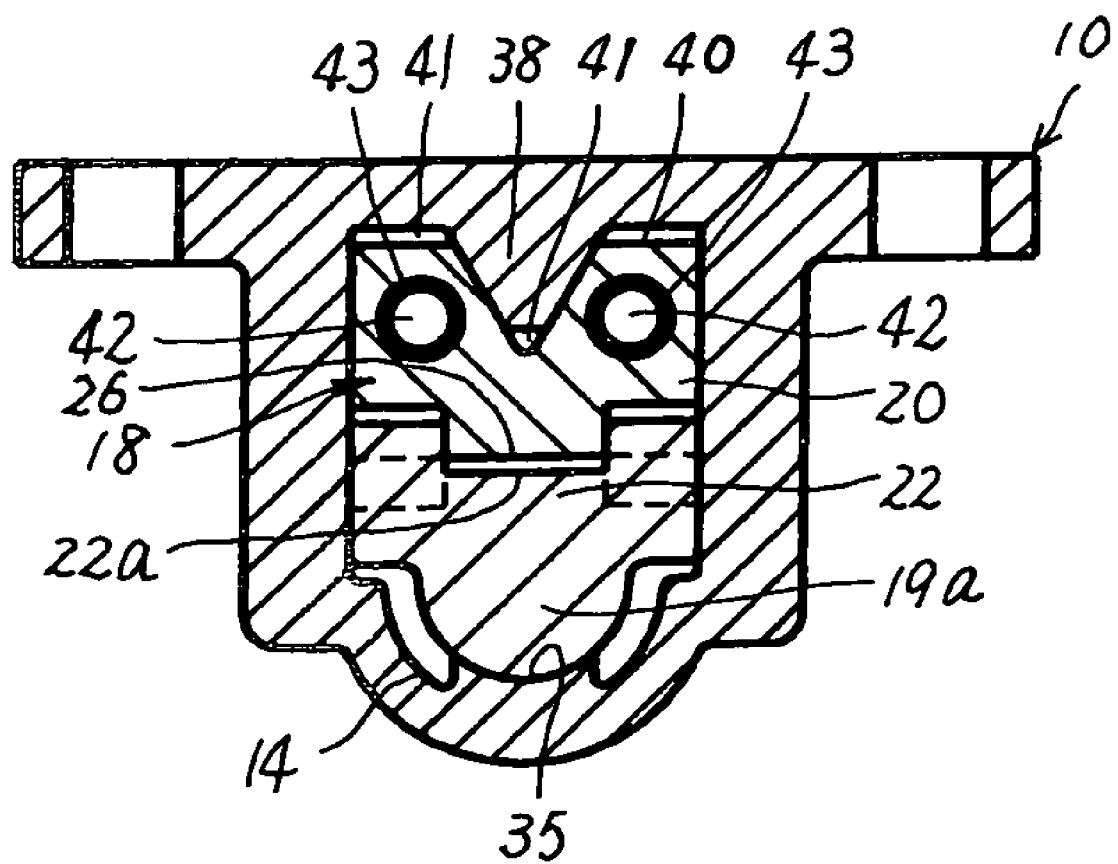
FIG. 7 is a sectional view of a second embodiment.
Figure 8:
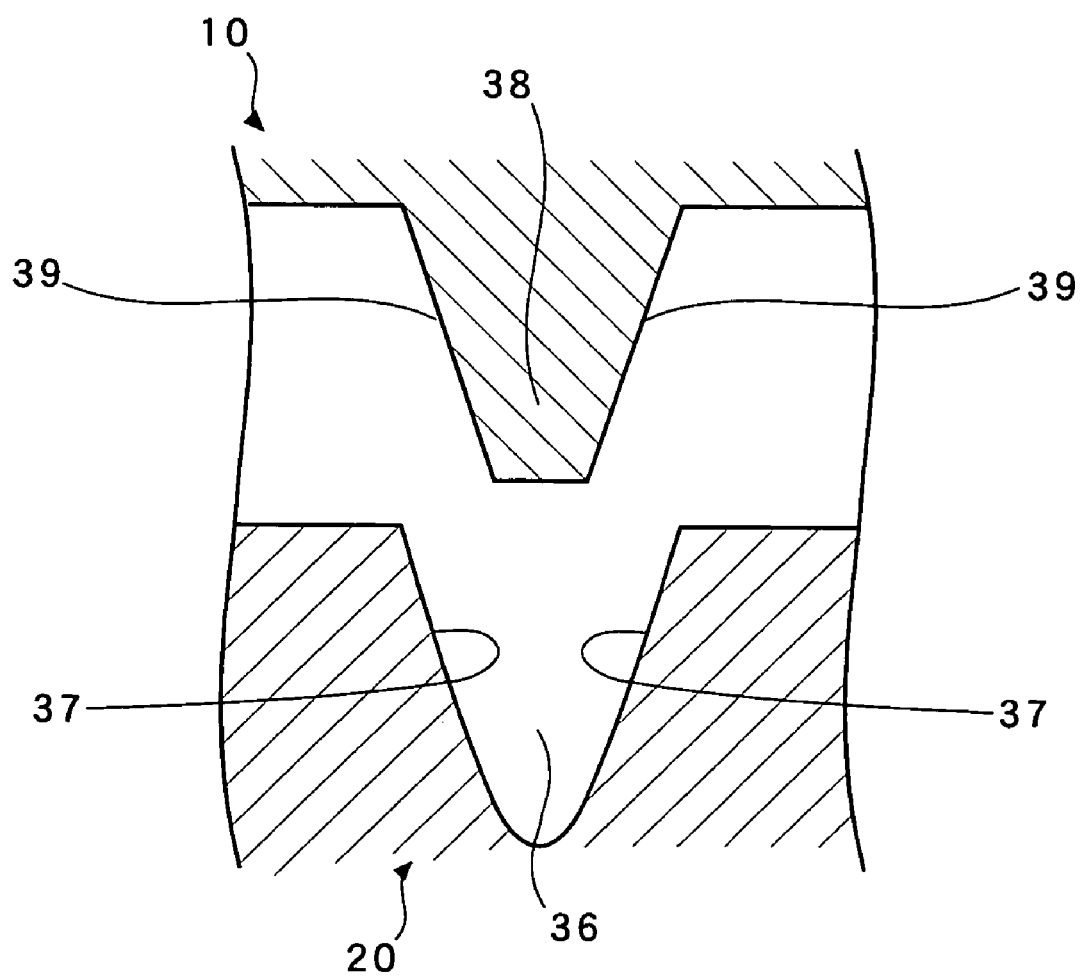
FIG. 8 is a diagram illustrating a damping portion and a damping groove of the second embodiment.

In the first embodiment, the damping groove 15 is provided in the casing body 10 and the damping portion is provided in the slider 18. However, a damping portion may be provided in the casing body 10 and a damping groove may be provided in the slider 18. FIGS. 7 and 8 illustrate a second embodiment of the present invention in which the damping portion is provided in the casing body 10 and the damping groove 15 is provided in the slider 18. The second embodiment has a V-shaped damping groove 36 formed in the second moving member 20 and tapering faces 37 provided on both sides of the damping groove 36. The tapering faces 37 diverge so that the space formed between them flares toward the opening of the damping groove 36 to form a V-shaped section of the damping groove 36 as described above.

In turn, the casing body 10 has a damping portion 38 formed therein in a projected shape corresponding to the damping groove 36. Accordingly, the damping portion 38 has tapering faces 39 corresponding to the tapering faces 37 of the damping groove 36. The second embodiment also forms a space 41 between the top of the damping portion 38 and the bottom of the damping groove 36, and a space 40 between the second moving member 20 and the casing body 10. Hence, when the second moving member 20 is pressed against the damping portion, in relative terms, the damping portion 38 formed in the projected shape is pressed into the damping groove 36.

Apart from the foregoing, the structure of the second embodiment is the same as that of the first embodiment. The same components as those in the first embodiment are described with use of the same reference numerals. Specifically, the slider 18 includes the first moving member 19 and the second moving member 20. The first moving member 19 includes the coupling portion 19*a* and the working portion 19*b*. The coupling portion 19*a* is provided with the raised plate-shaped portion 22, paired projecting portions 23 formed individually adjacent to the sides of the raised plate-shaped portion 22, and the inclined faces 24 formed on the respective projecting portions 23. Further, the second moving member 20 has the guiding portions 27 formed on opposite sides of the sliding face 26, and the inclined faces 28 formed on the respective guiding portions 27. However, the second embodiment differs from the first embodiment in the spring which to be fitted in the second moving member 20. Two springs 43 are provided individually in two spring-receiving holes 42 formed in the second moving member 20 with the damping groove 36 in between.

The first and second moving members 19 and 20 so designed are combined with each other and inserted into the casing body 10 in the same manner as in the first embodiment. Specifically, the slider 18 is inserted into the casing body 10 with the coupling portion 19*a* and the working portion 19*b* placed on the supporter 35. Then the opening of the casing body 10 is closed with the cap 11. The working portion 19*b* projects from the shaft hole 21 of the cap 11. When the slider 18 is in the normal position, the raised plate-shaped portion 22 is in contact with the cap to prevent the first moving member 19 from separating from the casing body 10.

At this point, the first moving member 19 is acted upon by a force in the direction x1 as in the case of the first embodiment, whereupon the vertical force component acting on the inclined faces 24 and 28 presses the second moving member 20 upward in FIG. 7 to increase the slide resistance between the tapering faces 37 and the tapering faces 39. This slide resistance in the second moving member 20 is also exerted as a slide resistance on the first moving member 19. In consequence, this slide resistance results in a braking force, so that a damping force is exerted.

In both the first and second embodiments, both the side faces inside the damping groove are formed as tapering faces, but it is possible for just one of the side faces to be formed as a tapering face. In other words, what is required is for the space between the opposed inner side faces of the damping groove to be gradually tapered in the depth direction or the opening direction of the damping groove. It is essential that the structure be capable of exerting a wedge effect when the damping portion is pressed into the damping groove. However, in this case, the shape of the damping portion must correspond to the shape of the damping groove.

Further, in the first and second embodiments the inclined faces 24 and 28 are formed individually on the first moving member 19 and the second moving member 20, to come into contact with each other. However, the inclined face may be on only one of the first and second moving members. If an inclined face is formed on one of the first and second moving members, the face of the other moving member to come into contact with the inclined face may be an angled face or an arc face. That is, as long as the structure has the capability of producing the vertical force component with respect to the inclined face, forming an inclined face on only one of the moving members 19 and 20 is sufficient. The other moving member may simply include a contact portion having the function of making contact with one moving member. It is needless to say that the formation of the inclined faces on both moving members 19 and 20 allows for stable movement of the moving members 19 and 20.

As a natural result, it is possible for the second embodiment to yield the same effects as those in the first embodiment.

FIG. 9 to FIG. 16 illustrate a third embodiment according to the present invention.

Figure 9:
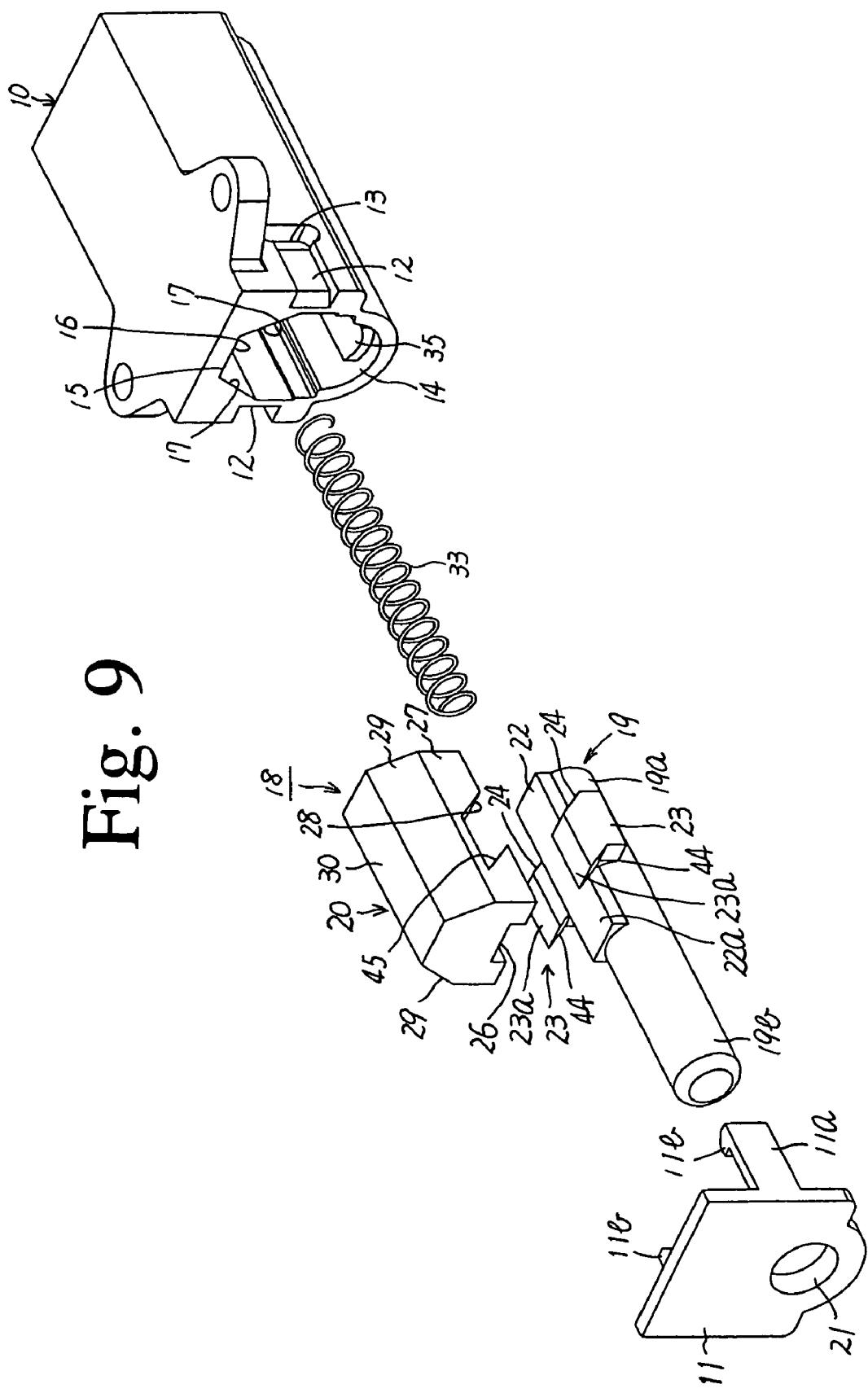
FIG. 9 is an exploded view of a third embodiment.

As shown in FIG. 9, a casing according to the present invention is constituted of a cylindrical-shaped casing body 10 and a cap 11. The casing body 10 has a closed end and an open end having an opening closed with the cap 11.

The cap 11 forming part of the casing has a pair of hooks 11a extending from the side faces of the cap 11. A pallet 11b is formed at the leading end of each hook 11a. Correspondingly, the casing body 10 has a pair of grooves 12 formed on both sides of the opening thereof. Each of the hooks 11a snugly fits into the corresponding groove 12 when the cap 11 is fitted on the casing body 10. The groove 12 has an engaging recess 13 formed therein for receiving the pallet 11b when the hook 11a is snugly fitted into the groove 12. The pallets 11b of the hooks 11a are respectively fitted into the engaging recesses 13 in this manner in order to prevent the cap 11 from disjoining from the opening of the casing body 10.

As is clear from FIG. 9, the casing body 10 has a cylindrical portion 14 and a damping groove 15 formed inside in the axial direction. The cylindrical portion 14 and the damping groove 15 have the axes extending parallel to each other but the axis of the damping groove 15 is eccentric with respect to the cylindrical portion 14. The cylindrical portion 14 and the damping groove 15 are connected continuously to each other in the vertical direction.

The cylindrical portion 14 has an arc-shaped inner bottom portion formed opposite the damping groove 15. The damping groove 15 has a flat ceiling face 16 opposing the cylindrical portion 14. The side faces of the damping groove 15 are formed as two tapering faces 17 between which the space opens up gradually toward the cylindrical portion 14, i.e. the opening of the damping groove 15. In other words, the damping groove 15 tapers toward the ceiling face 16 to form a trapezoid in section.

A slider 18 is inserted into the casing body 10 with allowance for the sliding movement. The slider 18 includes a first moving member 19 and a second moving member 20.

Figure 10:
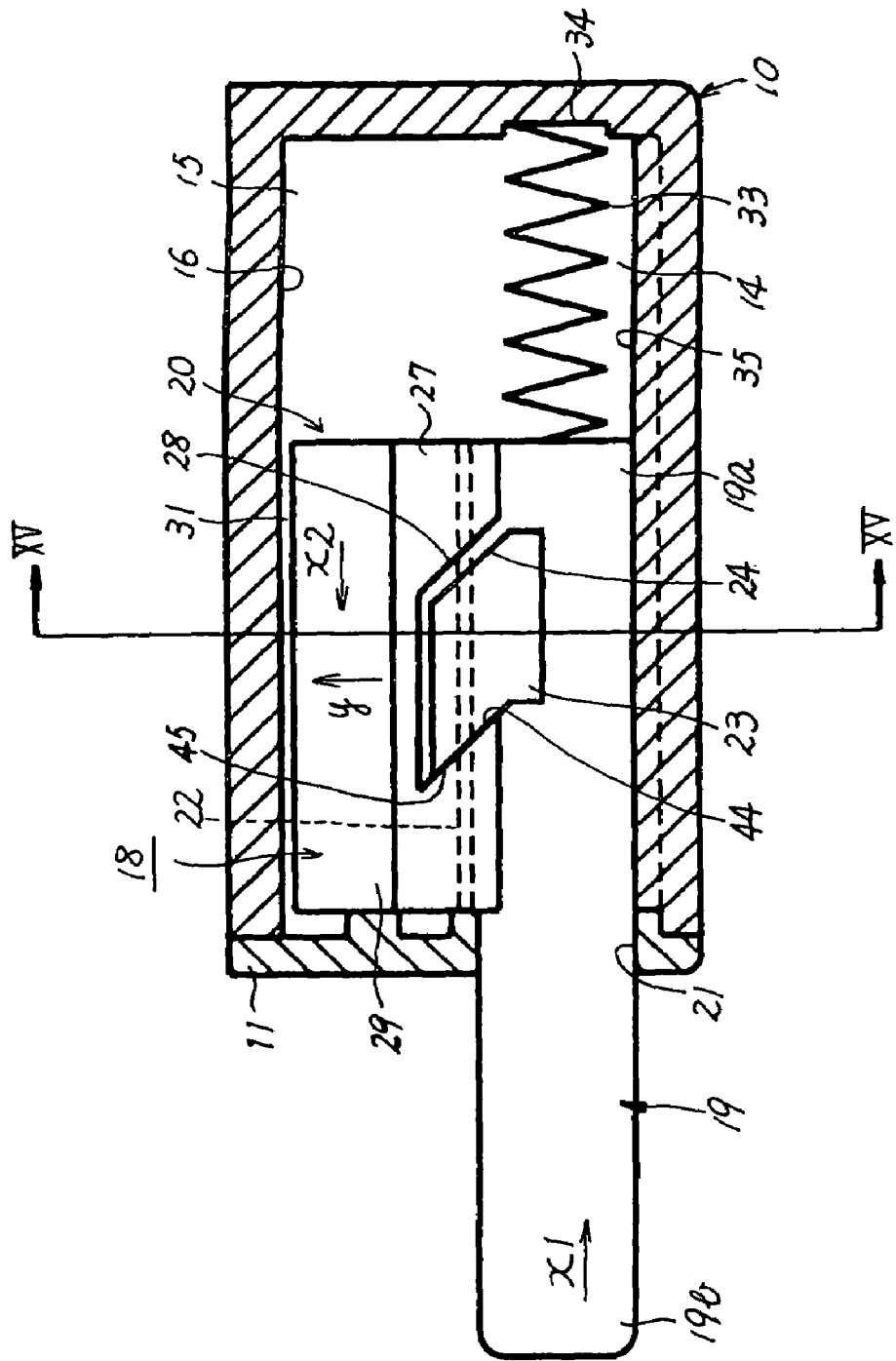
FIG. 10 is a partial sectional view of the third embodiment.
Figure 11:
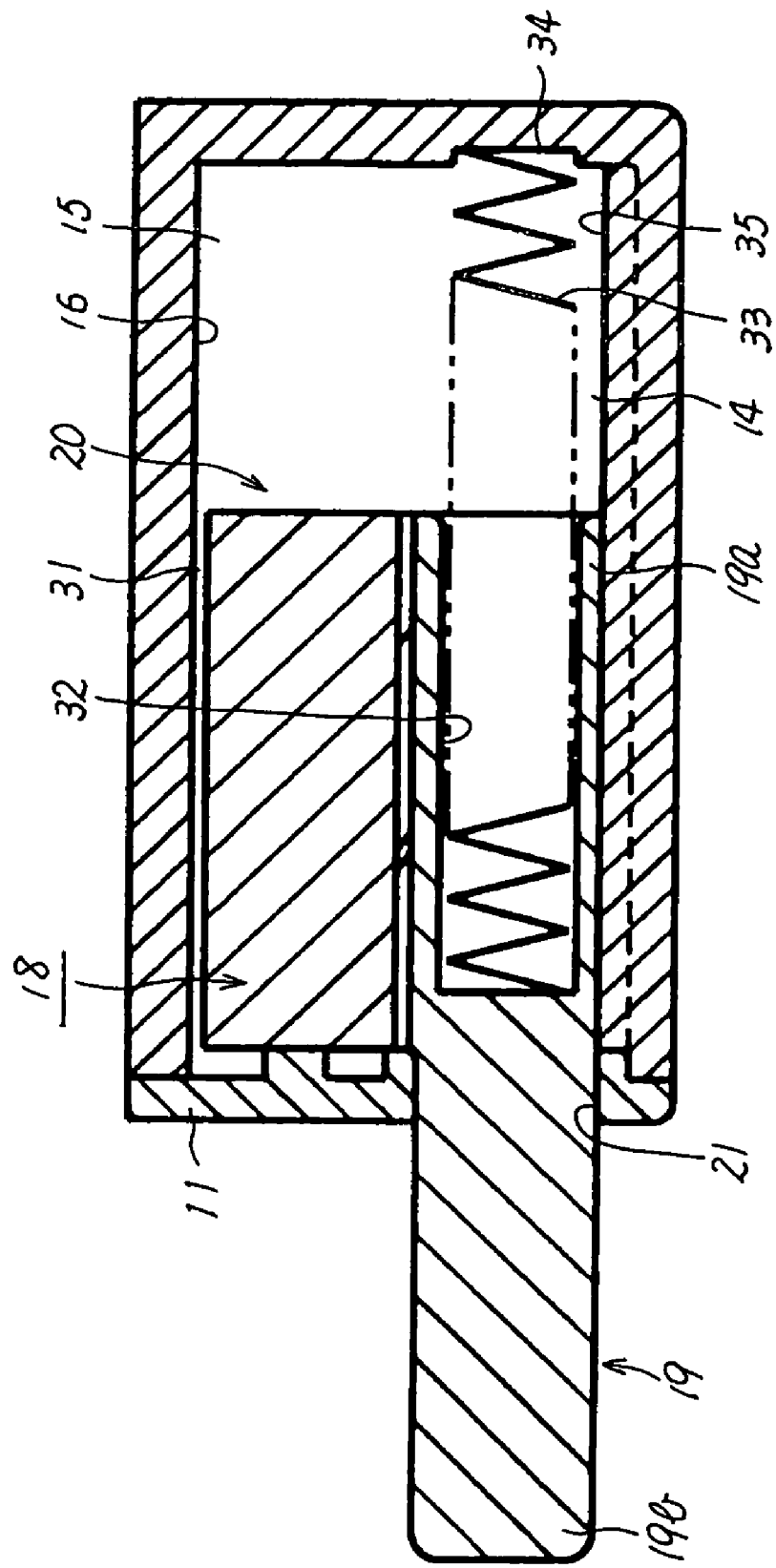
FIG. 11 is a sectional view through section XI-XI of FIG. 15.

The first moving member 19 has a coupling portion 19a and a working portion 19b acted upon by a force. The coupling portion 19a and the working portion 19b are integrally formed of a single shaft and naturally use the same axis. The working portion 19b protrudes toward the outside from a shaft hole 21 formed in the cap 11 as shown in FIGS. 10 and 11 when the first moving member 19 is fitted in the casing body 10.

Further, as shown in FIG. 9, a raised plate-shaped portion 22 extends along the axis on the coupling portion 19a, and has a flat sliding face 22a formed thereon. Paired projecting portions 23 are provided individually on the sides of the raised plate-shaped portion 22. Tops 23a of the projecting portions 23 are at a higher level than the sliding face 22a, that is, the tops 23a protrude toward the second moving member 20.

A first inclined face 24 is formed continuously from the top 23a on each of the projecting portions 23. The first inclined face 24 is inclined gradually down from the top 23a toward the end of the coupling portion 19a. On the reverse face of the first inclined face 24 of each projecting portion 23, a second inclined face 44 is formed parallel to the first inclined face 24.

The first moving member 19 has a spring-receiving hole 32 extending along the axis thereof to receive the insertion of a spring 33. An end of the spring 33 inserted in the spring-receiving hole 32 is aligned with a recess 34 formed in the closed end of the casing body 10 in order to allow for the action of an initial load pressing the first moving member 19 toward the cap 11. In this respect, the third embodiment differs from the first and second embodiments.

Figure 12:
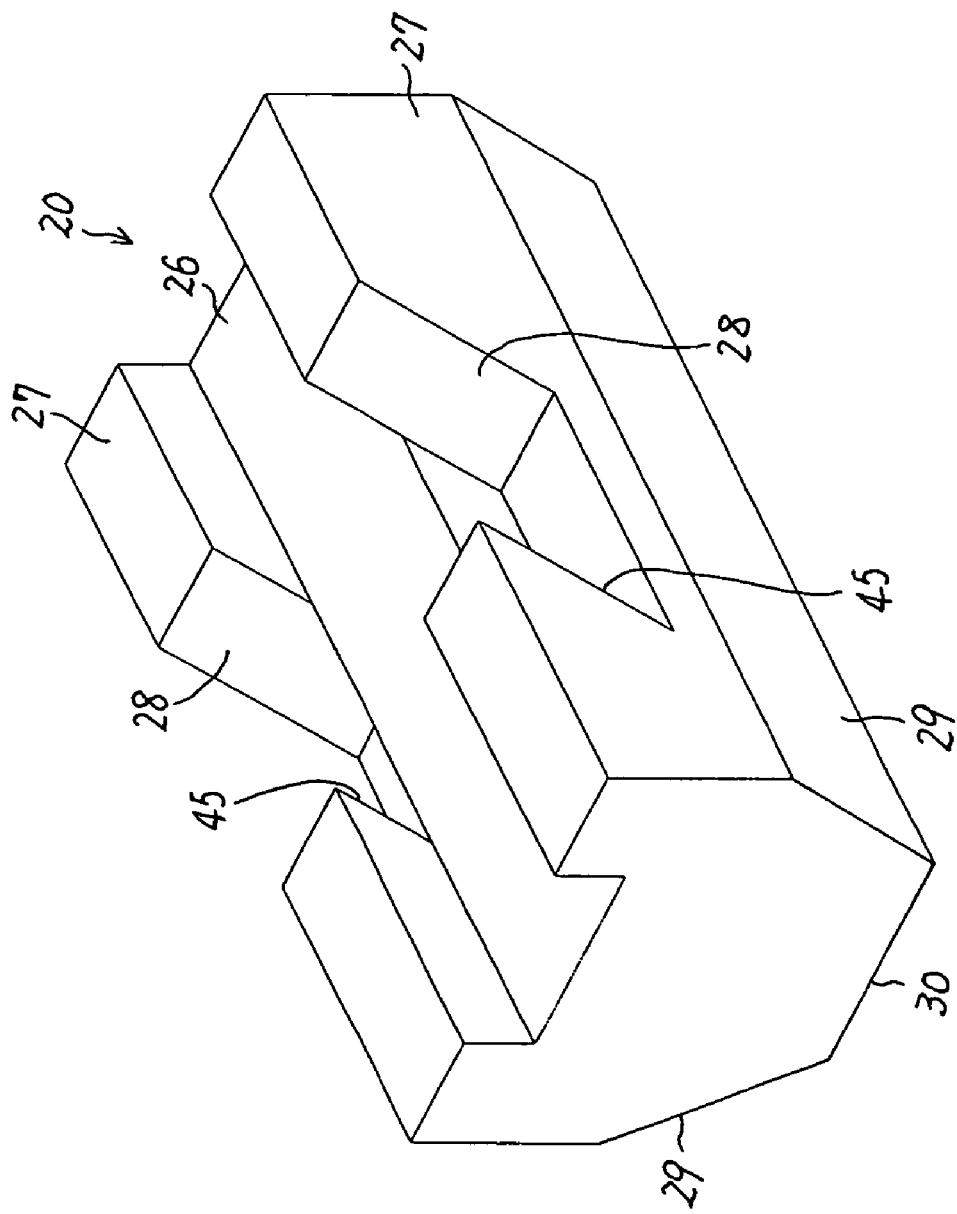
FIG. 12 is a perspective view of a second moving member of the third embodiment when viewed from the back of FIG. 9.
Figure 13:
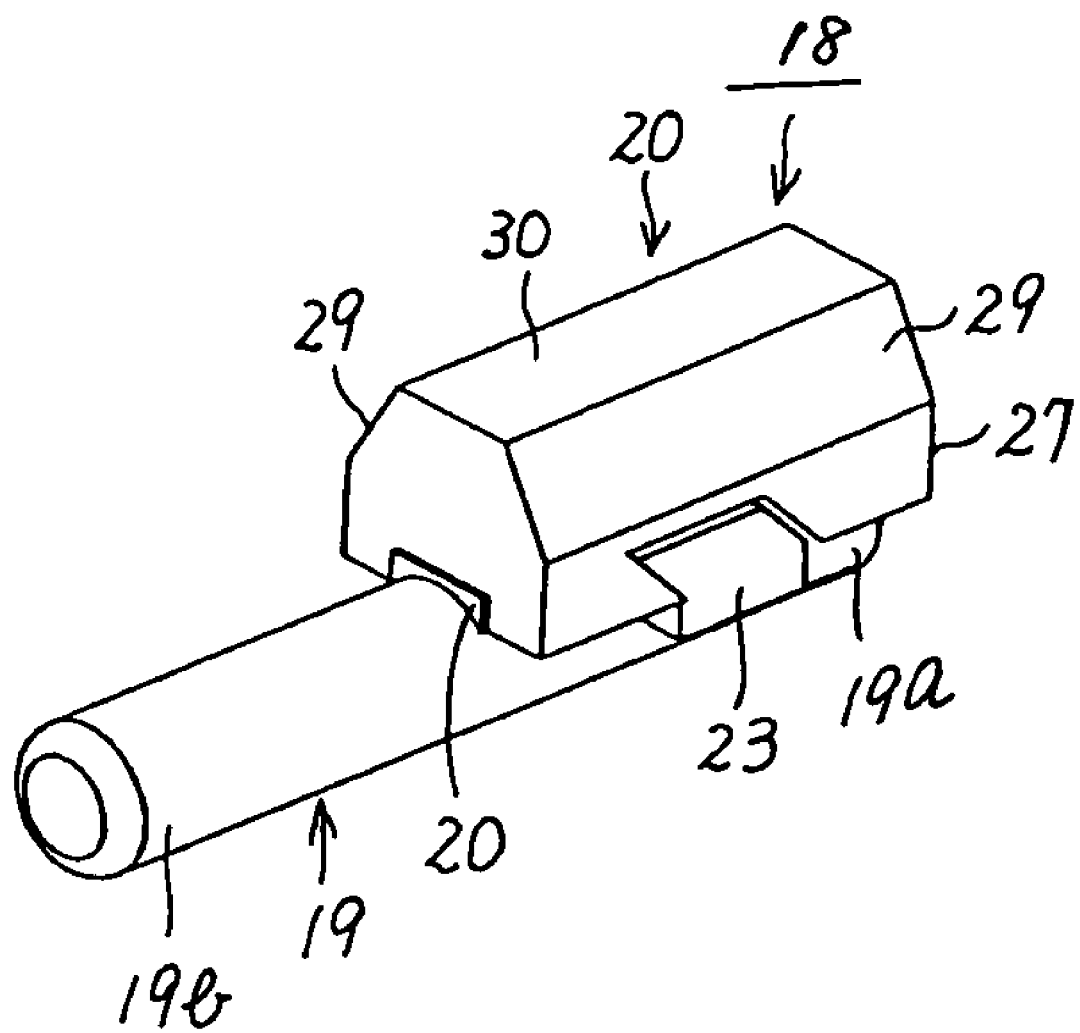
FIG. 13 is a perspective view of a slider of the third embodiment.

As shown in FIG. 12, the second moving member 20 has a sliding face 26. The width of the sliding face 26 is equal to that of the sliding face 22a of the first moving member 19. Paired guiding portions 27 protrude individually adjacent to the sides of the sliding face 26. The space between the paired guiding portions 27 is approximately equal to the width of the raised plate-shaped portion 22 of the first moving member 19. In other words, as shown in FIG. 13, when the first and second moving members 19 and 20 are laid over each other with exact alignment between the sliding faces 22a and 26, the raised plate-shaped portion 22 is fitted between the guiding portions 27 with allowance for the sliding movement. Hence, during the relative movement of the first and second moving members 19 and 20, the positional relationship between the moving members 19 and 20 is maintained. Put another way, when the first and second moving members 19 and 20 are moved relatively, the axes of the moving members 19 and 20 are not displaced in the width direction of the sliding face 22a and the sliding face 26.

Each of the guiding portions 27 has a third inclined face 28 formed to face the corresponding first inclined face 24 formed on the first moving member 19 when the first and second moving members 19 and 20 are laid over each other, in which case the first and third inclined faces 24 and 28 are allowed to come into face-to-face contact with each other. Each of the guiding portions 27 further has a fourth inclined face 45 formed to face the corresponding second inclined face 44 formed on the first moving member 19 when the first and second moving members 19 and 20 are laid over each other. The fourth inclined faces 45 are parallel to the third inclined faces 28, and allowed to come individually in face-to-face contact with the second inclined face 44 of the first moving member 19 when the first and second moving members 19 and 20 are placed over each other.

Figure 14:
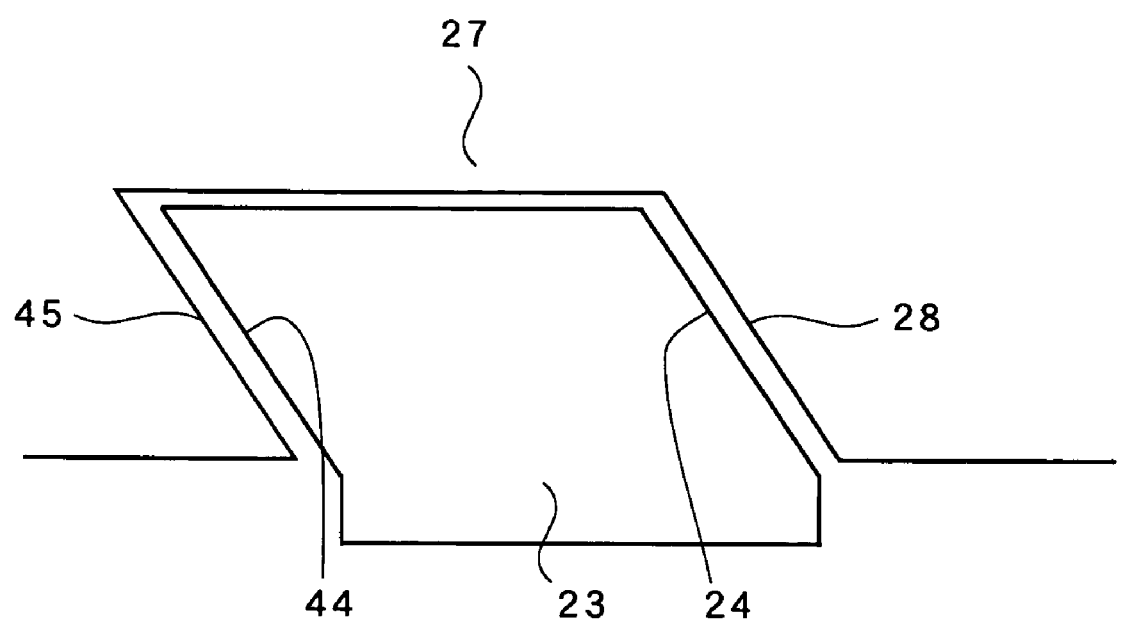
FIG. 14 is a diagram illustrating a projecting portion and a guiding portion of the third embodiment.

In this respect, the first and third inclined faces 24 and 28 and the second and fourth inclined faces 44 and 45 form the relationship as illustrated in FIG. 14: while the first and third inclined faces 24 and 28 are in contact with each other, a space is maintained between the second and fourth inclined faces 44 and 45, whereas while the second and fourth inclined faces 44 and 45 are in contact with each other, a space is maintained between the first and third inclined faces 24 and 28. Then when both the moving members 19 and 20 are in the normal position shown in FIG. 10, the second and fourth inclined faces 44 and 45 are in contact, and the first and third inclined faces 24 and 28 are separated to maintain the space.

As shown in FIG. 10, a force in the direction x1 is exerted on the first moving member 19, whereupon the first and third inclined faces 24 and 28 of the respective moving members 19 and 20 come into contact with each other. The vertical force component and the horizontal force component act on this contact face. The vertical force component results in a force y in the direction separating the moving members 19 and 20 from each other (see FIG. 10). Accordingly, upon the movement of the second moving member 20, the force y presses the sliding second moving member 20 against the damping groove 15 formed in the casing body 10, at which time a slide resistance is produced between the second moving member 20 and the casing body 10. This slide resistance allows the force in the direction x2 to act on the second moving body 20.

Then, when the force in the direction x1 shown in FIG. 10 is removed, the spring force of the spring 33 returns the slider 18 to the normal position. In this event, the first and third inclined faces 24 and 28 of the moving members 19 and 20 separate from each other and the second and fourth inclined faces 44 and 45 come into contact with each other. The contacting second and fourth inclined faces 44 and 45 are acted upon by a vertical and a horizontal force component. However, the vertical force component serves as a force brining the moving members 19 and 20 closer to each other, namely, a force opposite in direction to the force y (see FIG. 10).

Figure 15:
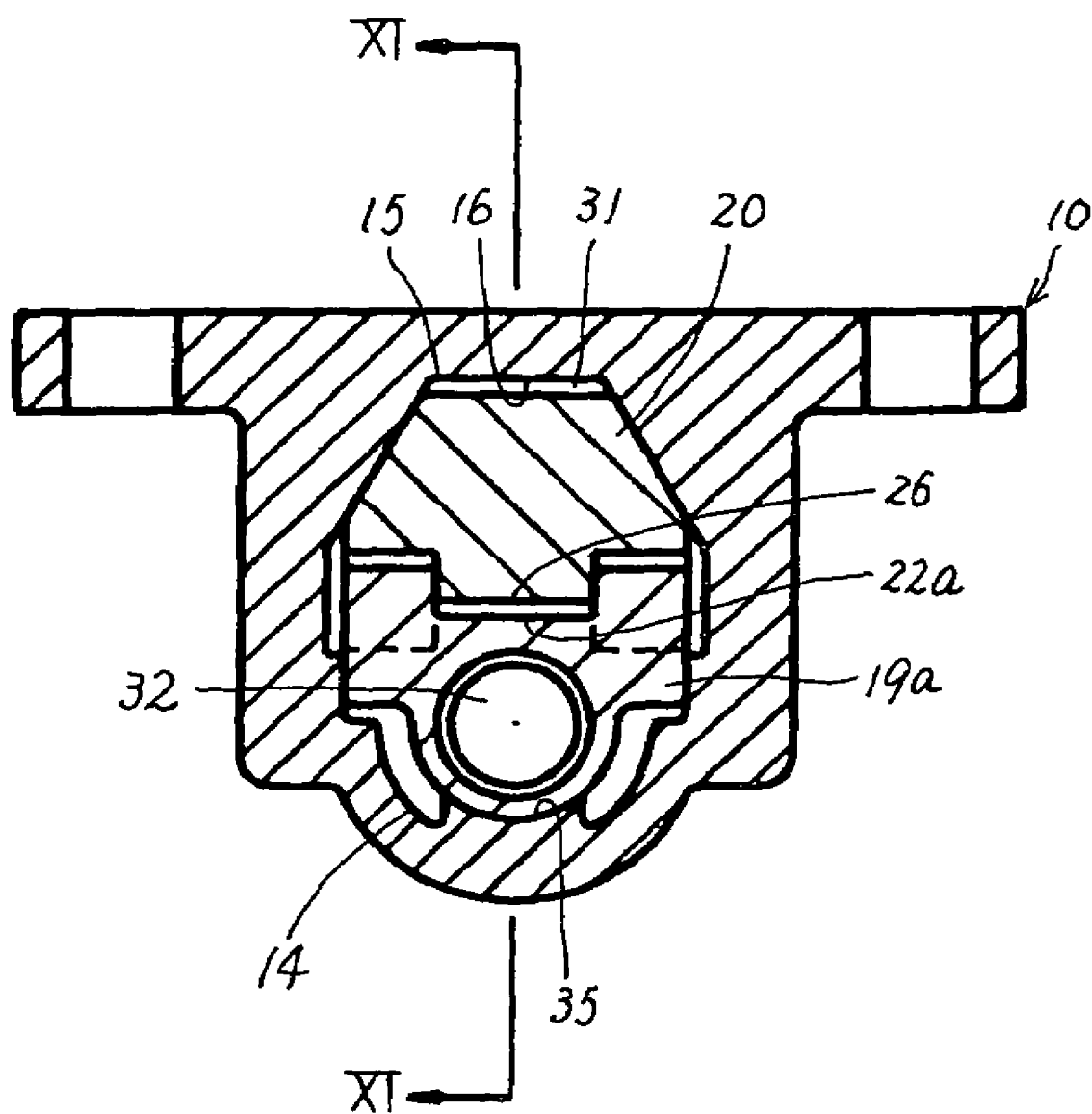
FIG. 15 is a sectional view through section XV-XV of FIG. 10.

Further, the second moving member 20 has tapering faces 29 individually facing the tapering faces 17 formed on the casing body 10, and an opposing face 30 facing the ceiling face 16 formed on the casing body 10. That is, the second moving member 20 is shaped trapezoidal in section corresponding to the damping groove 15, and yet when the second moving member 20 is inserted in the damping groove 15, a slight space 31 is formed between the ceiling face 16 and the opposing face 30 as shown in FIG. 15. Hence, the force y acts in the state of creating the space 31, whereupon the second moving member 20 is engaged more strongly in the damping groove 15 to further increase the frictional force between the tapering faces 29 of the second moving member 20 and the tapering faces 17 of the damping groove 15. The tapering faces 29 and the opposing face 30 designed as described above form the damping portion of the present invention.

In turn, in the casing body 10, the arc-shaped lower portion of the cylindrical portion 14 is provided with a supporter 35 formed in an arc shape of the same curvature as those of the coupling portion 19a and the working portion 19b of the first moving member 19. The coupling portion 19a and the working portion 19b are placed on the supporter 35, so that the contact area between the casing body 10 and the first moving member 19 is reduced to decrease the slide resistance between them.

For insertion of the first moving member 19 and the second moving member 20 into the casing body 10 as described above, sliding faces 22a and 26 of the moving members 19 and 20 are aligned with each other, and the first and third inclined faces 24 and 28 of the moving members 19 and 20 and also the second and fourth inclined faces 44 and 45 directly face each other. In this situation, the first and second moving members 19 and 20 are combined (see FIG. 13). This combination of the moving members 19 and 20 constitutes the slider 18 of the present invention.

In the slider 18, the spring 33 is pre-installed in the spring-receiving hole 32 formed in the first moving member 19.

Then, the slider 18 is housed in the casing body 10: the coupling portion 19a and the working portion 19b of the first moving member 19 are inserted in the cylindrical portion 14 of the casing body 10, and the second moving member 20 with the extending spring 33 preinstalled in the spring-receiving hole 32 is fitted in the damping groove 15 of the casing body 10.

After completion of the insertion of the slider 18 into the casing body 10, the casing body 10 is closed by the cap 11. At this point, the working portion 19b protrudes from the shaft hole 21 of the cap 11, and the pallets 11b of the hooks 11a are engaged with the engaging recesses 13. In the slider 18 in the normal position illustrated in FIGS. 10 and 11, an end of the raised plate-shaped portion 22 is in contact with the cap 11 to prevent the first moving member 19 from separating from the casing body 10.

Because the spring 33 inserted in the first moving member 19 is extended, the spring force of the spring 33 also acts on the second moving member 20 via the second and fourth inclined faces 44 and 45. Hence, each of the first and second moving members 19 and 20 are maintained in the normal position shown in FIGS. 10 and 11 by the spring force of the spring 33. Put another way, in the normal position the second moving member 20 is in contact with the cap 11, and the working portion 19b protrudes outward from the shaft hole 21 formed in the cap 11.

The following is the relative relationship between the casing body 10 and each of the components of the slider 18 when the slider 18 is inserted into the casing body 10 as described above.

When the slider 18 is inserted into the casing body 10 in the foregoing manner, in the normal position shown in FIG. 10, the fourth inclined faces 45 of the second moving member 20 are in contact with the second inclined faces 44 formed on the first moving member 19, and the tapering faces 29 of the second moving member 20 are in contact with the tapering faces 17 formed on the casing body 10.

The second moving member 20 is fitted into the damping groove 15 of the casing body 10, and the tapering faces 29 and the tapering faces 17 are in contact with each other. In this condition, the space 31 as shown in FIGS. 10 to 15 is created between the ceiling face 16 formed in the damping groove 15 and the opposing face 30 formed on the second moving member 20 as described earlier. The formation of the space 31 allows the second moving member 20 to move in the depth direction of the damping groove 15.

Further, the supporter 35 is formed in the bottom portion of the cylindrical portion 14, and has the same curvature as those of the coupling portion 19a and the working portion 19b. For this reason, the coupling portion 19a and the working portion 19b is able to slide while being supported by the supporter 35.

Next, the operation in the third embodiment will be described.

The slider 18 is in the normal position illustrated in FIG. 10, in which contact is made between the second and fourth inclined faces 44 and 45 and the space between the first and third inclined faces 24 and 28 is maintained. In this position, the force in the direction x1 acts on the working portion 19b, whereupon the first moving member 19 moves in the direction x1 against the spring force of the spring 33. Upon the movement of the first moving member 19, the first and third inclined faces 24 and 28 come into contact state and the second and fourth inclined faces 44 and 45 are separated to maintain the space.

During the contact state between the first and third inclined faces 24 and 28, if the first moving member 19 is moved further in the direction x1, the moving force is transferred via the inclined faces 24 and 28 to the second moving member 20 to move the second moving member 20 together with the first moving member 19. The slide resistance thus produced between the damping portion and the damping groove 15 affects the second moving member 20. As a result, the second moving member 20 is acted upon by the force in the direction x1 which is the moving force of the first moving member 19 and the force in the direction x2 which is provided by the slide resistance, so that the force x1 is opposite in direction to the force x2. Hence, a vertical force component and a horizontal force component are produced between the first and third inclined faces 24 and 28. When the vertical force component thus acts on the second moving member 20, the second moving member 20 is pressed against the damping groove 15 of the casing body 10. This is because the first moving member 19 is supported on the supporter 35 so as to be incapable of moving further in the direction at right angles to the axis.

When the force of pushing up the second moving member 20 toward the damping groove 15 comes into action, in particular the front part of the second moving member 20 when viewed in the moving direction is consequently moved to press the tapering faces 29 of the second moving member 20 into the tapering faces 17 of the damping groove 15 on the same principle as in the case of driving in a wedge. The pressing force thus produced results in a slide resistance on the part of the second moving member 20. This slide resistance on the part of the second moving member 20 is exerted also on the first moving member 19 as a slide resistance. Hence, the slide resistance produced at this point serves as a braking force to exert the damping effect.

However, this damping force varies with the magnitude of the force acting on the first moving member 19 and the moving speed. Specifically, with a large force and a high moving speed, the second moving member 20 is strongly pressed against the damping groove 15 in one stroke. Thus, a large braking force, i.e., a damping force is exerted at a fast pace. On the other hand, when the force acting on the first moving member 19 is small and the moving speed is slow, the second moving member 20 is gradually pressed against the damping groove 15 at a slow pace. Thus, the braking force, i.e., the damping force gradually increases in accordance with the stroke.

The fact that the conditions of exerting the damping force vary with the moving speed and the magnitude of the force as described above means that it is possible to provide an appropriate damping force at all times according to the use of the damper or the circumstances of use.

Figure 16:
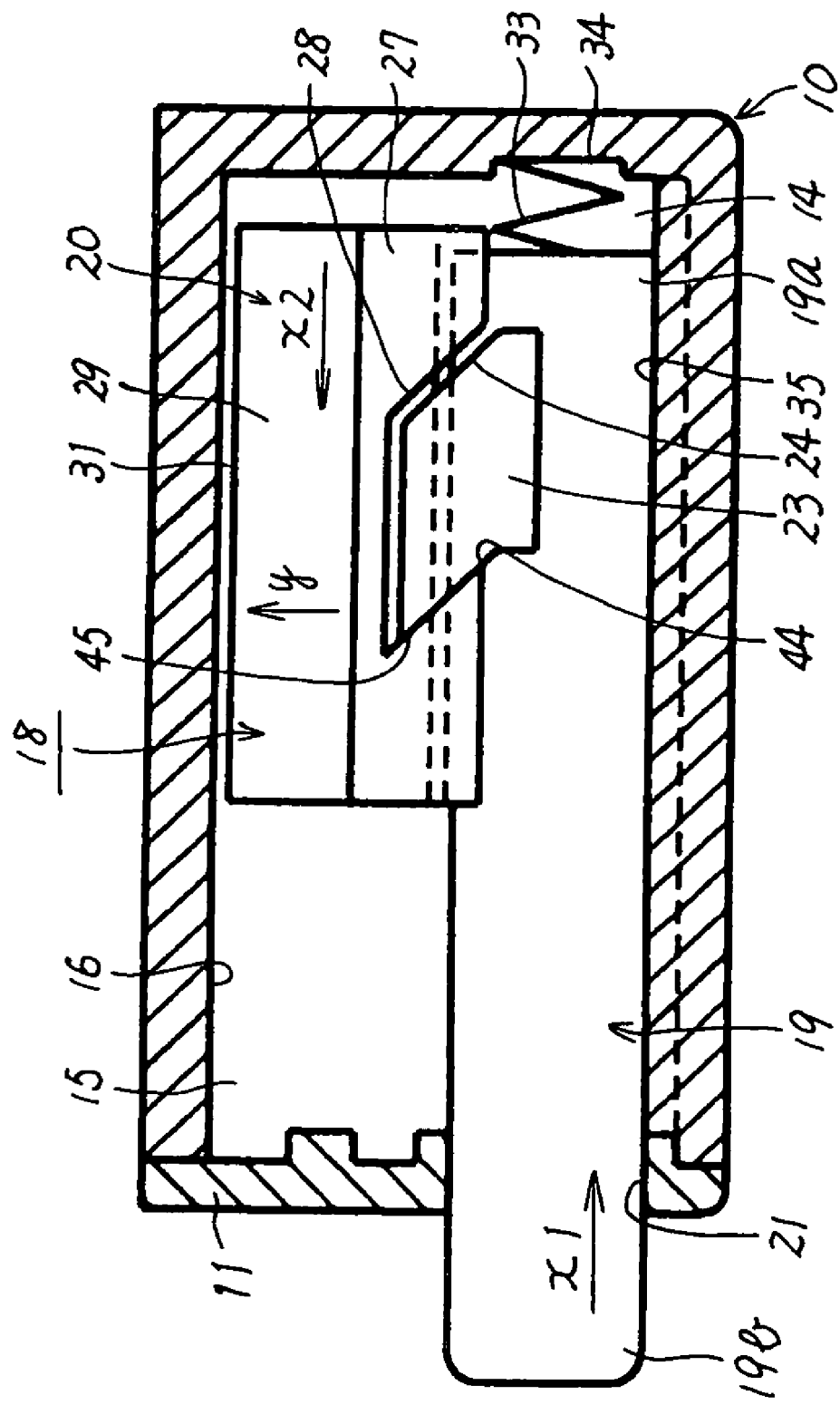
FIG. 16 is a partial sectional view showing the slider when moved from the position illustrated in FIG. 10.

After the slider 18 has moved inside the casing body 10 while exerting the damper effect, the force acting on the working portion 19b decreases so as to be lower than the spring force of the spring 33. Thereupon, the spring force of the spring 33 moves the first moving member 19 in the direction of returning to the normal position illustrated in FIGS. 10 and 11. At this point, as illustrated in FIG. 16, the first inclined face 24 is disconnected from the third inclined face 28, and the second inclined face 44 comes in contact with the fourth inclined face 45. Thus, a vertical force component and a horizontal force component are exerted between the second and fourth inclined faces 44 and 45. The vertical force component is opposite in direction to the force y shown in FIG. 10.

When the slider 18 is returned by the spring force of the spring 33, the second moving member 20 is acted upon by a force brining the moving member 20 closer to the moving member 19. This force serves as a force in the direction disconnecting the second moving member 20 from the damping groove 15, to reduce the force pressing the second moving member 20 against the damping groove 15. Along with the reduction in the pressing force, the braking force reduces. Thus, the slider 18 is able to return smoothly to the normal position by the spring force of the spring 33.

According to the third embodiment just described, in addition to the same effects as those in the first embodiment which can naturally be expected, it is possible to achieve the further effect that at the returning stage the damping portion is separated from the damping groove 15 for the smooth movement of the slider 18. That is, it is possible to make the return speed faster to prepare for receiving the next impact force.

In the third embodiment, the damping groove 15 is provided in the casing body 10 and the damping portion is provided in the slider 18. However, a damping portion may be provided in the casing body 10 and a damping groove may be provided in the slider 18 as in the case of the second embodiment.

Further, the side faces of the damping groove 15 are formed as a pair of tapering faces 17, but one of the side faces may be as a tapering face and the other may be formed as a straight face, for example. Whichever the case, what is required is for the inner width of the damping groove 15 to be gradually tapered in the depth direction or the opening direction thereof. In this case, the shape of the damping portion of the second moving member 20 must correspond to the shape of the damping groove 15.

Still further, the first inclined faces 24 of the first moving member 19 and the third inclined faces 28 of the second moving member 20 constitute the conversion mechanism according to the present invention, but the inclined faces may be provided in one of the first and second moving members 19 and 20. In this respect, the third embodiment is the same as the first and second embodiments.

Although in the foregoing the first inclined faces 24 and the second inclined faces 44 are designed in parallel to each other and the third inclined faces 28 and the fourth inclined faces 45 are designed in parallel to each other, the inclined faces are not necessarily required to be parallel to each other. The essential requirement is that the first inclined faces 24 should be face to face with the third inclined faces 28 and the first and third inclined faces 24 and 28 should be able to create a force pressing the second moving member 20 against the damping groove 15. Further the second inclined faces 44 should be face to face with the fourth inclined faces 45 and the second and fourth inclined faces 44 and 45 should be able to remove the pressing force.

As a natural result, it is then possible for the third embodiment to yield the same effects as those in the first embodiment.

Further, although the second inclined face 44 of the first moving member 19 and the fourth inclined face 45 of the second moving member 20 constitute the release mechanism according to the present invention, the inclined face may be provided in one of the first and second moving members 19 and 20 as in the case of the conversion mechanism. The relationship between the inclined faces 44 and 45 is the same as the relationship between the first and third inclined faces 24 and 28 forming the conversion mechanism.

Figure 17:
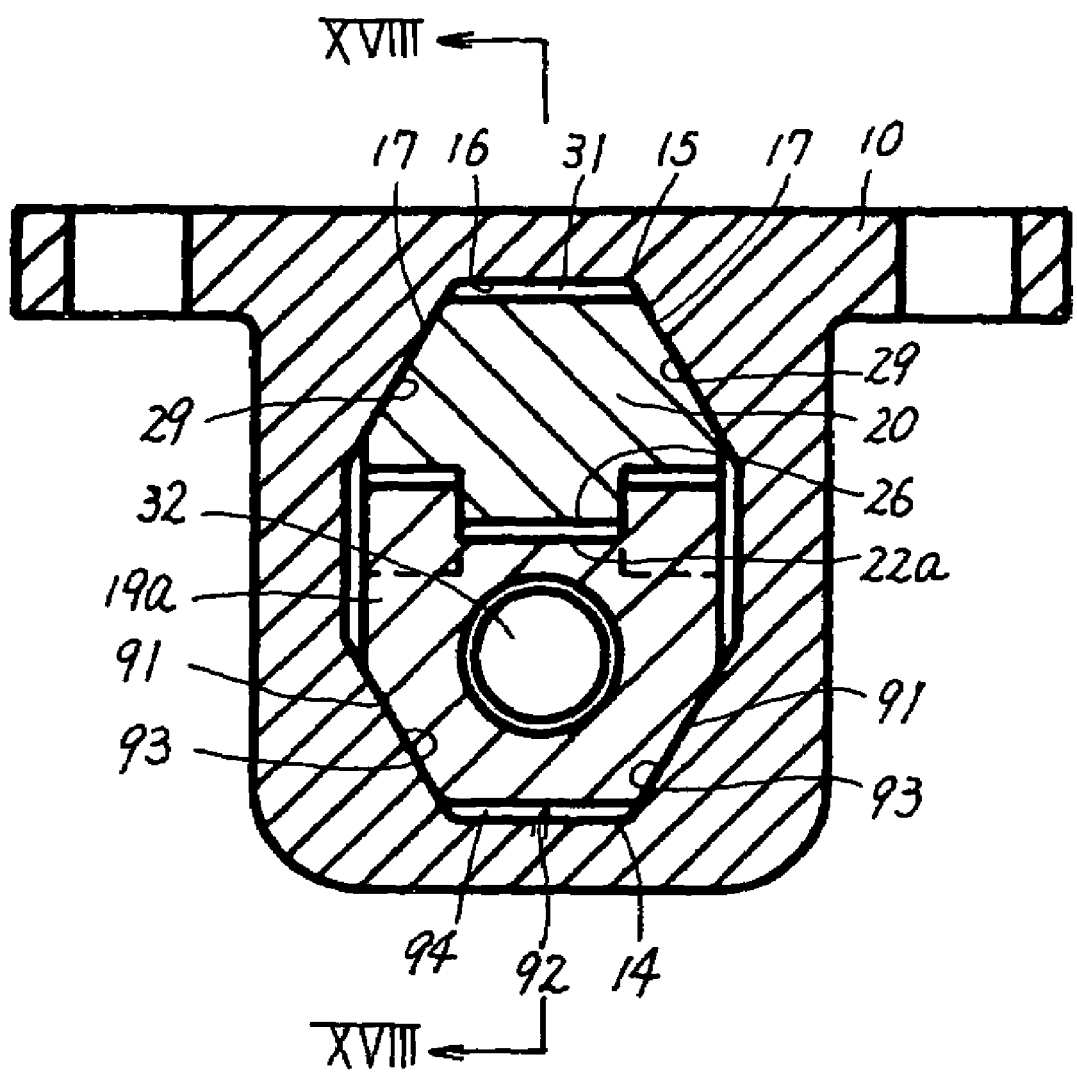
FIG. 17 is a sectional view through section XVII-XVII of FIG. 18 in a fourth embodiment.
Figure 18:
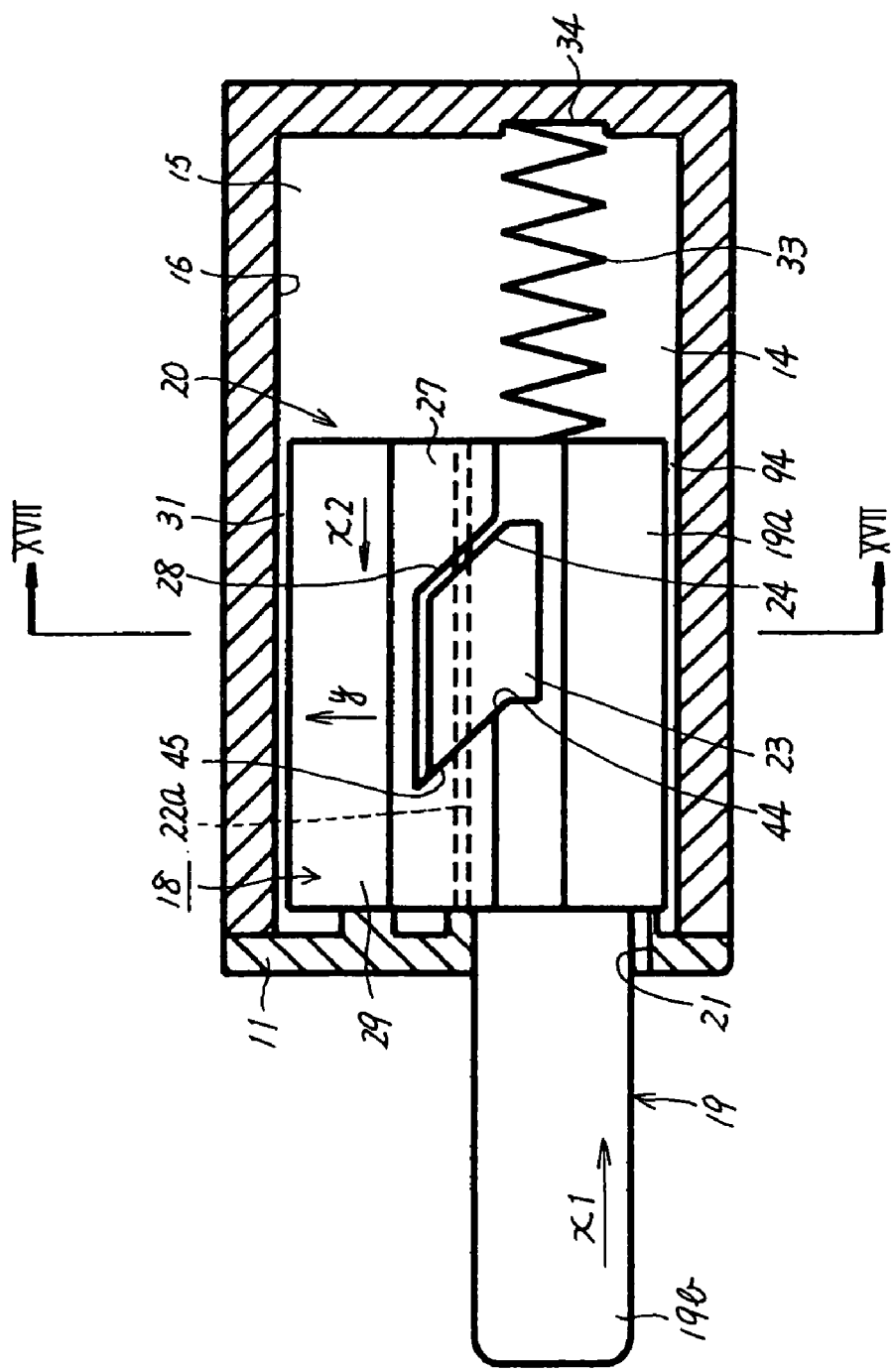
FIG. 18 is a sectional view through section XVIII-XVIII of FIG. 17.

FIG. 17 and FIG. 18 illustrate a fourth embodiment according to the present invention. One of the most striking characteristics of the fourth embodiment is that the first and second moving members 19 and 20 are each provided with damping portions and the casing body 10 has the two damping grooves corresponding to the individual damping portions. Specifically, as shown in FIG. 17, tapering faces 91 are formed on a cylindrical portion 14 of the casing body 10 to serve as a second damping groove 92. Tapering faces 93 are formed on a coupling portion 19a of the first moving member 19 in correspondence with the damping groove 92. The tapering faces 93 serve as a second damping portion. It goes without saying that a space 94 performing the same function as that of the space 31 is formed between the surface of the damping portion formed on the coupling portion 19a and the casing body 10.

In turn, the second moving member 20 includes a first damping portion, and the casing body 10 includes a first damping groove 15 corresponding to the first damping portion. This structure of the second moving member is the same as that in the third embodiment.

As shown in FIG. 18, the slider 18 is formed by combining the first moving member 19 and the second moving member 20. When the slider 18 is incorporated into the casing body 10, the slider 18 is slidably supported in between the opposed damping grooves 15 and 92 while maintaining a slight backlash. The shaft hole 21 formed in the cap 11 has a diameter larger than that of the working portion 19b of the first moving member 19 to allow the first moving member 19 to move toward the spaces.

In the position illustrated in FIG. 18, the force in the direction x1 acts on the working portion 19b, whereupon the first moving member 19 moves in the direction x1 shown in FIG. 18. Upon the movement of the first moving member 19, the first and third inclined faces 24 and 28 come into contact, and therefore the moving force of the moving member 19 is transferred via the first and third inclined faces 24 and 28 to the second moving member 20 to move the second moving member 20 together with the first moving member 19. At this point, the second moving member 20 is affected by the slide resistance produced between the damping portion and the damping groove 15, so that the force in the direction x1 which is the moving force of the first moving member 19 and the force in the direction x2 caused by the slide resistance act on the second moving member 20.

The forces x1 and x2 are opposite in direction to each other. Accordingly, the vertical force component and the horizontal force component are exerted between the first inclined face 24 and the third inclined face 28. Upon the action of the vertical force component on the second moving member 20, the second moving member 20 is pressed against the damping groove 15 of the casing body 10. Then the repulsion relating from the pressing of the second moving member 20 induces a force pressing the first moving member 19 toward the damping groove 92.

Moreover, because the diameter of the shaft hole 21 supporting the first moving member 19 is larger than that of the working portion 19b, the first moving member 19 receiving the pressing force as mentioned above is pressed against the damping groove 92.

The second moving member 20 is pressed against the damping groove 15 and the first moving member 19 is pressed against the damping groove 92. Thereupon, on the same principle as in the case of driving in a wedge, the first and second moving members 19 and 20 press the tapering faces 93 of the first moving member 19 into the tapering faces 91 of the second damping groove 92, and the tapering faces 29 of the second moving member 20 into the tapering faces 17 of the first damping groove 15.

These pressing forces result in a slide resistance on the part of the first and second moving members 19 and 20. This slide resistance serves as a braking force to exert a damping effect.

Accordingly, the fourth embodiment is capable of using two damping grooves and two damping portions to produce the slide resistance. As a result it is possible to exert a greater damping effect as compared with the case of the first embodiment in which the damping effect is produced by using a single damping groove and a single damping portion.

It is naturally possible for the fourth embodiment to provide the same effects as those in the first embodiment.

Apart from the foregoing, the structure in the fourth embodiment is the same as that in the third embodiment. The same components as those in the third embodiment are described, with using the same reference numerals.

The fourth embodiment as described here includes the first damping groove 15 and the second damping groove 92 that are provided in the casing body 10 and the damping portions provided in the slider 18. However, damping portions may be provided in the casing body 10 and damping grooves may be provided in the slider 18 as in the case of the second embodiment.

In the fourth embodiment, the damping groove 15 has the paired tapering faces 17 formed on the side faces. However, one of the side faces may be a tapering face and the other may be a straight face, for example. In any event, it is necessary to gradually lessen the inner width of the damping groove 15 in the depth direction or the opening direction thereof. Note that in this case, the shape of the corresponding damping portion of the second moving member 20 must be changed to match the shape of the damping groove 15.

Further, the first inclined faces 24 of the first moving member 19 and the third inclined faces 28 of the second moving member 20 constitute the conversion mechanism according to the present invention, but the inclined faces may be provided in one of the first and second moving members 19 and 20. In this respect, the third embodiment is the same as the first and second embodiments.

Further, although the second inclined face 44 of the first moving member 19 and the fourth inclined face 45 of the second moving member 20 constitute the release mechanism according to the present invention, the inclined face may be provided in one of the first and second moving members 19 and 20 as in the case of the conversion mechanism. The relationship between the inclined faces 44 and 45 is the same as the relationship between the first and third inclined faces 24 and 28 forming the conversion mechanism.

Although in the foregoing the first inclined faces 24 and the second inclined faces 44 are designed in parallel to each other and the third inclined faces 28 and the fourth inclined faces 45 are designed in parallel to each other, the inclined faces are not necessarily required to be parallel to each other. The essential requirement is that the first inclined faces 24 should be face to face with the third inclined faces 28 and the first and third inclined faces 24 and 28 should be able to create a force pressing the second moving member 20 against the damping groove 15. Further the second inclined faces 44 should be face to face with the fourth inclined faces 45 and the second and fourth inclined faces 44 and 45 should be able to remove the pressing force.

FIG. 19 to FIG. 23 illustrate a fifth embodiment according to the present invention.

Figure 19:
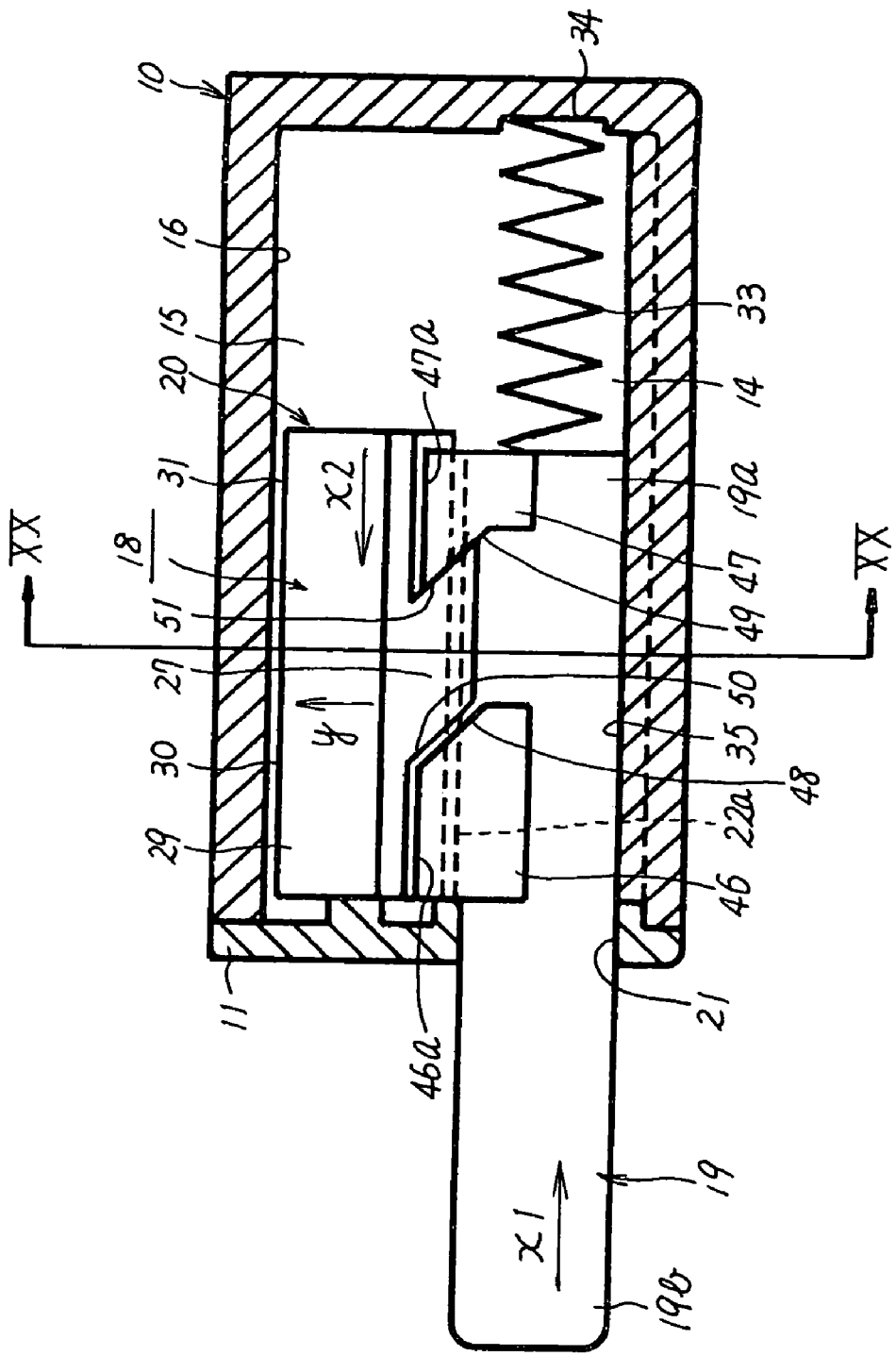
FIG. 19 is a partial sectional view of a fifth embodiment.

As shown in FIG. 19, a casing according to the present invention is constituted of a cylindrical-shaped casing body 10 and a cap 11. The casing body 10 has a closed end and an open end having an opening closed with the cap 11.

As in the case of the first embodiment, the casing body 10 has a cylindrical portion 14 and a damping groove 15 formed inside in the axial direction. The cylindrical portion 14 and the damping groove 15 have the axes parallel to each other but the axis of the damping groove 15 is eccentric with respect to the cylindrical portion 14. The cylindrical portion 14 and the damping groove 15 are connected continuously to each other in the vertical direction.

Figure 20:
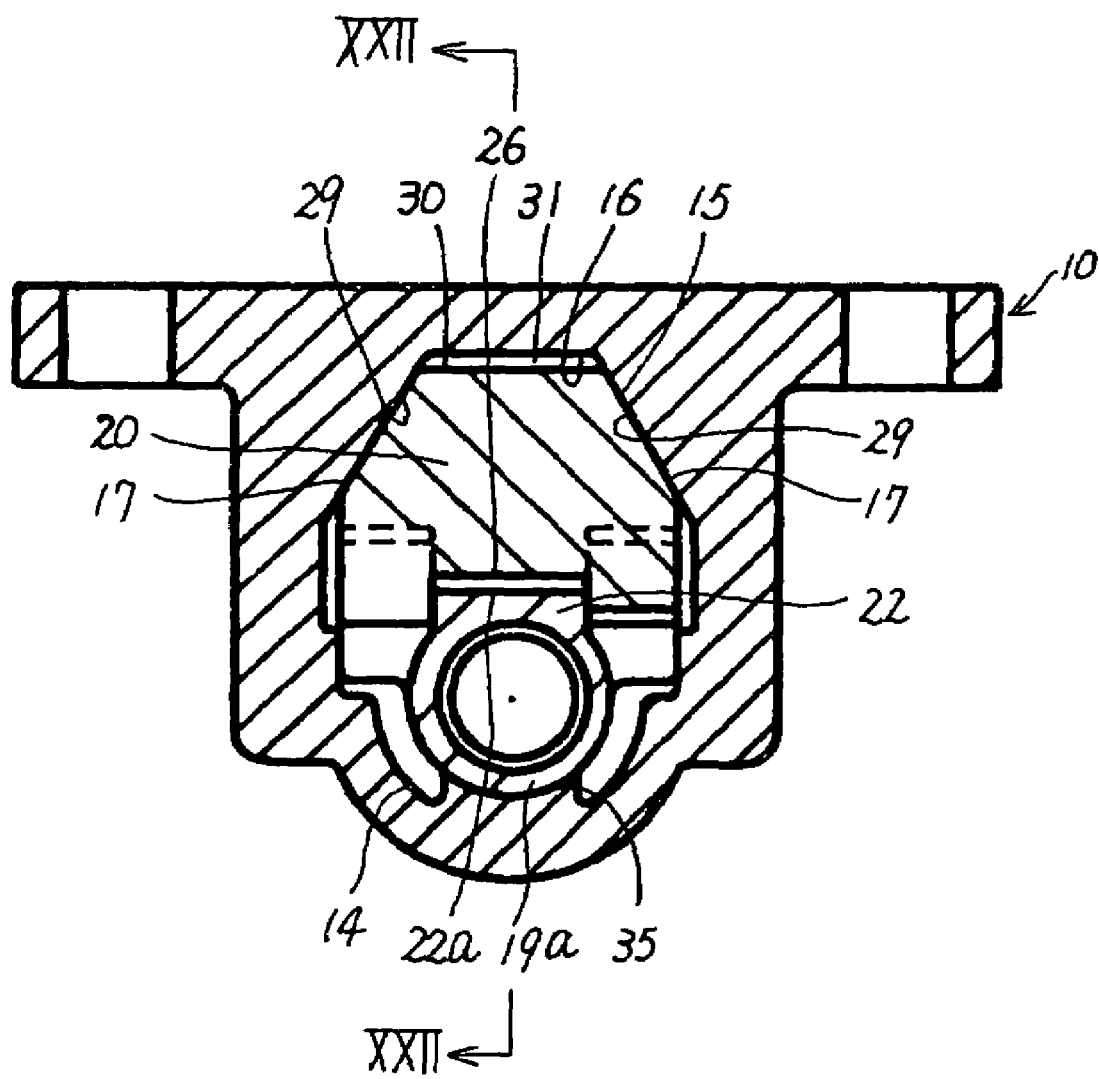
FIG. 20 is a sectional view through section XX-XX of FIG. 19.

The cylindrical portion 14 has an arc-shaped inner bottom portion formed opposite the damping groove 15 as shown in FIG. 20. The damping groove 15 has a flat ceiling face 16 opposing the cylindrical portion 14. The side faces of the damping groove 15 are formed as two tapering faces 17 between which the space opens up gradually toward the cylindrical portion 14, i.e. the opening of the damping groove 15. In other words, the damping groove 15 tapers toward the ceiling face 16 to form a trapezoid in section.

A slider 18 is placed into the casing body 10 with allowance for the sliding movement as illustrated in FIG. 19. The slider 18 includes a first moving member 19 and a second moving member 20.

The first moving member 19 has a coupling portion 19a and a working portion 19b acted upon by a force. The coupling portion 19a and the working portion 19b are integrally formed of a single shaft and naturally use the same axis. The working portion 19b protrudes toward the outside from a shaft hole 21 formed in the cap 11 when the first moving member 19 is fitted in the casing body 10.

Further, a raised plate-shaped portion 22 extends along the axis on the coupling portion 19a, and has a flat sliding face 22a formed thereon as shown in FIG. 20. As shown in FIG. 19, firstly paired projecting portions 46 are provided opposite each other on both sides of the raised plate-shaped portion 22, and secondly paired projecting portions 47 are similarly provided at an interval from the first paired projecting portions 46 on both sides thereof.

Figure 21:
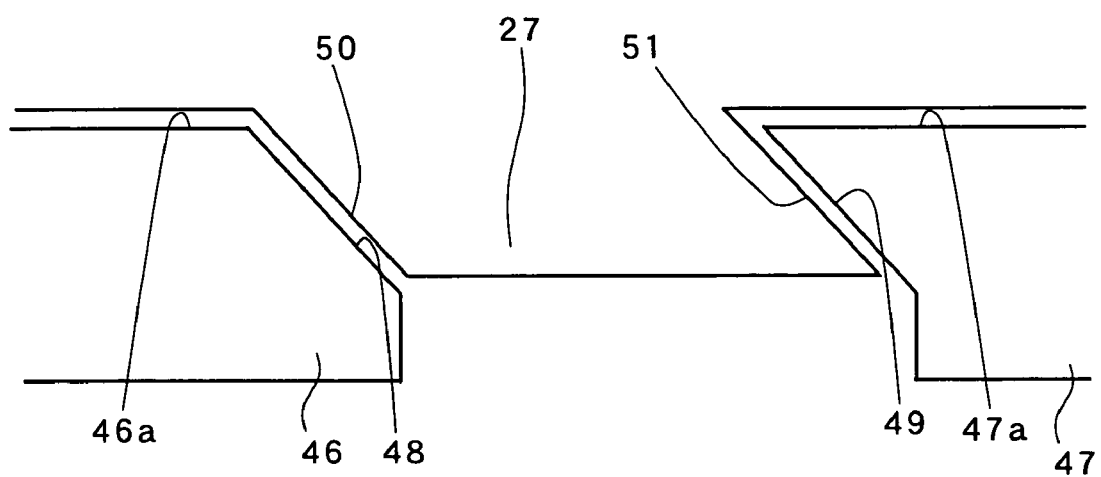
FIG. 21 is a diagram illustrating a projecting portion and a guiding portion in the fifth embodiment.

As shown in FIGS. 19 and 21, the first paired projecting portions 46 are provided adjacent to the working portion 19b, and have the tops 46a at a higher level than the sliding face 22a, that is, the tops 46a protrude toward the second moving member 20. An inclined face 48 is formed continuously from the top 46a on each of the projecting portions 46. The inclined face 48 is inclined gradually down from the top 46a toward the end of the coupling portion 19a.

The second paired projecting portions 47 are provided closer to the leading end of the coupling portion 19a with respect to the first paired projecting portions 46. Similar to the first paired projecting portions 46, the top 47a of each of the projecting portions 47 is at a higher level than the sliding face 22a, that is, the tops 47a protrude toward the second moving member 20. Each of the projecting portions 47 has an inclined face 49 formed continuously from the top 47a. The inclined faces 49 are individually parallel to the inclined faces 48 formed on the first paired projecting portions 46.

Figure 22:
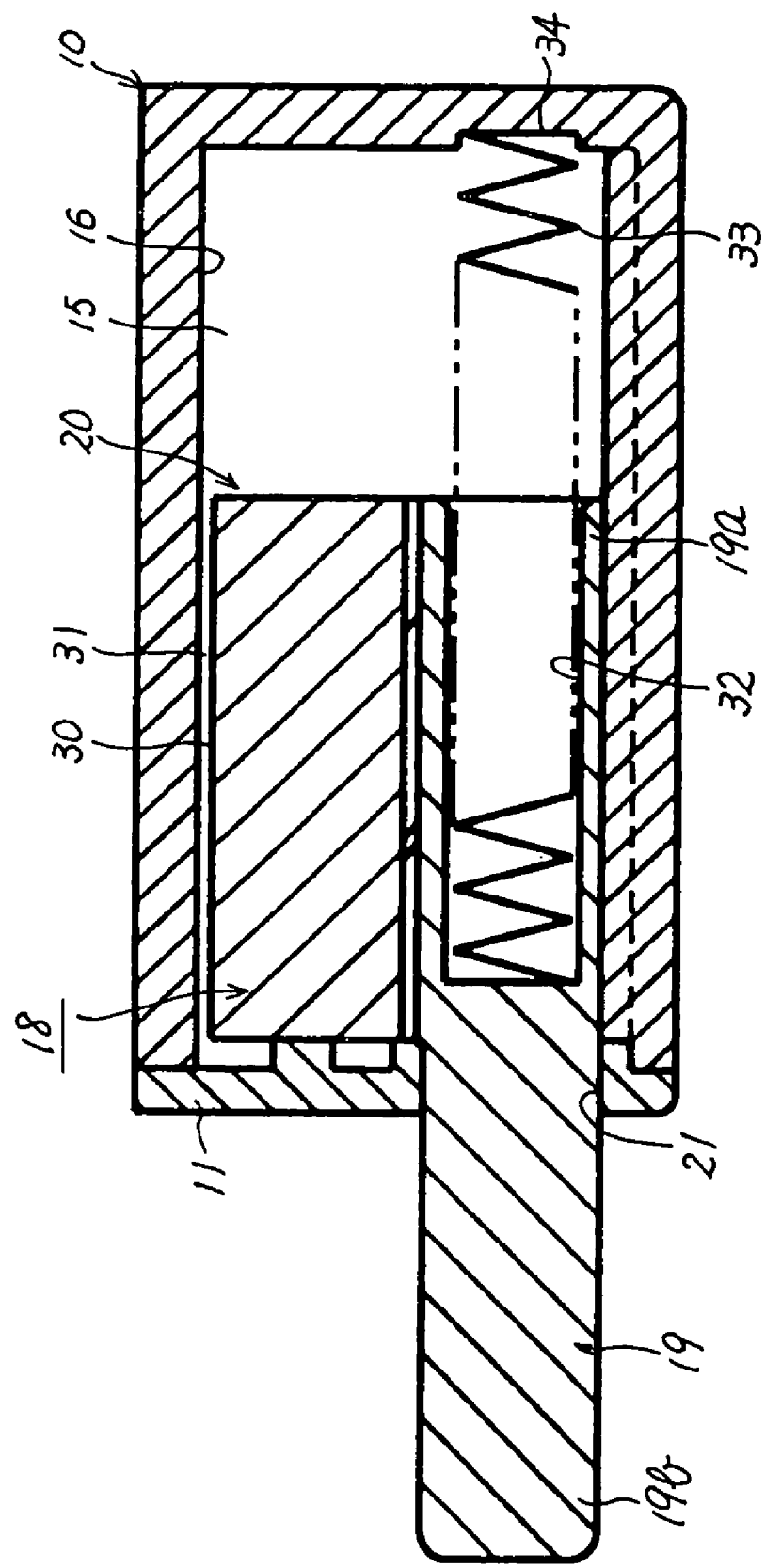
FIG. 22 is a sectional view through section XXII-XXII of FIG. 20.
Figure 23:
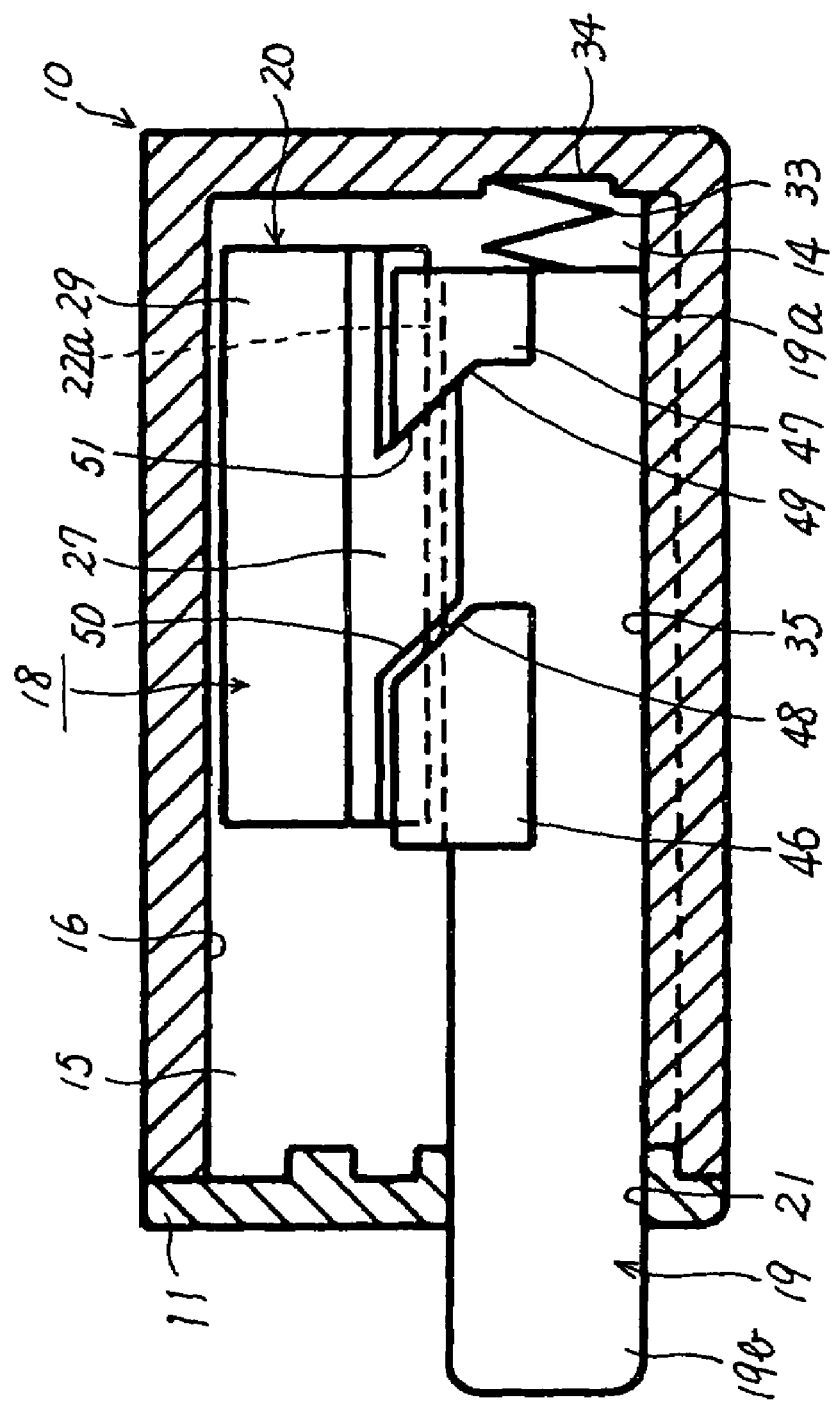
FIG. 23 is a partial sectional view showing the slider when moved from the position illustrated in FIG. 19.

As shown in FIG. 22, the first moving member 19 has a spring-receiving hole 32 formed therein along the axis thereof to receive a spring 33 as in the case of the third embodiment. An end of the spring 33 fitted into the spring-receiving hole 32 is aligned with a recess 34 formed in the closed end of the casing body 10 in order to allow for the action of an initial load pressing the first moving member 19 toward the cap 11.

As shown in FIG. 20 the second moving member 20 has a sliding face 26. The width of the sliding face 26 is equal to that of the sliding face 22a of the first moving member 19. Paired guiding portions 27 protrude individually adjacent to the sides of the sliding face 26. The space between the paired guiding portions 27 is approximately equal to the width of the raised plate-shaped portion 22 of the first moving member 19 as in the case of the aforementioned embodiments. For this reason, during the relative movement of the first and second moving members 19 and 20, the positional relationship between the moving members 19 and 20 is also maintained in the fifth embodiment. Put another way, when the first and second moving members 19 and 20 are moved relatively, the axes of the moving members 19 and 20 are not displaced in the width direction of the sliding face 22a and the sliding face 26.

As shown in FIG. 21, each of the paired guiding portions 27 has a length in the axis direction slightly shorter than the interval between the first paired projecting portions 46 and the second paired projecting portions 47 of the first moving member 19, and has inclined faces 50 and 51 formed on the ends in the axis direction. The inclined faces 50 of the paired guiding portions 27 are individually parallel to the inclined faces 48 of the first paired projecting portions 46 when the first and second moving members 19 and 20 are placed on each other, as in the cases of the aforementioned embodiments. The inclined faces 51 are individually parallel to the inclined faces 49 of the second paired projecting portions 47.

When the first and second moving members 19 and 20 are combined together, the paired guiding portions 27 are positioned between the first paired projecting portions 46 and the second paired projecting portions, and the inclined faces 50 and 51 are face to face with the inclined faces 48 and 49 of the projecting portions 46 and 47. Note that the length of the guiding portions 27 is designed to be slightly shorter than the distance between the first and second paired projecting portions 46 and 47. For example, when the inclined faces 50 are in contact with the inclined faces 48 of the projecting portions 46, the inclined faces 51 are separated from the inclined faces 49 of the projecting portions 47 to maintain the space, whereas when the inclined faces 51 are in contact with the inclined faces 49 of the projecting portions 47, the inclined faces 50 are separated from the inclined faces 48 to maintain the space.

As shown in FIG. 19, upon the action of the force in the direction x1 on the first moving member 19, the inclined faces 48 and 50 of the moving members 19 and 20 come into contact with each other. Then the contact area is acted upon by both vertical and horizontal force components. This vertical force component results in a force y in the direction separating the moving members 19 and 20 from each other (see FIG. 19). Thus, upon the movement of the second moving member 20, the second moving member 20 slides while the force y presses the second moving member 20 against the damping groove 15 of the casing body 10. At this point, a slide resistance is produced between the second moving member 20 and the casing body 10, so that the force in the direction x2 acts on the second moving member 20.

Then, when the force in the direction x1 shown in FIG. 19 is removed, the slider 18 returns to the normal position by the spring force of the spring 33. At this point, the inclined faces 48 and 50 of the moving members 19 and 20 are separated from each other and the inclined faces 49 and 51 come into contact with each other. The inclined faces 49 and 51 in the contact state are acted upon by both vertical and horizontal force components. This vertical force component results in a force bringing the moving members 19 and 20 closer to each other, namely, a force opposite in direction to the force y.

As shown in FIG. 20, the second moving member 20 has tapering faces 29 individually facing the tapering faces 17 formed on the casing body 10, and an opposing face 30 facing the ceiling face 16 formed on the casing body 10. That is, the second moving member 20 is shaped trapezoidal in section corresponding to the damping groove 15, and yet when the second moving member 20 is inserted in the damping groove 15, a slight space 31 is formed between the ceiling face 16 and the opposing face 30. Hence, the force y acts when the space 31 is created, whereupon the second moving member 20 is engaged more strongly in the damping groove 15 to further increase the frictional force between the tapering faces 29 of the second moving member 20 and the tapering faces 17 of the damping groove 15. The tapering faces 29 and the opposing face 30 designed as described above form the damping portion of the present invention.

In turn, in the casing body 10, the arc-shaped lower portion of the cylindrical portion 14 is provided with a supporter 35 formed in an arc shape of the same curvature as the coupling portion 19a and the working portion 19b of the first moving member 19 as in the cases of the aforementioned embodiments. The coupling portion 19a and the working portion 19b are placed on the supporter 35 so structured, so that the contact area between the casing body 10 and the first moving member 19 is reduced to decrease the slide resistance between them.

For insertion of the first moving member 19 and the second moving member 20 into the casing body 10 as described above, the moving members 19 and 20 are combined under the circumstances of the sliding faces 22a and 26 of the moving members 19 and 20 being aligned with each other, and the inclined faces 48 and 50 of the moving members 19 and 20 and also the inclined faces 49 and 51 being positioned face to face with each other. This combination of the moving members 19 and 20 constitutes the slider 18 of the present invention.

In such a slider 18, the spring 33 is pre-installed in the spring-receiving hole 32 formed in the first moving member 19 as shown in FIG. 22.

Then, the slider 18 is housed in the casing body 10: the coupling portion 19a and the working portion 19b of the first moving member 19 are inserted into the cylindrical portion 14, and the second moving member 20 with the extending spring 33 preinstalled in the spring-receiving hole 32 is fitted in the damping groove 15 of the casing body 10.

After completion of the insertion of the slider 18 into the casing body 10 in the foregoing manner, the casing body 10 is closed by the cap 11. At this point, the working portion 19b protrudes from the shaft hole 21 of the cap 11, and the pallets of the hooks (not shown) of the cap 11 are engaged with engaging recesses (not shown) of the casing body 10. Thus, the slider 18 is prevented from separating from the casing body 10.

Because the spring 33 inserted in the first moving member 19 is extended, the spring force of the spring 33 also acts on the second moving member 20 via the inclined faces 49 and 51. Hence, each of the first and second moving members 19 and 20 are maintained in the normal position shown in FIGS. 19 and 22 by the spring force of the spring 33. Put another way, in the normal position the second moving member 20 is in contact with the cap 11, and the working portion 19b protrudes outward from the shaft hole 21 formed in the cap 11. At this point, the raised plated-shaped portion 22 is up against the cap 11 to prevent the first moving member 19 from being detached from the casing body 10.

The following is the relative relationship between the casing body 10 and each of the components of the slider 18 when the slider 18 is inserted into the casing body 10 as described above.

When the slider 18 is inserted into the casing body 10 in the foregoing manner, in the normal position shown in FIG. 19, the second moving member 20 is positioned to bring the inclined faces 51 into contact with the inclined faces 49 of the first moving member 19, and also bring the tapering faces 29 of the second moving member 20 into contact with the tapering faces 17 formed on the casing body 10.

The second moving member 20 is thus fitted into the damping groove 15 of the casing body 10, and the tapering faces 29 and the tapering faces 17 are in contact with each other. Under these circumstances, a space 31 as shown in FIG. 20 is created between the ceiling face 16 formed in the damping groove 15 and the opposing face 30 formed on the second moving member 20 as described earlier. The formation of the space 31 allows the second moving member 20 to move in the depth direction of the damping groove 15.

Further, a supporter 35 is formed in the bottom portion of the cylindrical portion 14, and has the same curvature as the coupling portion 19a and the working portion 19b. For this reason, the coupling portion 19a and the working portion 19b are able to slide while being supported by the supporter 35.

Next, the operation in the fifth embodiment will be described.

The slider 18 is in the normal position illustrated in FIG. 19, in which contact is made between the inclined faces 49 and 51 and the space between the inclined faces 48 and 50 is maintained. In this position, the force in the direction x1 acts on the working portion 19b, whereupon the first moving member 19 moves in the direction x1 against the spring force of the spring 33. Upon the movement of the first moving member 19, the inclined faces 48 and 50 come into the contact state and the inclined faces 49 and 51 are separated to maintain the space therebetween.

During such a contact state between the inclined faces 48 and 50, if the first moving member 19 is moved further in the direction x1, the moving force is transferred via the inclined faces 48 and 50 to the second moving member 20 to move the second moving member 20 together with the first moving member 19. The slide resistance thus produced between the damping portion and the damping groove 15 affects the second moving member 20. As a result, the second moving member 20 is acted upon by the force in the direction x1 which is the moving force of the first moving member 19 and the force in the direction x2 which is provided by the slide resistance. The force in the direction x1 and the force in the direction x2 are opposite to each other. Hence, the vertical force component and the horizontal force component act between the inclined faces 48 and 50. When the vertical force component thus acts on the second moving member 20, the second moving member 20 is pressed against the damping groove 15 of the casing body 10. This is because the first moving member 19 is supported by the supporter 35 so as to be incapable of moving further in the direction at right angles to the axis.

When the force pushing up the second moving member 20 toward the damping groove 15 comes into action as described above, consequently the second moving member 20 in particular is moved to press the tapering faces 29 thereof into the tapering faces 17 of the damping groove 15 on the same principle as in the case of driving in a wedge. The pressing force thus produced results in a slide resistance on the part of the second moving member 20. This slide resistance on the part of the second moving member 20 is exerted also on the first moving member 19 as a slide resistance. Hence, the slide resistance produced at this point serves as a braking force to exert the damping effect.

However, this damping force varies with the magnitude of the force acting on the first moving member 19 and the moving speed. Specifically, with a large force and a high moving speed, the second moving member 20 is strongly pressed against the damping groove 15 in one stroke. Thus a large braking force, i.e., a damping force, is exerted at a fast pace. On the other hand, when the force acting on the first moving member 19 is small and the moving speed is slow, the second moving member 20 is gradually pressed against the damping groove 15 at a slow pace. Thus, the braking force, i.e., the damping force gradually increases in accordance with the stroke.

The fact that the conditions of exerting the damping force vary with the moving speed and the magnitude of the force as described above means that it is possible to provide an appropriate damping force at all times according to the use of the damper or the circumstances of use.

After the slider 18 has moved forward inside the casing body 10 while exerting the damper effect, the force acting on the working portion 19b decreases so as to be lower than the spring force of the spring 33. Thereupon, the spring force of the spring 33 moves the first moving member 19 in the direction of returning to the normal position illustrated in FIG. 23. At this point, the inclined faces 48 and 50 are separated from each other, and the inclined faces 49 and 51 come in contact with each other. Thus, a vertical force component and a horizontal force component are produced between the inclined faces 49 and 51. Note that the vertical force component is opposite in direction to the force y.

When the slider 18 is returned by the spring force of the spring 33, the second moving member 20 is acted upon by a force bringing the moving member 20 closer to the moving member 19. This force serves as a force in the direction of disconnecting the second moving member 20 from the damping groove 15, to reduce the force pressing the second moving member 20 against the damping groove 15. Along with the reduction in the pressing force, the braking force is reduced. Thus, the slider 18 is able to return smoothly to the normal position by the spring force of the spring 33.

According to the fifth embodiment just described, in addition to the same effects as those in the first embodiment which can naturally be expected, it is possible to achieve the further effect that at the returning stage the damping portion is positively separated from the damping groove 15 for the smooth movement of the slider 18. That is, it is possible to make the return speed of the slider 18 faster to prepare for receiving the next impact force.

In the fifth embodiment, the damping groove 15 is provided in the casing body 10 and the damping portion is provided in the slider 18. However, a damping portion may be provided in the casing body 10 and a damping groove may be provided in the slider 18 as in the case of the second embodiment.

In the fifth embodiment, the paired tapering faces 17 are formed for the side faces of the damping groove 15, but it is possible for one of the side faces to be formed as a tapering face, and for the other to be formed as a straight face, for example. Whichever the case, what is required is for the inner width of the damping groove 15 to be gradually tapered in the depth direction or the opening direction thereof. In this case, the shape of the damping portion of the second moving member 20 must correspond to the shape of the damping groove 15.

Further, the inclined faces 48 of the first moving member 19 and the inclined faces 50 of the second moving member 20 constitute the conversion mechanism according to the present invention, but the inclined faces may be provided in one of the first and second moving members 19 and 20. In this respect, the fifth embodiment is the same as the first embodiment.

The inclined faces 49 of the first moving member 19 and the inclined faces 51 of the second moving member 20 constitute the release mechanism according to the present invention, but the inclined faces may be provided in one of the first and second moving members 19 and 20 as in the case of the conversion mechanism. In this respect, the relationship between the inclined faces 49 and 51 is the same as that between the inclined faces 48 and 50 forming the conversion mechanism.

Although in the foregoing the inclined faces 48 and 49 are designed in parallel to each other and the inclined faces 50 and 51 are designed in parallel to each other, these parallel positioning of the inclined faces are not necessarily required. The essential requirement is that the inclined face 48 should be face to face with the inclined face 50 and the inclined faces 48 and 50 should be able to create a force pressing the second moving member 20 against the damping groove 15. Further the inclined face 49 should be face to face with the inclined face 51 and the inclined faces 49 and 51 should be able to remove the pressing force.

FIG. 24 to FIG. 29 illustrate a sixth embodiment according to the present invention.

Figure 24:
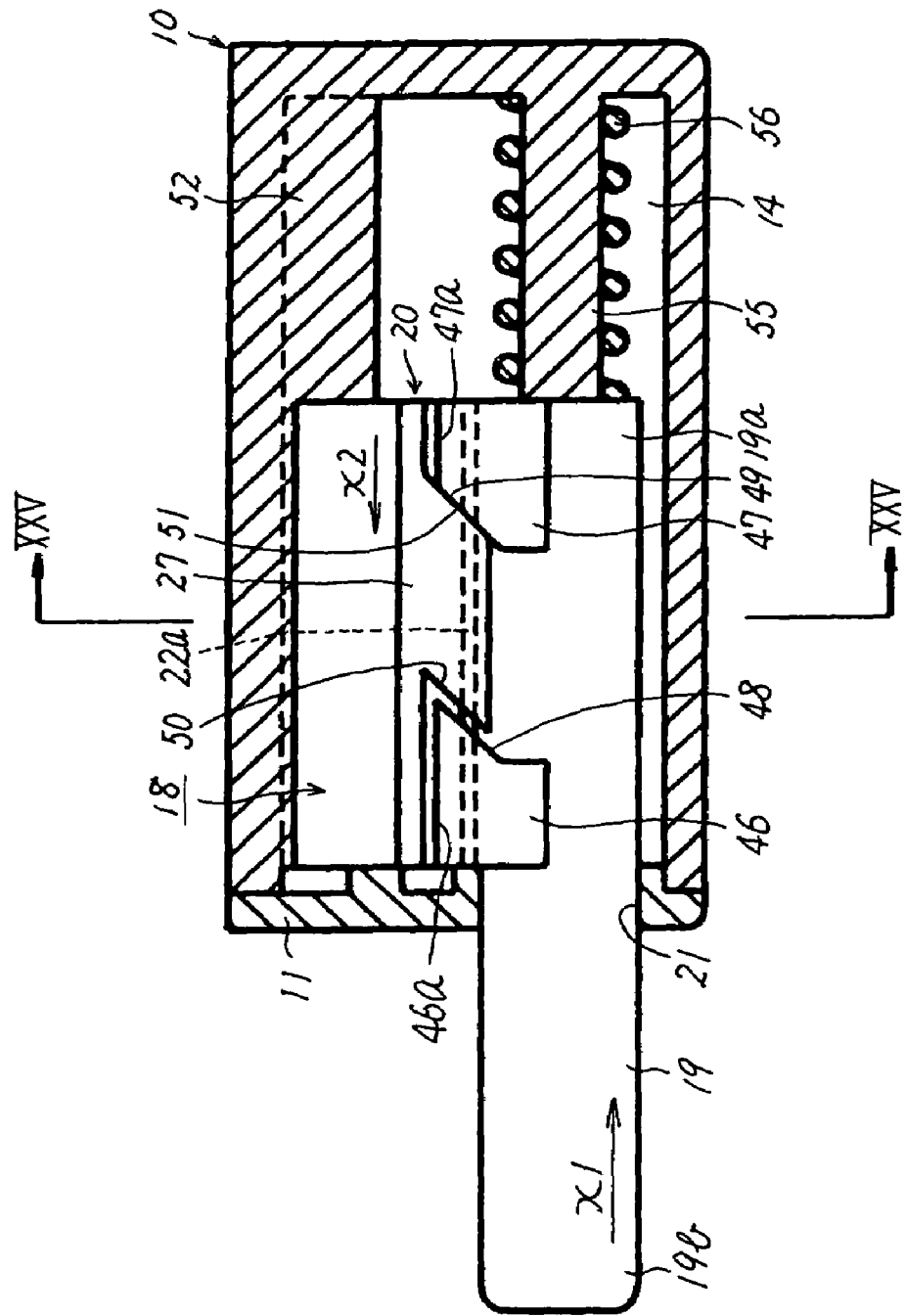
FIG. 24 is a partial sectional view of a sixth embodiment.

As shown in FIG. 24, a casing according to the present invention is constituted of a cylindrical-shaped casing body 10 and a cap 11. The casing body 10 has a closed end and an open end having an opening closed with the cap 11.

The casing body 10 includes a cylindrical portion 14 extending in the axis direction thereof, and a damping portion 52 formed on the ceiling face thereof opposing the cylindrical portion 14. The cylindrical portion 14 and the damping portion 52 have the axes parallel to each other but the axis of the damping portion 52 is eccentric with respect to the cylindrical portion 14. The cylindrical portion 14 has an arc-shaped inner bottom portion formed opposite the damping portion 52 as shown in FIG. 25.

Figure 25:
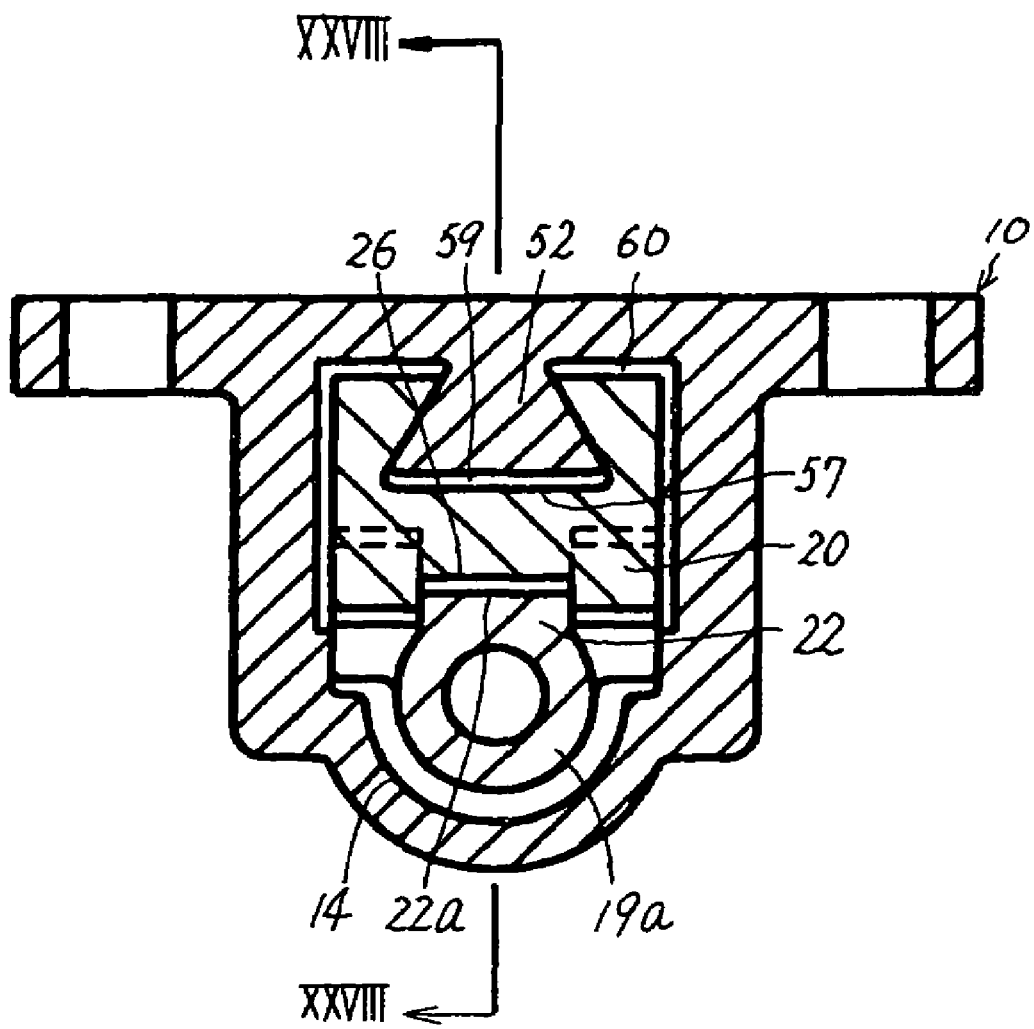
FIG. 25 is a sectional view through section XXV-XXV of FIG. 24.
Figure 26:
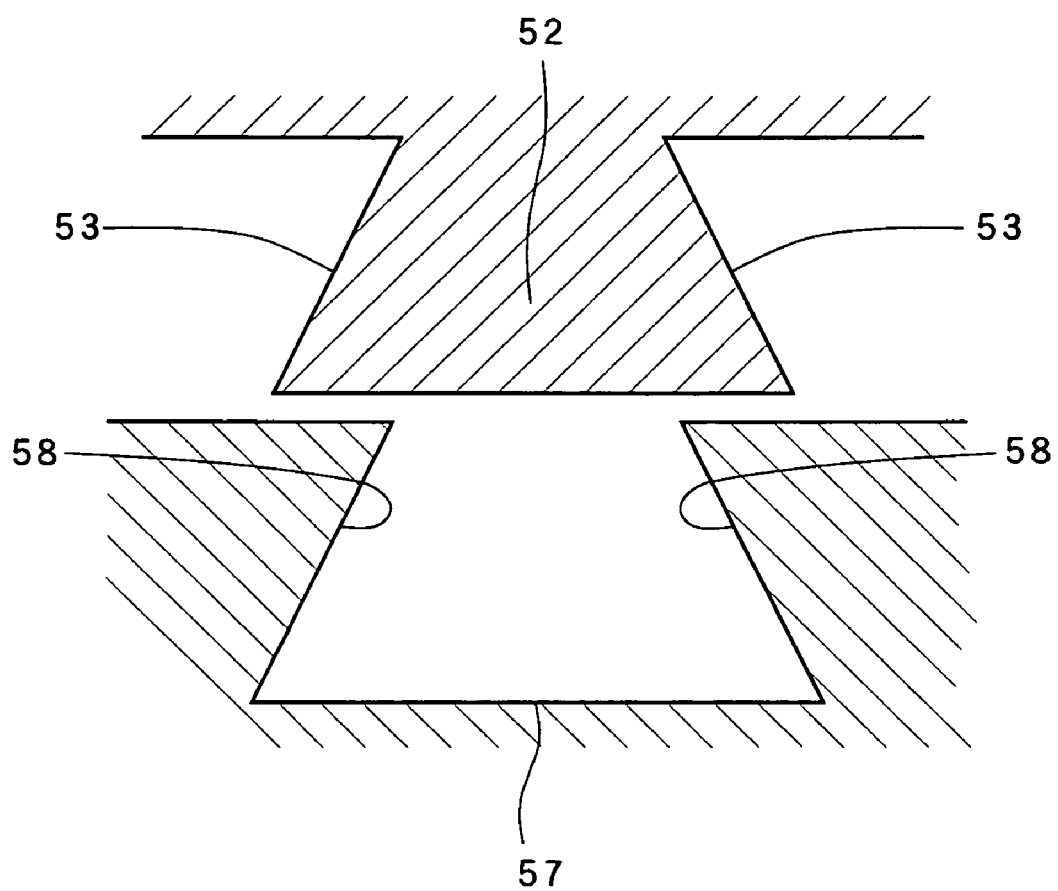
FIG. 26 is a diagram illustrating a damping portion and a damping groove in the sixth embodiment.

As is clear from FIG. 25, the damping portion 52 includes a projection projecting downward from the ceiling of the casing body 10. The damping portion 52 has, as shown in FIG. 26, side faces formed as tapering faces 53 that diverge downward to gradually open up the distance between the tapering faces 53 in the direction of the cylindrical portion 14 when the damping portion 52 is viewed in section.

A slider 18 is inserted into the casing body 10 with allowance for the sliding movement as illustrated in FIG. 24. The slider 18 includes a first moving member 19 and a second moving member 20.

The first moving member 19 has a coupling portion 19a and a working portion 19b acted upon by a force. The coupling portion 19a and the working portion 19b are integrally formed of a single shaft and naturally use the same axis. The working portion 19b protrudes toward the outside from a shaft hole 21 formed in the cap 11 when the first moving member 19 is fitted in the casing body 10.

As in the case of the aforementioned embodiments, a raised plate-shaped portion 22 extends along the axis on the coupling portion 19a, and has a flat sliding face 22a formed thereon as shown in FIG. 25. Firstly paired projecting portions 46 are provided opposite each other on both sides of the raised plate-shaped portion 22, and secondly paired projecting portions 47 are similarly provided at an interval from the first paired projecting portions 46 on both the sides thereof.

Figure 27:
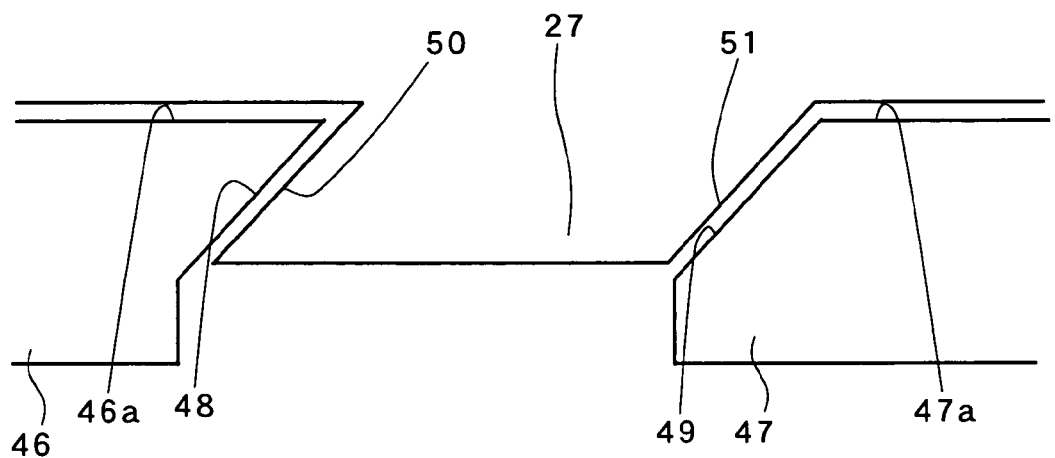
FIG. 27 is a diagram illustrating a projecting portion and a guiding portion in the sixth embodiment.

As shown in FIGS. 24 and 27, the first paired projecting portions 46 are provided adjacent to the working portion 19b, and have the tops 46a at a higher level than the sliding face 22a, that is, the tops 46a protrude toward the second moving member 20. As shown in FIG. 27, an inclined face 48 is formed continuously from the top 46a on each of the projecting portions 46, and forms an acute angle with the end edge of the top 46a close to the leading end of the coupling 19a.

The second paired projecting portions 47 are located closer to the leading end of the coupling portion 19a with respect to the first paired projecting portions 46. Similar to the first paired projecting portions 46, the tops 47a of the projecting portions 47 are at a higher level than the sliding face 22a, that is, the tops 47a protrude toward the second moving member 20. Each of the projecting portions 47 has an inclined face 49 formed continuously from the top 47a.

Each of the inclined faces 49 is parallel to each of the inclined faces 48 formed on the first paired projecting portions 46.

Figure 28:
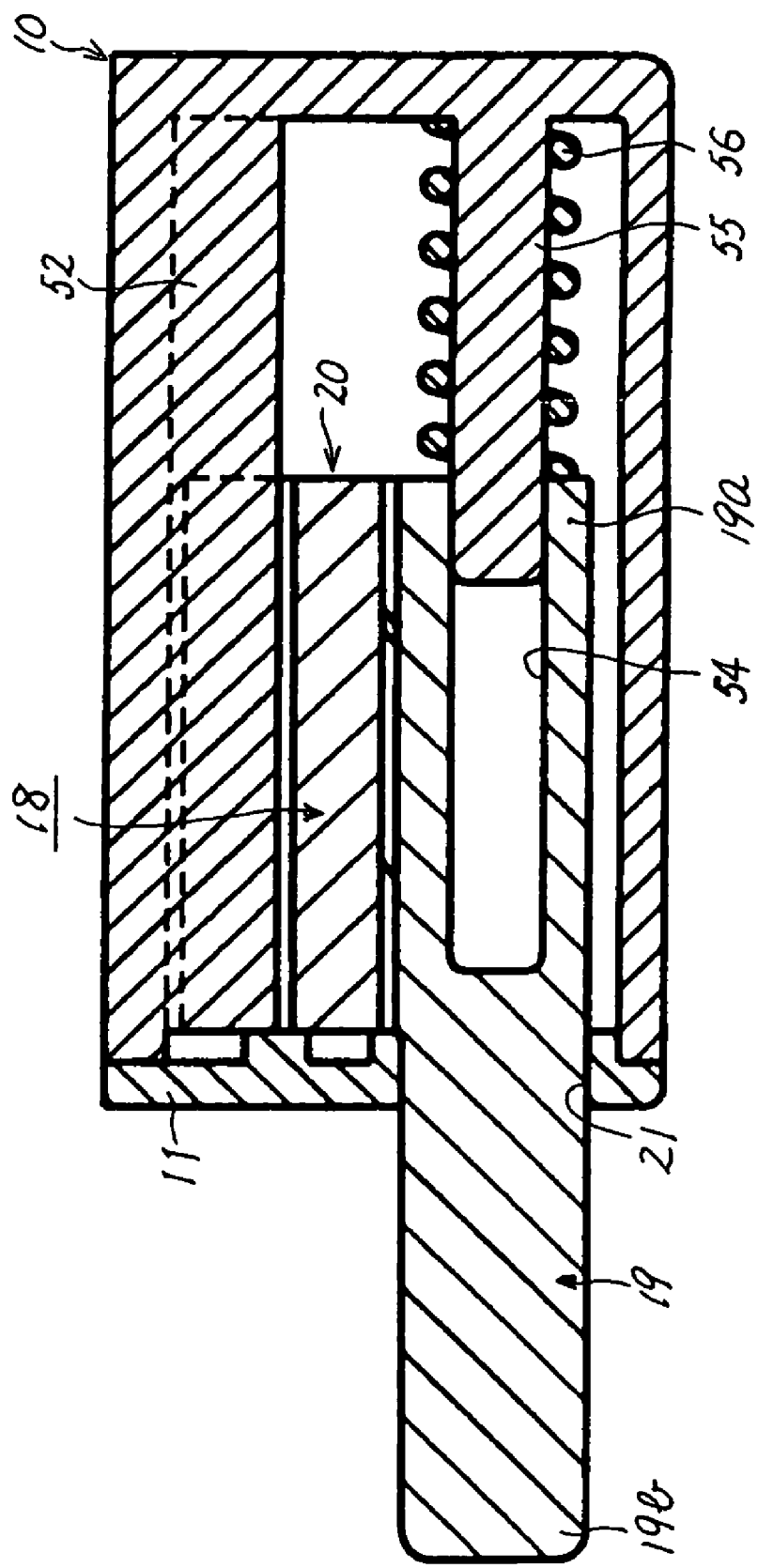
FIG. 28 is a sectional view through section XXVIII-XXVIII of FIG. 25.

As shown in FIG. 28, the first moving member 19 has a shaft hole 54 extending along the axis direction. The shaft hole 54 receives the insertion of a support shaft 55 fixed to the lower portion of the casing body 10, and allows for the movement relative to the support shaft 55. Such a manner of inserting the support shaft 55 into the shaft hole 54 prevents the floating of the first moving member 19 toward the second moving member 20. A spring 56 is provided around the support shaft 55 to allow for the action of an initial load pressing the first moving member 19 toward the cap 11.

As shown in FIG. 25, the second moving member 20 has a sliding face 26. The width of the sliding face 26 is equal to that of the sliding face 22a of the first moving member 19 as in the cases of the aforementioned embodiments. Paired guiding portions 27 protrude individually adjacent to the sides of the sliding face 26. The space between the paired guiding portions 27 is approximately equal to the width of the raised plate-shaped portion 22 of the first moving member 19 as in the case of the aforementioned embodiments. For this reason, during the relative movement of the first and second moving members 19 and 20, the positional relationship between the moving members 19 and 20 is also maintained in the sixth embodiment. Put another way, when the first and second moving members 19 and 20 are moved relatively, the axes of the moving members 19 and 20 are not displaced in the width direction of the sliding face 22a and the sliding face 26.

As shown in FIG. 27, each of the paired guiding portions 27 has a length in the axis direction slightly shorter than the interval between the first paired projecting portions 46 and the second paired projecting portions 47 of the first moving member 19, and has inclined faces 50 and 51 formed on the ends in the axis direction. The inclined faces 50 of the paired guiding portions 27 are individually parallel to the inclined faces 48 of the first paired projecting portions 46 when the first and second moving members 19 and 20 are placed on each other, as in the cases of the aforementioned embodiments. The inclined faces 51 are individually parallel to the inclined faces 49 of the second paired projecting portions 47.

When the first and second moving members 19 and 20 are combined together, the paired guiding portions 27 are positioned between the first paired projecting portions 46 and the second paired projecting portions 47, and the inclined faces 50 and 51 are face to face with the inclined faces 48 and 49 of the projecting portions 46 and 47. Note that the length of the guiding portions 27 is designed to be slightly shorter than the distance between the first and second paired projecting portions 46 and 47. For example, when the inclined faces 50 are in contact with the inclined faces 48 of the projecting portions 46, the inclined faces 51 are separated from the inclined faces 49 of the projecting portions 47 to maintain the space, whereas when the inclined faces 51 are in contact with the inclined faces 49, the inclined faces 50 are separated from the inclined faces 48 to maintain the space.

Upon the action of the force in the direction x1 on the first moving member 19, the inclined faces 48 and 50 of the moving members 19 and 20 come into contact with each other. Then the contact area is acted upon by both the vertical and horizontal force components. This vertical force component results in a force brining the second moving member 20 close to the first moving member 19. Thus, the second moving body 20 slides while approaching the first moving member 19. A slide resistance thus produced on the part of the second moving member 20 induces the action of the force in the direction x2 on the second moving member 20.

Note that because the support shaft 55 is inserted into the shaft hole 54 of the first moving member 19, even when the force brining the second moving member 20 close to the first moving member 19 is created, the first moving member 19 is not moved upward.

Then, when the force in the direction x1 shown in FIG. 24 is removed, the slider 18 returns to the normal position by the spring force of the spring 56. At this point, the inclined faces 48 and 50 of the moving members 19 and 20 are separated from each other and the inclined faces 49 and 51 come into contact with each other. The inclined faces 49 and 51 in the contact state are acted upon by vertical and horizontal force components. This vertical force component serves as a force separating the moving members 19 and 20 from each other.

As shown in FIGS. 25 and 26, the second moving member 20 includes a damping groove 57 formed in a sectional shape corresponding to that of the damping portion 52. Specifically, the side faces of the damping groove 57 are formed as tapering faces 58 between which the space tapers gradually toward the opening of the damping groove 57, that is, in the form of the so-called dovetail groove, when the damping groove 57 is viewed in section.

When the damping portion 52 is fitted into the damping groove 57 of the second moving member 20, a slight space 59 is formed between the bottom face of the damping groove 57 and the opposing face of the damping portion 52 as illustrated in FIG. 25. A space 60 is formed between the second moving member 20 and the ceiling face of the casing body 10. Because of this, the second moving member 20 is capable of moving within the spaces 59 and 60.

For insertion of the first moving member 19 and the second moving member 20 into the casing body 10 as described above, the sliding faces 22a and 26 of the moving members 19 and 20 are aligned with each other, and the inclined faces 48 and 50 and also the inclined faces 49 and 51 of the moving members 19 and 20 are positioned face to face with each other. This combination of the moving members 19 and 20 constitutes the slider 18 of the present invention. Note that the spring 56 is preinstalled before the slider 18 is inserted into the casing body 10.

Then, the slider 18 is housed in the casing body 10: the coupling portion 19a and the working portion 19b of the first moving member 19 are inserted in the cylindrical portion 14 of the casing body 10, and the damping groove 57 of the second moving member 20 is fitted over the damping portion 52, at which time the spring 59 is extended.

After completion of the insertion of the slider 18 into the casing body 10 in the foregoing manner, the casing body 10 is closed by the cap 11. At this point, the working portion 19b protrudes from the shaft hole 21 of the cap 11, and the pallets of the hooks (not shown) of the cap 11 are engaged with engaging recesses (not shown) of the casing body 10. Thus, the raised plate-shaped portion 22 is up against the cap 11 when the slider 18 is in the normal position for prevention of the slider 18 from separating from the casing body 10.

Further because the spring 56 is extended, the spring force of the spring 56 also acts on the second moving member 20 via the inclined faces 49 and 51. Hence, each of the first and second moving members 19 and 20 is maintained in the normal position shown in FIG. 24 by the spring force of the spring 56. Put another way, in the normal position the second moving member 20 is in contact with the cap 11, and the working portion 19b protrudes outward from the shaft hole 21 formed in the cap 11.

Because the first moving member 19 is supported by the shaft hole 21 and the support shaft 55, the first moving member 19 is supported stably without a backlash.

The following is the relative relationship between the casing body 10 and each of the components of the slider 18 when the slider 18 is inserted in the casing body 10 as described above.

When the slider 18 is inserted in the casing body 10 in the foregoing manner, in the normal position shown in FIG. 24, the second moving member 20 is positioned to bring the inclined faces 51 into contact with the inclined faces 49 of the first moving member 19, and also bring the tapering faces 58 of the damping groove 57 into contact with the tapering faces 53 of the damping portion 52.

Under the circumstances of the contact between the tapering faces 58 and the tapering faces 53 after the insertion of the second moving member 20 into the casing body 10 as described above, the spaces 59 and 60 are formed, whereby the second moving member 20 is capable of moving within the spaces 59 and 60.

Next the operation in the sixth embodiment will be described.

The slider 18 is in the normal position illustrated in FIG. 24, in which contact is made between the inclined faces 49 and 51 and the space between the inclined faces 48 and 50 is maintained. In this position, the force in the direction x1 acts on the working portion 19b, whereupon the first moving member 19 moves in the direction x1 against the spring force of the spring 56. Upon the movement of the first moving member 19, the inclined faces 48 and 50 come into the contact state and the inclined faces 49 and 51 are separated to maintain the space therebetween.

During this contact state between the inclined faces 48 and 50, if the first moving member 19 is moved further in the direction x1, the moving force is transferred via the inclined faces 48 and 50 to the second moving member 20 to move the second moving member 20 together with the first moving member 19. The slide resistance thus produced between the damping portion 52 and the damping groove 57 affects the second moving member 20. As a result, the second moving member 20 is acted upon by the force in the direction x1 which is the moving force of the first moving member 19 and the force in the direction x2 which is provided by the slide resistance. The force in the direction x1 and the force in the direction x2 are opposite to each other. Hence, a vertical force component and a horizontal force component are produced between the inclined faces 48 and 50. Upon such action of the vertical force component on the second moving member 20, the second moving member 20 is pulled toward the first moving member 19. At this point, the first moving member 19 is supported by the support shaft 55 so as to be incapable of moving upward.

When the second moving member 20 is pulled toward the first moving member 19 in this manner, the contact force between the tapering faces 53 of the damping portion 52 and the tapering faces 58 of the damping groove 57 is increased in intensity. This intensified contact force results in a slide resistance on the part of the second moving member 20. This slide resistance on the part of the second moving member 20 is exerted also on the first moving member 19 as a slide resistance. Hence, the slide resistance produced at this point serves as a braking force to exert the damping effect.

However, this damping force varies with the magnitude of the force acting on the first moving member 19 and the moving speed. Specifically, with a large force and a high moving speed, the tapering faces 53 of the damping portion 52 and the tapering faces 58 of the damping groove 57 are strongly pressed in one stroke. Thus, a large braking force, i.e., a damping force, is exerted at a fast pace. On the other hand, when the force acting on the first moving member 19 is small and further the moving speed is slow, the tapering faces 53 of the damping portion 52 and the tapering faces 58 of the damping groove 57 are gradually pressed at a slow pace. Thus, the braking force, i.e., the damping force gradually increases in accordance with the stroke.

The fact that the conditions of exerting the damping force vary with the moving speed and the magnitude of the force as described above means that it is possible to provide an appropriate damping force at all times according to the use of the damper or the circumstances of use.

Figure 29:
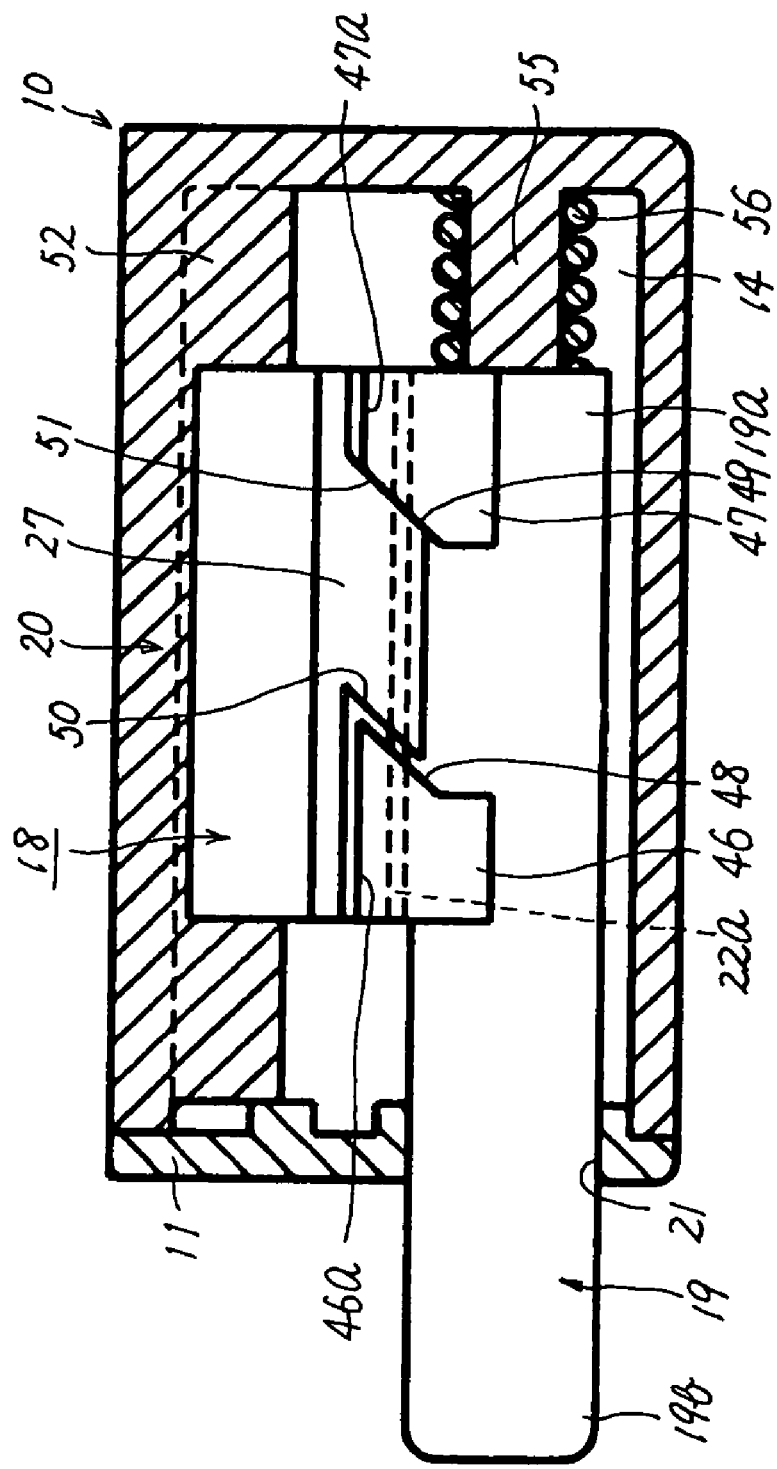
FIG. 29 is a partial sectional view showing the slider when moved from the position illustrated in FIG. 24.

After the slider 18 has moved inside the casing body 10 while exerting the damper effect, and reached the position illustrated in FIG. 29, the force acting on the working portion 19b decreases so as to be lower than the spring force of the spring 56. Thereupon, the spring force of the spring 56 moves the first moving member 19 in the direction of returning to the normal position illustrated in FIG. 24. At this point, the inclined faces 48 and 50 are separated, and the inclined faces 49 and 51 come into contact with each other. Thus, a vertical force component and a horizontal force component are exerted between the inclined faces 49 and 51. The vertical force component acts in the opposite direction to the one when it is acting between the inclined faces 48 and 50. That is, the force separating the second moving member 20 from the first moving member 19 comes into action.

Upon such action of the force separating the second moving member 20 from the first moving member 19, the contact force between the tapering faces 53 of the damping portion 52 and the tapering faces 58 of the damping groove 57 is further reduced. Along with the reduction in the contact force, the braking force is reduced. Thus, the slider 18 is able to return smoothly to the normal position by the spring force of the spring 56.

According to the sixth embodiment just described, in addition to the same effects as those in the first embodiment which can naturally be expected, it is possible to achieve the further effect that at the returning stage the damping portion is separated from the damping groove 15 for the smooth movement of the slider 18. That is, it is possible to make the return speed faster to prepare for receiving the next impact force.

In the sixth embodiment, the side faces of the damping groove 57 are formed as paired tapering faces 58, but it is possible for one of the side faces to be formed as a tapering face, and for the other to be formed as a straight face, for example. In other words, what is required is for the inner width of the damping groove 57 to be gradually tapered in the opening direction thereof. In this case, the shape of the damping portion 52 must correspond to the shape of the damping groove 57.

Further, the inclined faces 48 of the first moving member 19 and the inclined faces 50 of the second moving member 20 constitute the conversion mechanism according to the present invention, but the inclined faces may be formed in one of the first and second moving members 19 and 20. In this respect, the sixth embodiment is the same as the first embodiment.

The inclined faces 49 of the first moving member 19 and the inclined faces 51 of the second moving member 20 constitute the release mechanism according to the present invention, but the inclined faces may be provided in one of the first and second moving members 19 and 20 as in the case of the conversion mechanism. In this respect, the relationship between the inclined faces 49 and 51 is the same as that between the inclined faces 48 and 50 forming the conversion mechanism.

Although in the foregoing the inclined faces 48 and 50 are designed in parallel to each other and the inclined faces 49 and 51 are designed in parallel to each other, the parallel positioning for the inclined faces are not necessarily required. The essential requirement is that the inclined face 48 should be face to face with the inclined face 50 and the inclined faces 48 and 50 should be able to create a force pressing the damping portion 52 against the damping groove 57. Further the inclined face 49 should be face to face with the inclined face 51 and the inclined faces 49 and 51 should be able to remove the pressing force.

FIG. 30 to FIG. 33 illustrate a seventh embodiment according to the present invention.

Figure 30:
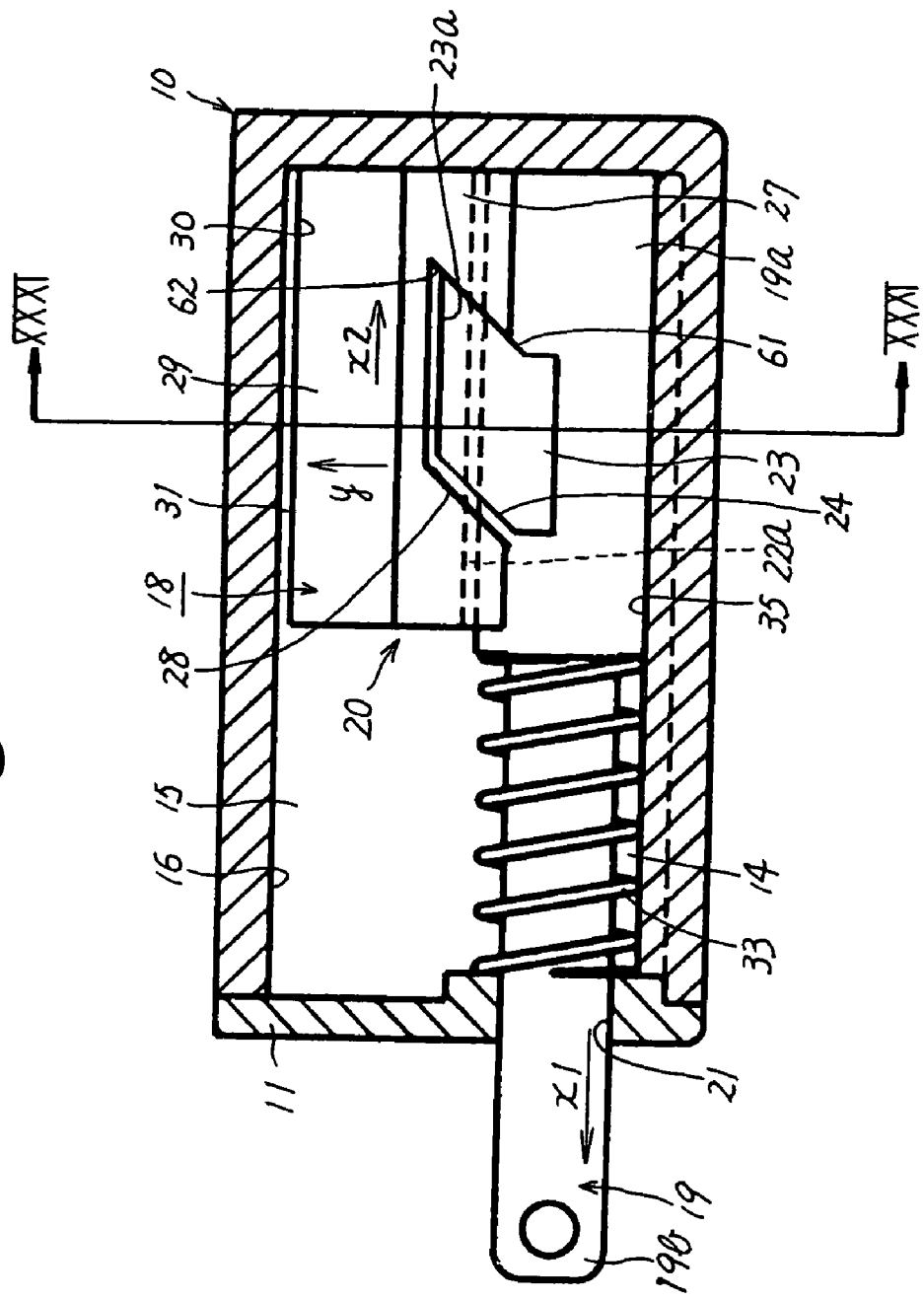
FIG. 30 is a partial sectional view of a seventh embodiment.

As shown in FIG. 30, a casing according to the present invention is constituted of a cylindrical-shaped casing body 10 and a cap 11. The casing body 10 has a closed end and an open end having an opening closed with the cap 11.

The casing body 10 includes a cylindrical portion 14 and a damping groove 15 extending in the axis direction thereof as in the case of the third embodiment. The cylindrical portion 14 and the damping groove 15 have the axes extending parallel to each other but the axis of the damping groove 15 is eccentric with respect to the cylindrical portion 14. The cylindrical portion 14 and the damping groove 15 are connected continuously to each other in the vertical direction.

The cylindrical portion 14 has an arc-shaped inner bottom portion opposite the damping groove 15. The damping groove 15 has a flat ceiling face 16 which constitutes a face opposing the cylindrical portion 14. The side faces of the damping groove 15 are formed as two tapering faces 17 between which the space opens up gradually toward the cylindrical portion 14, i.e. the opening of the damping groove 15. In other words, the damping groove 15 tapers toward the ceiling face 16 to form a trapezoid in section.

A slider 18 is inserted into the casing body 10 with allowance for the sliding movement. The slider 18 includes a first moving member 19 and a second moving member 20.

The first moving member 19 has a coupling portion 19*a* and a working portion 19*b* acted upon by a force, which are integrally formed of a single shaft and naturally use the same axis. The coupling portion 19*a* has a slightly larger diameter than that of the working portion 19*b* to create a difference in level at the boundary between them. The working portion 19*b* protrudes toward the outside from a shaft hole 21 formed in the cap 11 when the first moving member 19 is fitted in the casing body 10.

Figure 31:
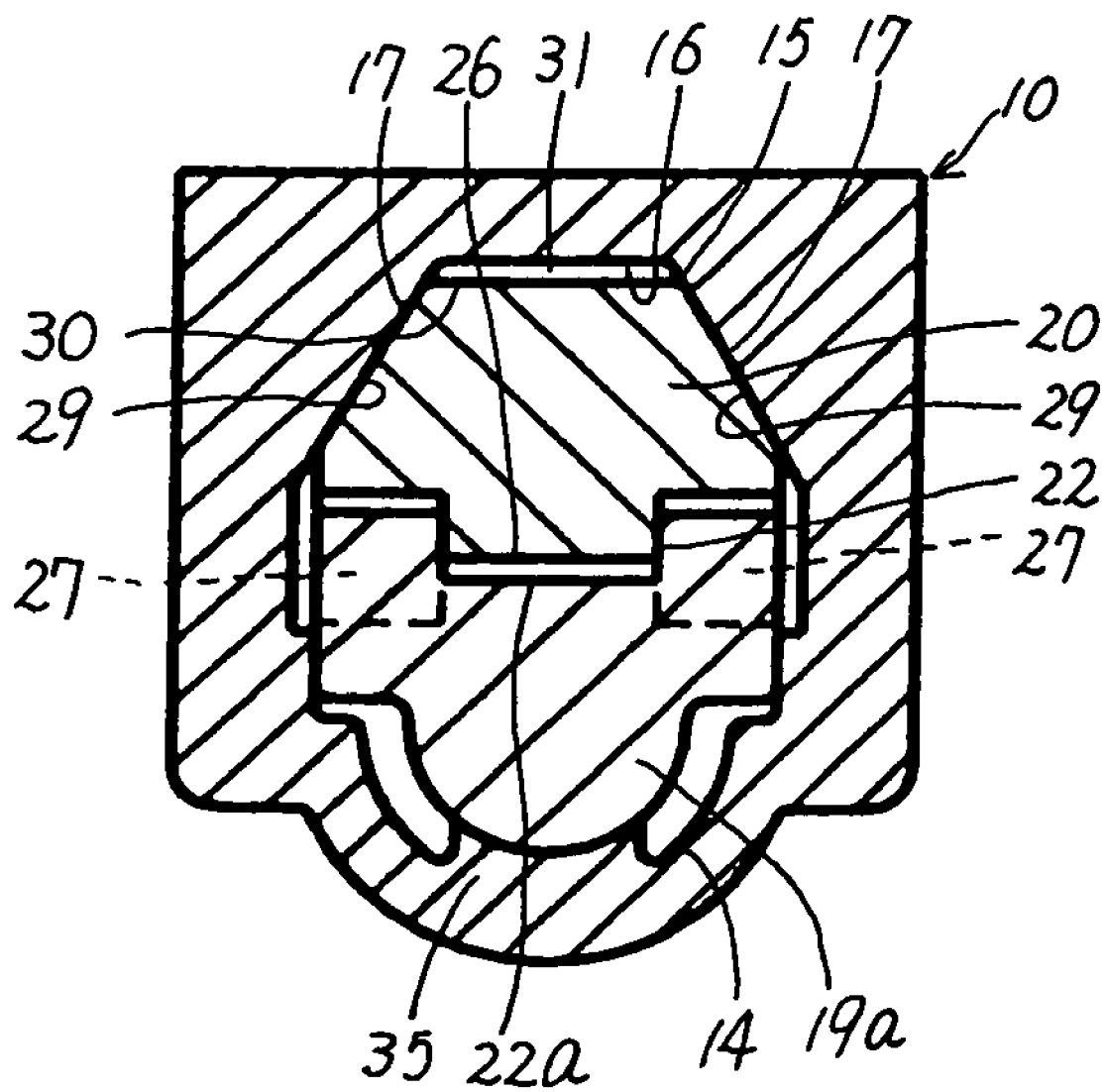
FIG. 31 is a sectional view through section XXXI-XXXI of FIG. 30.

Further, as shown in FIG. 31, a raised plate-shaped portion 22 extends along the axis on the coupling portion 19*a*, and has a flat sliding face 22*a* formed thereon. Paired projecting portions 23 are provided individually on the sides of the raised plate-shaped portion 22. Tops 23*a* of the projecting portions 23 are at a higher level than the sliding face 22*a*, that is, the tops 23*a* protrude toward the second moving member 20.

Figure 32:
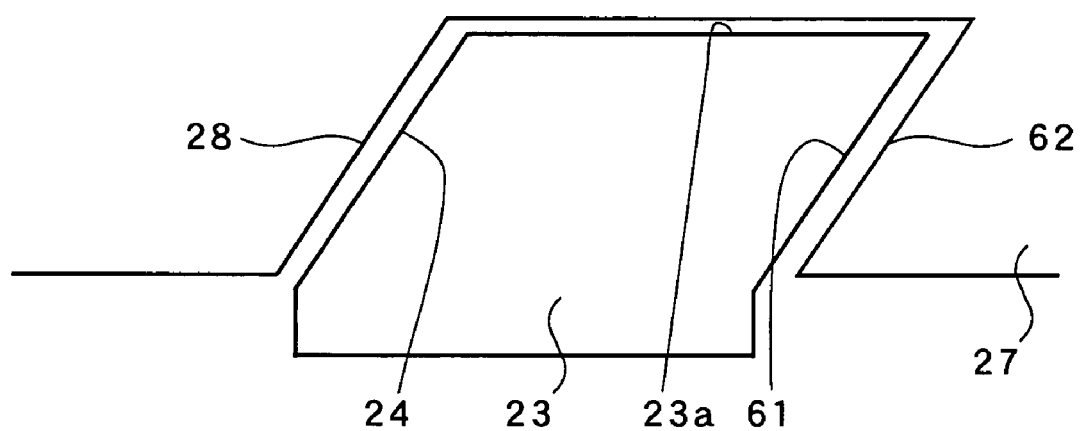
FIG. 32 is a diagram illustrating a projecting portion and a guiding portion in the seventh embodiment.

As shown in FIG. 32, each of the projecting portions 23 has a first inclined face 24 formed continuously from the top 23*a*. The first inclined face 24 is inclined gradually down from the top 23*a* toward the working portion 19*b*. On the reverse face of the first inclined face 24 of each projecting portion 23, a second inclined face 61 is formed parallel to the first inclined face 24.

A spring 33 is provided around the working portion 19*b* of the first moving member 19. The spring 33 is provided between the cap 11 and the coupling portion 19*b* to exert a force pressing the slider 18 against the closed end of the casing body 10. Hence, the slider 18 is in contact with the closed end of the casing body 10 when in its normal position as shown in FIG. 30.

As shown in FIG. 31, the second moving member 20 has a sliding face 26. The width of the sliding face 26 is equal to that of the sliding face 22*a* of the first moving member 19. Paired guiding portions 27 protrude individually adjacent to the sides of the sliding face 26. The space between the paired guiding portions 27 is approximately equal to the width of the raised plate-shaped portion 22 of the first moving member 19. In other words, as shown in FIG. 31, when the first and second moving members 19 and 20 are laid over each other with an exact alignment between the sliding faces 22*a* and 26, the raised plate-shaped portion 22 is fitted between the paired guiding portions 27 with allowance for the sliding movement. Hence, during the relative movement of the first and second moving members 19 and 20, the positional relationship between the moving members 19 and 20 is maintained. Put another way, when the first and second moving members 19 and 20 are moved relatively, the axes of the moving members 19 and 20 are not displaced in the width direction of the sliding face 22*a* and the sliding face 26.

Each of the paired guiding portions 27 has a third inclined face 28 formed to face the corresponding first inclined face 24 formed on the first moving member 19 when the first and second moving members 19 and 20 are laid over each other, in which case the first and third inclined faces 24 and 28 are allowed to come face to face with each other. Each of the paired guiding portions 27 further has a fourth inclined face 62 formed to face the corresponding second inclined face 61 of the first moving member 19 when the first and second moving members 19 and 20 are laid over each other, as shown in FIG. 32. The fourth inclined face 62 is parallel to the third inclined face 28, and allowed to come face to face with the second inclined face 61 of the first moving member 19 when the first and second moving members 19 and 20 are laid over each other.

Regarding to the relationship between the inclined faces 24, 28, 61 and 62, while the first and third inclined faces 24 and 28 are in contact with each other, the space between the second and fourth inclined faces 61 and 62 is maintained, whereas while the second and fourth inclined faces 61 and 62 are in contact, the space between the first and third inclined faces 24 and 28 is maintained. Then when both the moving members 19 and 20 are in the normal position shown in FIG. 30, the second and fourth inclined faces 61 and 62 are in contact, and the first and third inclined faces 24 and 28 are separated to form the space.

The first and second moving members 19 and 20 are combined to form the slider 18.

When the slider 18 is in the normal position, the first moving member 19 is acted upon by a force in the direction x1, namely, a force in the direction pulling the first moving member 19 out of the casing body 10, whereupon the first and third inclined faces 24 and 28 come into contact with each other and the second and fourth inclined faces 61 and 62 are separated. Accordingly, the moving force of the first moving member 19 is transferred via the first and third inclined faces 24 and 28 to the second moving member 20 to cause movement of the slider 18 in the direction x1.

Upon the movement of the first and second moving members 19 and 20 in the direction x1, the first and third inclined faces 24 and 28 are acted upon by the vertical force component and the horizontal force component. Then the vertical force component results in a force y in the direction separating the moving members 19 and 20 from each other. The force y moves the second moving member 20, so that the second moving member 20 slides along the inner surface of the casing body 10, at which time a slide resistance is produced to induce a force in the direction x2.

Figure 33:
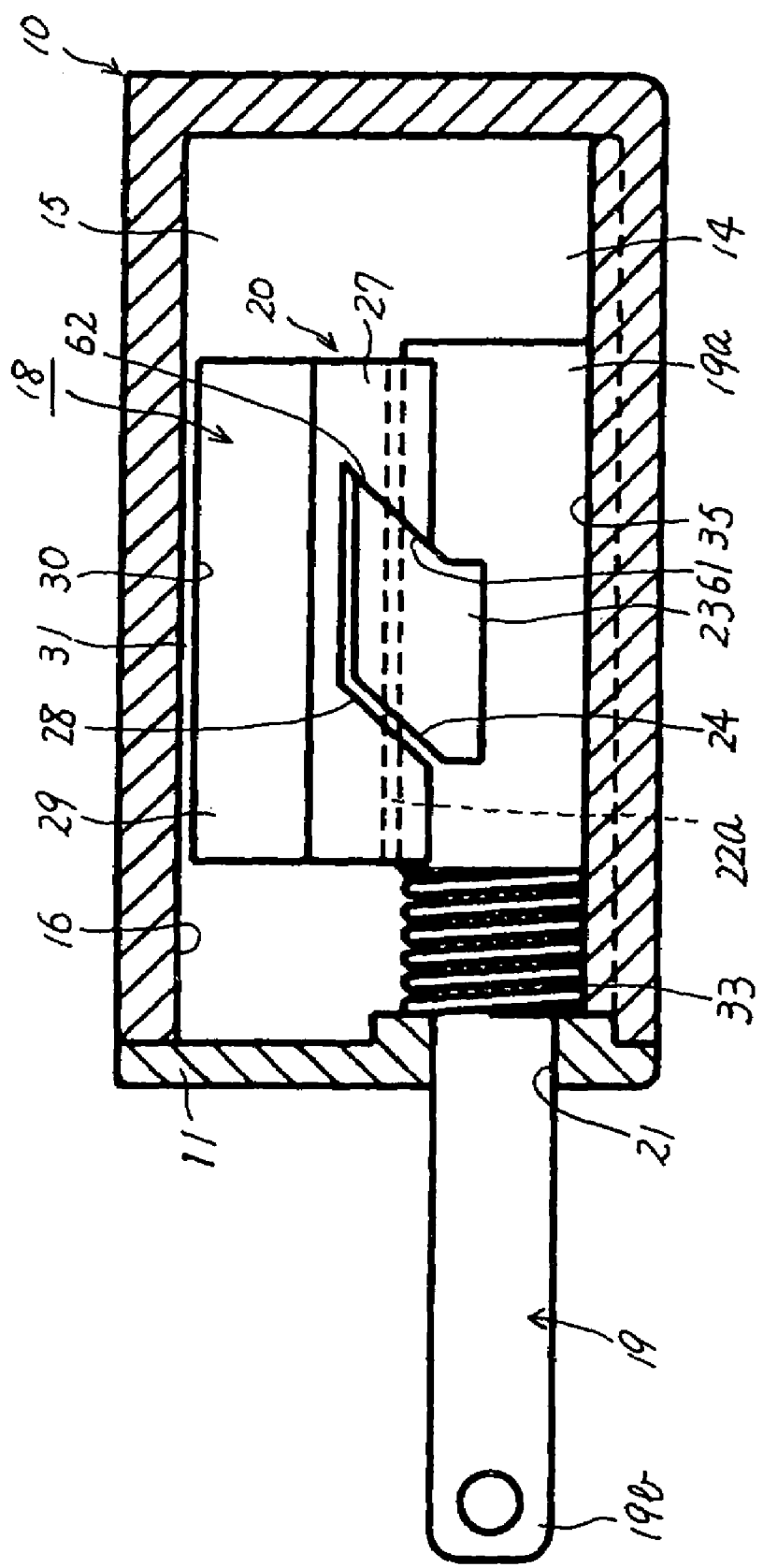
FIG. 33 is a partial sectional view showing the slider when moved from the position illustrated in FIG. 30.

Then, when the force in the direction x1 shown in FIG. 30 is removed, the spring force of the spring 33 returns the slider 18 to the normal position. In this event, the first and third inclined faces 24 and 28 of the moving members 19 and 20 separate from each other and the second and fourth inclined faces 61 and 62 come into contact with each other as illustrated in FIG. 33. The contacting second and fourth inclined faces 61 and 62 are acted upon by vertical and horizontal force components. However, the vertical force component serves as a force brining the moving members 19 and 20 close to each other, namely, a force opposite in direction to the force y.

Further, the second moving member 20 has tapering faces 29 individually facing the tapering faces 17 formed on the casing body 10, and an opposing face 30 facing the ceiling face 16 formed on the casing body 10. That is, the second moving member 20 is shaped trapezoidal in section corresponding to the damping groove 15, and yet when the second moving member 20 is inserted in the damping groove 15, a slight space 31 is formed between the ceiling face 16 and the opposing face 30. Hence, the force y acts when the space 31 is created, whereupon the second moving member 20 is engaged more strongly in the damping groove 15 to further increase the frictional force between the tapering faces 29 of the second moving member 20 and the tapering faces 17 of the damping groove 15. The tapering faces 29 and the opposing face 30 designed as described above form the damping portion of the present invention.

In turn, in the casing body 10, the arc-shaped lower portion of the cylindrical portion 14 is provided with a supporter 35 formed in an arc shape of the same curvature as the coupling portion 19a and the working portion 19b of the first moving member 19. The coupling portion 19a and the working portion 19b are placed on the supporter 35, so that the contact area between the casing body 10 and the first moving member 19 is reduced to decrease the slide resistance between them.

Then, the slider 18 is housed in the casing body 10: the coupling portion 19a and the working portion 19b of the first moving member 19 are inserted in the cylindrical portion 14 of the casing body 10, and the second moving member 20 is fitted in the damping groove 15 of the casing body 10.

After completion of the insertion of the slider 18 into the casing body 10, the casing body 10 is closed by the cap 11. Then pallets (not shown) formed on the cap 11 are engaged with the corresponding engaging recesses (not shown) formed on the casing body 10. Because of this engagement between the pallets of the cap 11 and the engaging recesses of the casing body 10, the cap 11 is prevented from separating from the opening of the casing body 10. At this point, the spring 33 is somewhat extended to exert an initial load on the slider 18. Because of this initial load, the slider 18 is maintained in the normal position shown in FIG. 30.

Because the spring 33 inserted in the first moving member 19 is extended, the spring force of the spring 33 acts on the second moving member 20 via the second and fourth inclined faces 61 and 62. Hence, each of the first and second moving members 19 and 20 is maintained in the normal position by the spring force of the spring 33. Put another way, in the normal position the second moving member 20 is in contact with the closed end of the casing body 10, and the working portion 19b protrudes outward from the shaft hole 21 formed in the cap 11.

The following is the relative relationship between the casing body 10 and each of the components of the slider 18 when the slider 18 is inserted in the casing body 10 as described above.

When the slider 18 is inserted in the casing body 10 in the foregoing manner, in the normal position shown in FIGS. 30 and 31, the fourth inclined faces 62 of the second moving member 20 are in contact with the second inclined faces 61 of the first moving member 19, and the tapering faces 29 of the second moving member 20 are in contact with the tapering faces 17 formed on the casing body 10.

The second moving member 20 is fitted into the damping groove 15 of the casing body 10, and the tapering faces 29 and the tapering faces 17 are in contact with each other. Under these circumstances, the space 31 is created between the ceiling face 16 formed in the damping groove 15 and the opposing face 30 formed on the second moving member 20 as described earlier. The creation of the space 31 allows the second moving member 20 to move in the depth direction of the damping groove 15.

Further, the supporter 35 is formed in the bottom portion of the cylindrical portion 14, and has the same curvature as the coupling portion 19a and the working portion 19b. For this reason, the coupling portion 19a and the working portion 19b are able to slide while being supported by the supporter 35.

Next, the operation in the seventh embodiment will be described.

The slider 18 is in the normal position illustrated in FIG. 30, in which contact is made between the second and fourth inclined faces 61 and 62 and the space between the first and third inclined faces 24 and 28 is maintained. In this position, the force in the direction x1 acts on the working portion 19b, whereupon the first moving member 19 moves in the direction x1 against the spring force of the spring 33. Upon the movement of the first moving member 19, the first and third inclined faces 24 and 28 come into the contact state and the second and fourth inclined faces 61 and 62 are separated to maintain the space.

During such a contact state between the first and third inclined faces 24 and 28, if the first moving member 19 is moved further in the direction x1, the moving force is transferred via the first and third inclined faces 24 and 28 to the second moving member 20, to move the second moving member 20 together with the first moving member 19. A slide resistance thus produced between the damping portion and the damping groove 15 affects the second moving member 20. As a result, the second moving member 20 is acted upon by the force in the direction x1 which is the moving force of the first moving member 19 and the force in the direction x2 which is provided by the slide resistance, in which the force in the direction x1 is opposite to the force in the direction x2. Hence, a vertical force component and a horizontal force component are produced between the first and third inclined faces 24 and 28. When the vertical force component thus acts on the second moving member 20, the second moving member 20 is pressed against the damping groove 15 of the casing body 10 by the action of the force y. This is because the first moving member 19 is supported on the supporter 35 so as to be incapable of moving further in the direction at right angles to the axis.

When the force of pushing up the second moving member 20 toward the damping groove 15 comes into action, the tapering faces 29 of the second moving member 20, in particular, are consequently pressed into the tapering faces 17 of the damping groove 15 on the same principle as in the case of driving in a wedge. The pressing force thus produced results in a slide resistance on the part of the second moving member 20. This slide resistance on the part of the second moving member 20 is exerted also on the first moving member 19 as a slide resistance. Hence, the slide resistance produced at this point serves as a braking force to exert the damping effect.

However, this damping force varies with the magnitude of the force acting on the first moving member 19 and the moving speed. Specifically, with a large force and a high moving speed, the second moving member 20 is strongly pressed against the damping groove 15 in one stroke. Thus, a large braking force, i.e., a damping force is exerted at a fast pace. On the other hand, when the force acting on the first moving member 19 is small and the moving speed is slow, the second moving member 20 is gradually pressed against the damping groove 15 at a slow pace. Thus the braking force, i.e., the damping force, gradually increases in accordance with the stroke.

The fact that the conditions of exerting the damping force vary with the moving speed and the magnitude of the force as described above means that it is possible to provide an appropriate damping force at all times according to the use of the damper or the circumstances of use.

After the slider 18 has moved inside the casing body 10 while exerting the damper effect, the force acting on the working portion 19b decreases so as to be lower than the spring force of the spring 33. Thereupon, the spring force of the spring 33 moves the first moving member 19 in the direction of returning to the normal position. At this point, the first inclined face 24 and the third inclined face 28 are separated, and the second inclined face 61 and the fourth inclined face 62 come in contact with each other. Thus, a vertical force component and a horizontal force component are exerted between the second and fourth inclined faces 61 and 62. In this regard, the vertical force component is opposite in direction to the force y.

When the slider 18 is returned by the spring force of the spring 33, the second moving member 20 is acted upon by a force brining the moving member 20 closer to the moving member 19. This force serves as a force in the direction disengaging the second moving member 20 from the damping groove 15, to reduce the force pressing the second moving member 20 against the damping groove 15. Along with the reduction in the pressing force, the braking force is reduced. Thus, the slider 18 is able to return smoothly to the normal position by the spring force of the spring 33.

According to the seventh embodiment just described, in addition to the same effects as those in the first embodiment which can naturally be expected, it is possible to achieve the further effect that at the returning stage the damping portion is separated from the damping groove 15 for the smooth movement of the slider 18. That is, it is possible to make the return speed faster to prepare for receiving the next impact force.

In the seventh embodiment, the damping groove 15 is provided in the casing body 10 and the damping portion is provided in the slider 18. However, a damping portion may be provided in the casing body 10 and a damping groove may be provided in the slider 18 as in the case of the second embodiment.

In the seventh embodiment, the side faces of the damping groove 15 are formed as the paired tapering faces 17. However, one of the side faces may be a tapering face and the other may be a straight face, for example. Whichever the case, it is necessary to gradually lessen the inner width of the damping groove 15 in the depth direction or the opening direction of the damping groove 15. Note that in this case, the shape of the corresponding damping portion of the second moving member 20 must be changed to match the shape of the damping groove 15.

Further, the first inclined faces 24 of the first moving member 19 and the third inclined faces 28 of the second moving member 20 constitute the conversion mechanism according to the present invention, but the inclined faces may be provided in one of the first and second moving members 19 and 20. In this respect, the seventh embodiment is the same as the first embodiment.

As a natural result, it is then possible for the seventh embodiment to yield the same effects as those in the first embodiment.

Further the second inclined faces 61 of the first moving member 19 and the fourth inclined faces 62 of the second moving member 20 constitute the release mechanism according to the present invention, but the inclined faces may be provided in only one of the first and second moving members 19 and 20 as in the case of the conversion mechanism. In this respect, the relationship between the second and fourth inclined faces 61 and 62 is the same as that between the first and third inclined faces 24 and 28 forming the conversion mechanism.

Although in the foregoing the first inclined faces 24 and the second inclined faces 61 are designed in parallel to each other and the third inclined faces 28 and the fourth inclined faces 62 are designed in parallel to each other, the parallel positioning for the inclined faces are not necessarily required. The essential requirement is that the first inclined faces 24 should be face to face with the third inclined faces 28 and the first and third inclined faces 24 and 28 should be able to create a force pressing the second moving member 20 against the damping groove 15. Further the second inclined faces 61 should be face to face with the fourth inclined faces 62 and the second and fourth inclined faces 61 and 62 should be able to remove the pressing force.

Figure 34:
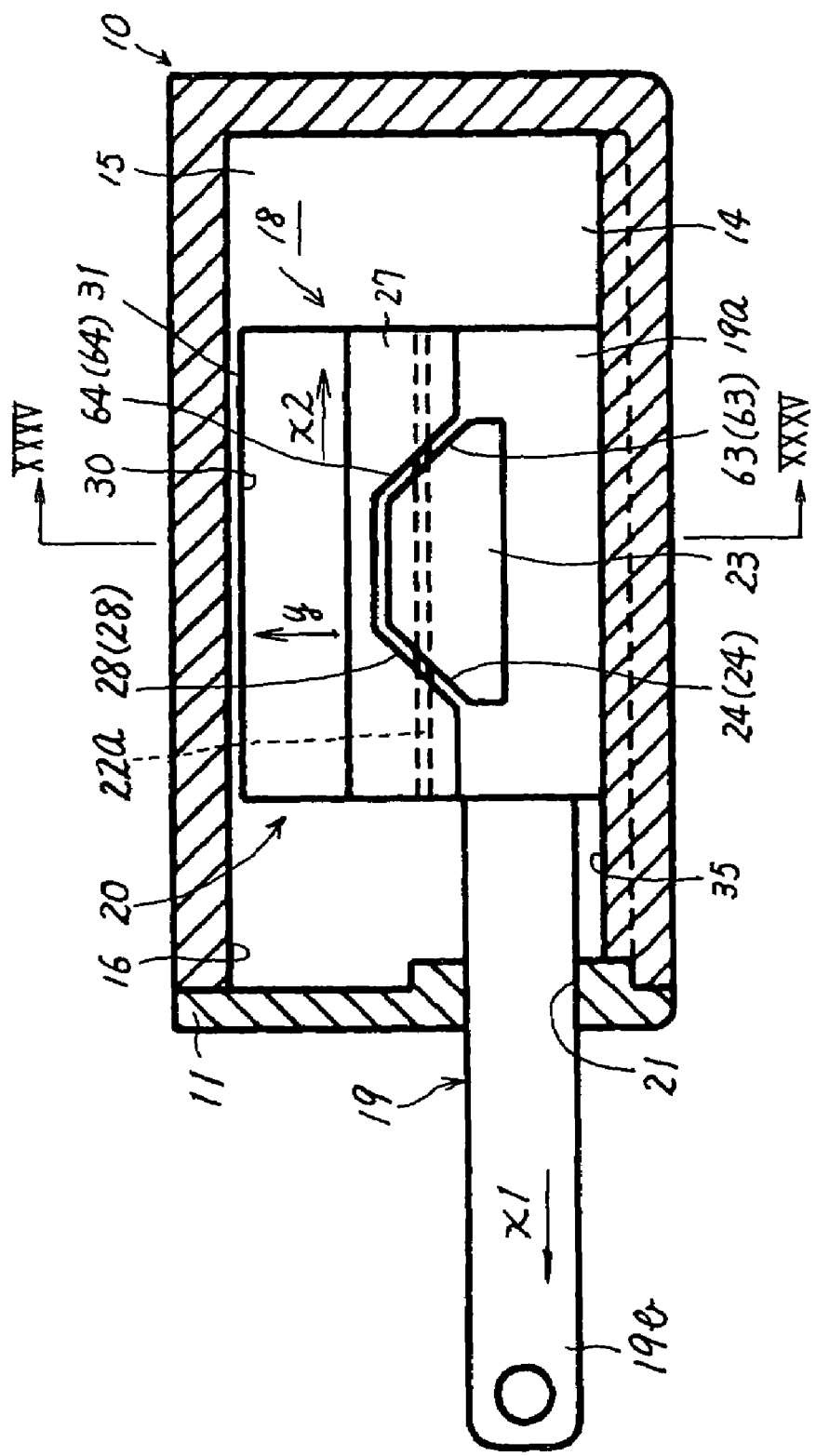
FIG. 34 is a partial sectional view of an eighth embodiment.
Figure 35:
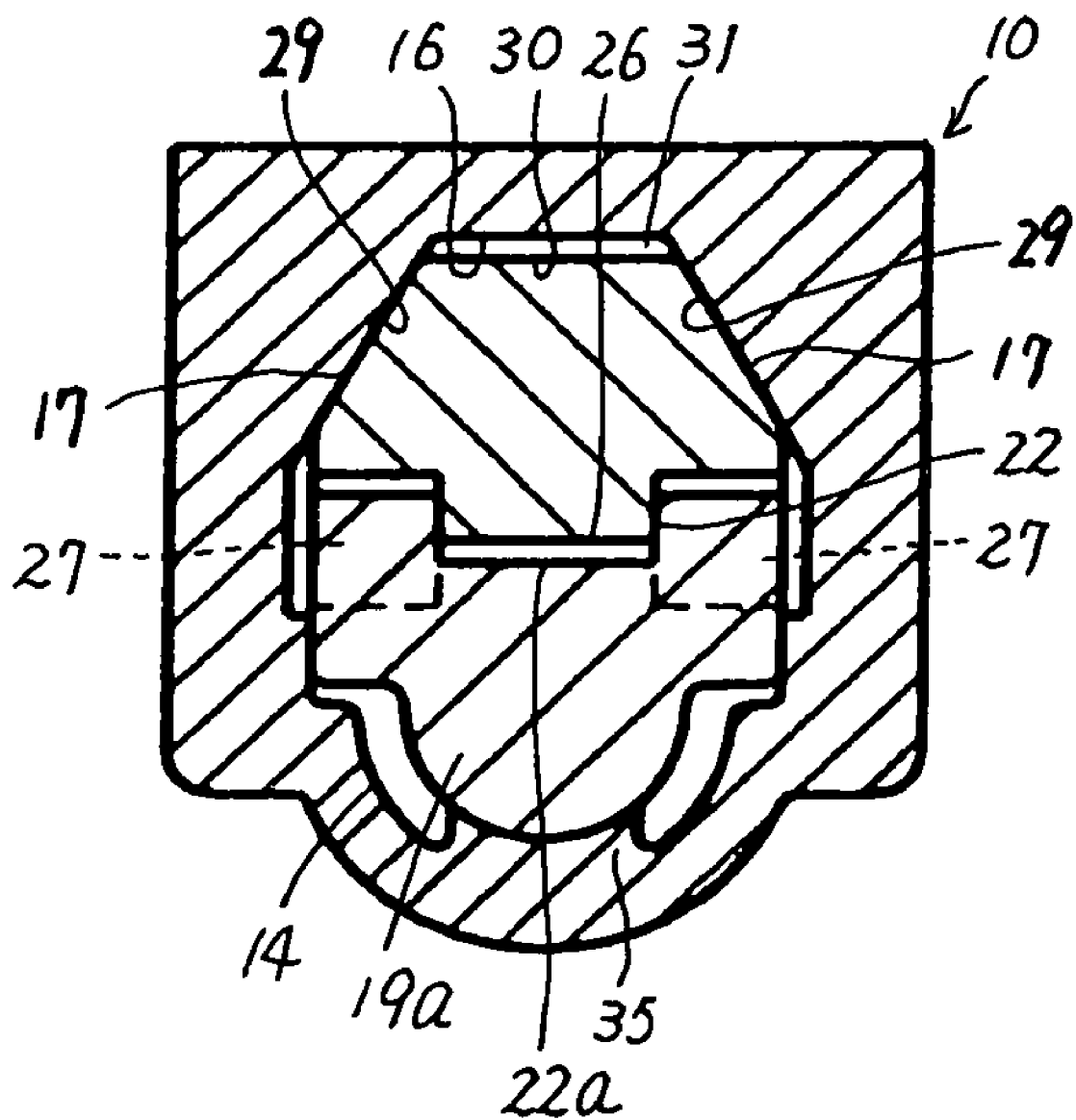
FIG. 35 is a sectional view through section XXXV-XXXV of FIG. 34.

FIGS. 34 and 35 illustrate an eighth embodiment according to the present invention.

As shown in FIG. 34, a casing according to the present invention is constituted of a cylindrical-shaped casing body 10 and a cap 11. The casing body 10 has a closed end and an open end having an opening closed with the cap 11.

The casing body 10 includes a cylindrical portion 14 and a damping groove 15 extending in the axis direction thereof. The cylindrical portion 14 and the damping groove 15 have the axes extending parallel to each other but the axis of the damping groove 15 is eccentric with respect to the cylindrical portion 14. The cylindrical portion 14 and the damping groove 15 are connected continuously to each other in the vertical direction.

As illustrated in FIG. 35, the cylindrical portion 14 has an arc-shaped inner bottom portion opposite the damping groove 15. The damping groove 15 has a flat ceiling face 16 which is the face opposing the cylindrical portion 14. The side faces of the damping groove 15 are formed as two tapering faces 17 between which the space gradually opens up toward the cylindrical portion 14, i.e. the opening of the damping groove 15. In other words, the damping groove 15 tapers toward the ceiling face 16 to form a trapezoid in section.

A slider 18 is inserted into the casing body 10 with allowance for the sliding movement as illustrated in FIG. 34. The slider 18 includes a first moving member 19 and a second moving member 20.

The first moving member 19 has a coupling portion 19a and a working portion 19b acted upon by a force, which are integrally formed of a single shaft and naturally use the same axis. The coupling portion 19a has a slightly larger diameter than that of the working portion 19b to create a difference in level at the boundary between them. The working portion 19b protrudes toward the outside from a shaft hole 21 formed in the cap 11 when the first moving member 19 is fitted in the casing body 10.

Further, as shown in FIG. 34, a raised plate-shaped portion 22 extends along the axis on the coupling portion 19a, and has a flat sliding face 22a formed thereon as in the cases of the aforementioned embodiments. Paired projecting portions 23 are provided individually on the sides of the raised plate-shaped portion 22. Tops 23a of the projecting portions 23 are on a higher level than the sliding face 22a, that is, the tops 23a protrude toward the second moving member 20.

Each of the projecting portions 23 has a first inclined face 24 formed continuously from the top 23a. The first inclined face 24 is inclined gradually down from the top 23a toward the working portion 19b. The reverse face of the first inclined face 24 is formed as a second inclined face 63 such that the inclined faces 24 and 63 are symmetric with respect to a line.

As shown in FIG. 35, the second moving member 20 has a sliding face 26 of which the width is equal to that of the sliding face 22a of the first moving member 19. Paired guiding portions 27 protrude individually adjacent to the sides of the sliding face 26. The space between the paired guiding portions 27 is approximately equal to the width of the raised plate-shaped portion 22 of the first moving member 19. In other words, when the first and second moving members 19 and 20 are laid over each other with an exact alignment between the sliding faces 22a and 26, the raised plate-shaped portion 22 is fitted between the paired guiding portions 27 with allowance for the sliding movement. Hence, during the relative movement of the first and second moving members 19 and 20, the positional relationship between the moving members 19 and 20 is maintained. Put another way, when the moving members 19 and 20 are moved relatively, the axes of the moving members 19 and 20 are not displaced in the width direction of the sliding face 22a and the sliding face 26.

As shown in FIG. 34, each of the guiding portions 27 has a third inclined face 28 formed to face the corresponding first inclined face 24 formed on the first moving member 19 when the first and second moving members 19 and 20 are laid over each other, in which case the first and third inclined faces 24 and 28 are allowed to come face to face with each other. Each of the guiding portions 27 further has a fourth inclined face 64 formed to face the corresponding second inclined face 63 of the first moving member 19 when the first and second moving members 19 and 20 are laid over each other. The fourth inclined face 64 is mirror image of each third inclined face 28, and allowed to come face to face with the second inclined face 63 of the first moving member 19 when the first and second moving members 19 and 20 are laid over each other.

Regarding the relationship between the inclined faces 24, 28, 61 and 62, while the first and third inclined faces 24 and 28 are in contact with each other, the space between the second and fourth inclined faces 63 and 64 is maintained, whereas while the second and fourth inclined faces 63 and 64 are in contact, the space between the first and third inclined faces 24 and 28 is maintained. The first and second moving members 19 and 20 are combined to form the slider 18.

Under the circumstances in FIG. 34, the first moving member 19 is acted upon by a force in the direction x1, namely, a force in the direction pulling the first moving member 19 out of the casing body 10, and the second moving member 20 is acted upon by a force in the direction x2 which is opposite the force in the direction x1. Thereupon, the first and third inclined faces 24 and 28 come into contact with each other and the second and fourth inclined faces 63 and 64 are separated. Accordingly, the moving force of the first moving member 19 is transferred via the first and third inclined faces 24 and 28 to the second moving member 20 to cause a movement of the slider 18 in the direction x1.

Upon the movement of the first and second moving members 19 and 20 in the direction x1 as just described, the first and third inclined faces 24 and 28 are acted upon by the vertical and horizontal force components. This vertical force component serves as a force y in a direction separating the moving members 19 and 20 from each other. In the eighth embodiment, the force in the direction x2 acting on the second moving member 20 results in a slide resistance.

Then, when a force in the direction opposite to the pulling direction acts on the first moving member 19, the following situation develops: the first moving member 19 is acted upon by the force in the direction opposite to the direction x1, namely, a force in the direction pressing the first moving member 19 into the casing body 10, and the second moving member 20 is acted upon by a force in the direction opposite to the direction x2. Thereupon, the first and third inclined faces 24 and 28 are separated, and the second and fourth inclined faces 63 and 64 come into contact with each other. Thus, the moving force of the first moving member 19 is transferred via the second and fourth inclined faces 63 and 64 to the second moving member 20, so that the slider 18 moves in the direction opposite to the direction x1.

In this manner, the first and second moving members 19 and 20 move in the direction opposite to the direction x1. Then, as in the case of the action of the force in the pulling direction, the second and fourth inclined faces 63 and 64 are affected by the vertical and horizontal force components. This vertical force component results in a force y in a direction separating the moving members 19 and 20 from each other. Note that the force in the direction opposite to the direction x2 which acts on the second moving member 20 results in a slide resistance.

In short, in either the action of the force in the pulling direction or the action of the force in the inward-pressing direction, the force y separating the first and second moving members 19 and 20 from each other comes into action.

The second moving member 20 further includes tapering faces 29 individually facing the tapering faces 17 formed on the casing body 10, and an opposing face 30 facing the ceiling face 16 formed on the casing body 10. That is, the second moving member 20 is shaped trapezoidal in section corresponding to the damping groove 15, and yet when the second moving member 20 is inserted in the damping groove 15, as shown in FIG. 35, a slight space 31 is formed between the ceiling face 16 and the opposing face 30, to make it possible for the second moving member 20 to move in the depth direction of the damping groove 15.

The force y acts when the space 31 is created, whereupon the second moving member 20 is engaged more strongly in the damping groove 15 to further increase the frictional force between the tapering faces 29 of the second moving member 20 and the tapering faces 17 of the damping groove 15. The tapering faces 29 and the opposing face 30 designed as described above form the damping portion of the present invention.

In turn, in the casing body 10, the arc-shaped lower portion of the cylindrical portion 14 is provided with a supporter 35 formed in an arc shape of the same curvature as the coupling portion 19a and the working portion 19b of the first moving member 19. The coupling portion 19a and the working portion 19b are placed on the supporter 35, so that the contact area between the casing body 10 and the first moving member 19 is reduced to decrease the slide resistance between them.

Then, the slider 18 is housed in the casing body 10: the coupling portion 19a and the working portion 19b of the first moving member 19 are inserted in the cylindrical portion 14, and the second moving member 20 is fitted in the damping groove 15 of the casing body 10.

After completion of the insertion of the slider 18 into the casing body 10, the casing body 10 is closed by the cap 11. Then the pallets (not shown) formed on the cap 11 are engaged with the corresponding engaging recesses (not shown) formed on the casing body 10. Because of this engagement between the pallets of the cap 11 and the engaging recesses of the casing body 10, the cap 11 is prevented from disjoining from the opening of the casing body 10.

When the slider 18 is housed in the casing body 10, the working portion 19b protrudes outward from the shaft hole 21 of the cap 11.

Because the supporter 35 that is provided in the lower portion of the cylindrical portion 14 has the same curvature as that of the coupling portion 19a and the working portion 19b, the coupling portion 19a and the working portion 19b slide while being supported by the supporter 35.

Next, the operation in the eighth embodiment will be described.

When the slider 18 is in the position illustrated in FIG. 34, the force in the direction x1 acts on the working portion 19b, whereupon the first moving member 19 moves in the direction pulling the moving member 19 out of the casing body 10. Upon the movement of the first moving member 19, the first and third inclined faces 24 and 28 come into the contact state and the second and fourth inclined faces 63 and 64 are separated.

During such a contact state between the first and third inclined faces 24 and 28, if the first moving member 19 is moved further in the direction x1, the moving force is transferred via the first and third inclined faces 24 and 28 to the second moving member 20 to move the second moving member 20 together with the first moving member 19. A slide resistance thus produced between the damping portion and the damping groove 15 affects the second moving member 20. As a result, the second moving member 20 is acted upon by the force in the direction x1 which is the moving force of the first moving member 19 and the force in the direction x2 which is provided by the slide resistance, in which the force in the direction x1 is opposite to the force in the direction x2. Hence, a vertical force component and a horizontal force component are exerted between the first and third inclined faces 24 and 28. When the vertical force component thus acts on the second moving member 20, the second moving member 20 is pressed against the damping groove 15 of the casing body 10. This is because the first moving member 19 is supported on the supporter 35 so as to be incapable of moving further in the direction at right angles to the axis.

In turn, in the position illustrated in FIG. 34, a force in the direction opposite to the direction x1 is exerted on the working portion 19b, whereupon the first moving member 19 moves in the direction pressing the moving member 19 into the casing body 10. Upon the movement of the first moving member 19, the first and third inclined faces 24 and 28 are separated and the second and fourth inclined faces 63 and 64 come in contact with each other.

During this contact state between the second and fourth inclined faces 63 and 64, when the first moving member 19 is moved further in the direction opposite to the direction x1, the moving force is transferred via the second and fourth inclined faces 63 and 64 to the second moving member 20, so that the second moving member 20 is moved together with the first moving member 19. At this point, the second moving member 20 is affected by the slide resistance produced between the damping portion and the damping groove 15, and therefore acted upon by the force in the direction opposite to the direction x1 which is the moving force of the first moving member 19 and the force in the direction opposite to the direction x2 resulting from the slide resistance.

Note that because the force in the direction x1 is opposite to the force in the direction x2, the vertical force component and the horizontal force component are produced between the first and third inclined faces 24 and 28. Upon the action of the vertical force component on the second moving member 20, the second moving member 20 is pressed again the damping groove 15 of the casing body 10.

When the force of pushing up the second moving member 20 toward the damping groove 15 comes into action as described above, the tapering faces 29 of the second moving member 20, in particular, are consequently pressed into the tapering faces 17 of the damping groove 15 on the same principle as in the case of driving in a wedge. The pressing force thus produced results in a slide resistance on the part of the second moving member 20, which is then exerted also on the first moving member 19 as a slide resistance. Hence, the slide resistance produced at this point serves as a braking force to exert the damping effect.

That is, in the eighth embodiment, a damping effect is yielded in either one of the directions pulling the slider 18 out of or pressing the slider 18 into the casing body 10.

However, this damping force varies with the magnitude of the force acting on the first moving member 19 and the moving speed. Specifically, with a large force and a high moving speed, the second moving member 20 is strongly pressed against the damping groove 15 in one stroke. Thus, a large braking force, i.e., a damping force is exerted at a fast pace. On the other hand, when the force acting on the first moving member 19 is small and the moving speed is slow, the second moving member 20 is gradually pressed against the damping groove 15 at a slow pace. Thus the braking force, i.e., the damping force, gradually increases in accordance with the stroke.

The fact that the conditions of exerting the damping force vary with the moving speed and the magnitude of the force as described above means that it is possible to provide an appropriate damping force at all times according to the use of the damper or the circumstances of use.

According to the eighth embodiment, in addition to the same effects as those in the first embodiment which can naturally be expected, it is possible to achieve the further advantage of the damping effect produced when the slider 18 is moving in either the pulling direction or the pressing direction.

In the eighth embodiment, the damping groove 15 is provided in the casing body 10 and the damping portion is provided in the slider 18. However, a damping portion may be provided in the casing body 10 and a damping groove may be provided in the slider 18 as in the case of the second embodiment.

In the eighth embodiment, the side faces of the damping groove 15 are formed as the paired tapering faces 17. However, one of the side faces may be a tapering face and the other may be a straight face, for example. In either case, it is necessary to gradually lessen the inner width of the damping groove 15 in the depth direction or the opening direction. Note that in this case, the shape of the corresponding damping portion of the second moving member 20 must be changed to match the shape of the damping groove 15.

Further, in the foregoing the first and second inclined faces 24 and 63 are designed to be symmetrical with respect to a line, and likewise the third and fourth inclined faces 28 and 64 are designed to be symmetrical. However, a symmetrical design for the inclined faces is not necessarily required. The essential requirement is that the first and third inclined faces 24 and 28 should be positioned face to face with each other and come into contact to create a force pressing the second moving member 20. Further the second and fourth inclined faces 63 and 64 should be positioned face to face with each other and come into contact to create a force pressing the second moving member 20. Moreover, if either the first and second inclined faces 24 and 63, or the third and fourth inclined faces 28 and 64 are not designed to be symmetrical, it is possible to provide a damping effect varying in accordance with whether the first moving member 19 is being pressed or pulled.

Still further, the first inclined faces 24 of the first moving member 19 and the third inclined faces 28 of the second moving member 20 constitute the conversion mechanism according to the present invention, but the inclined faces may be provided in only one of the first and second moving members 19 and 20. In this respect, the eighth embodiment is the same as the first embodiment.

Figure 36:
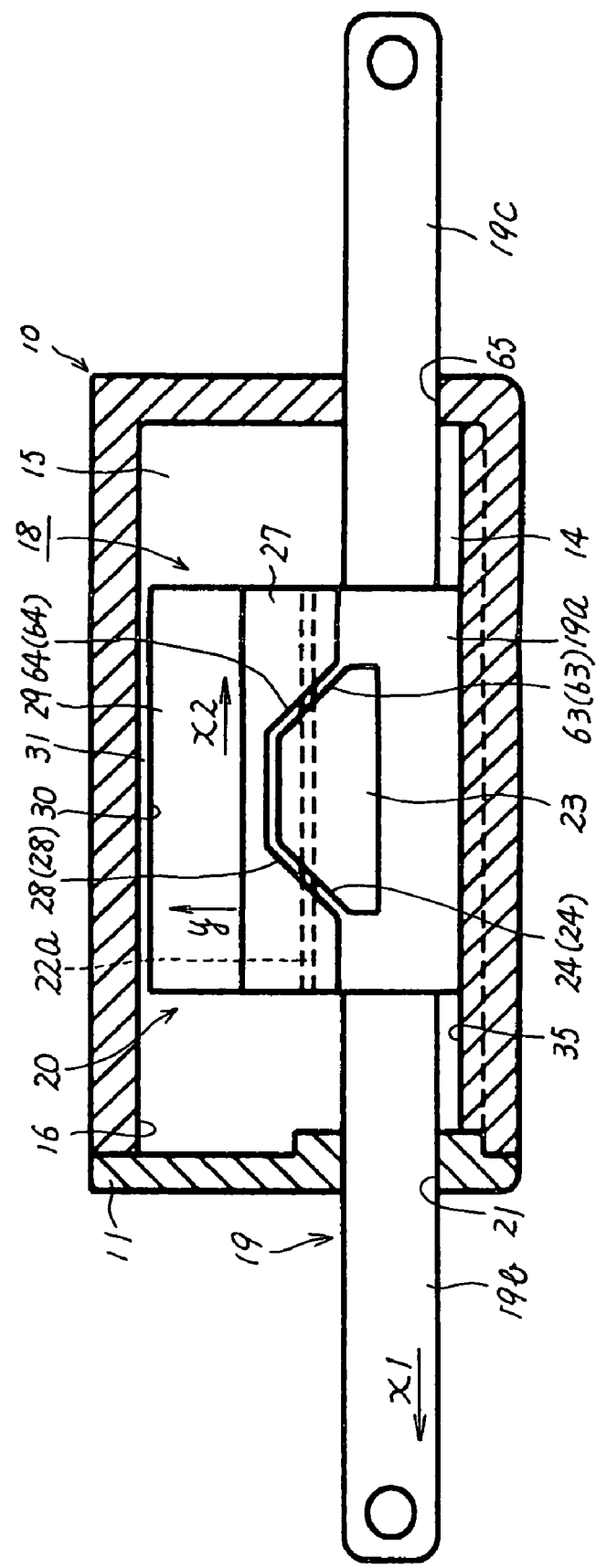
FIG. 36 is a partial sectional view of a ninth embodiment.

FIG. 36 illustrates a ninth embodiment according to the present invention. In the ninth embodiment a first moving member 19 has a coupling portion 19*a* and two working portions 19*b* and 19*c* provided at the ends of the coupling portion 19*a*. The working portion 19*c* protrudes outward from a shaft hole 65 formed in the closed end of a casing body 10. The structure of the other components is the same as that in the eighth embodiment. FIG. 35 is common to the eighth embodiment and the ninth embodiment.

Therefore, when the slider 18 is in the position illustrated in FIG. 36, the force in the direction x1 acts on the working portion 19*b* or 19*c*, whereupon the first moving member 19 moves in the direction x1 shown in FIG. 36. Upon the movement of the first moving member 19, the first and third inclined faces 24 and 28 come into the contact state and the second and fourth inclined faces 61 and 62 are separated.

During such a contact state between the first and third inclined faces 24 and 28, if the first moving member 19 is moved further in the direction x1, the moving force is transferred via the first and third inclined faces 24 and 28 to the second moving member 20 to move the second moving member 20 together with the first moving member 19. A slide resistance thus produced between the damping portion and the damping groove 15 affects the second moving member 20. As a result, the second moving member 20 is acted upon by the force in the direction x1 which is the moving force of the first moving member 19 and the force in the direction x2 which is provided by the slide resistance.

At this point, the force in the direction x1 is opposite to the force in the direction x2. Hence, a vertical force component and a horizontal force component are produced between the first and third inclined faces 24 and 28. When the vertical force component thus acts on the second moving member 20, the second moving member 20 is pressed against the damping groove 15 of the casing body 10. This is because the first moving member 19 is supported on the supporter 35 so as to be incapable of moving further in the direction at right angles to the axis.

In turn, in the position illustrated in FIG. 36, a force in the direction opposite to the direction x1 is exerted on the working portion 19*b* or 19*c*, whereupon the first moving member 19 moves in the direction opposite to the direction x1. Upon the movement of the first moving member 19, the first and third inclined faces 24 and 28 are separated and the second and fourth inclined faces 63 and 64 come into contact with each other.

During this contact state between the second and fourth inclined faces 63 and 64, when the first moving member 19 is moved further in the direction opposite to the direction x1, the moving force is transferred via the second and fourth inclined faces 63 and 64 to the second moving member 20, so that the second moving member 20 is moved together with the first moving member 19. At this point, the second moving member 20 is affected by the slide resistance produced between the damping portion and the damping groove 15, and therefore acted upon by the force in the direction opposite to the direction x1 which is the moving force of the first moving member 19 and the force in the direction opposite to the direction x2 resulting from the slide resistance.

Note that because the force in the direction x1 is opposite to the force in the direction x2, the vertical force component and the horizontal force component are exerted between the first and third inclined faces 24 and 28. Upon such action of the vertical force component on the second moving member 20, the second moving member 20 is pressed again the damping groove 15 of the casing body 10.

When the force of pushing up the second moving member 20 toward the damping groove 15 comes into action as described above, the tapering faces 29 of the second moving member 20, in particular, are consequently pressed into the tapering faces 17 of the damping groove 15 on the same principle as in the case of driving in a wedge. The pressing force thus produced results in a slide resistance on the part of the second moving member 20, which is then exerted also on the first moving member 19 as a slide resistance. Hence, the slide resistance produced at this point serves as a braking force to exert a damping effect.

That is, in the ninth embodiment, a damping effect is yielded when the slider 18 moves either in the direction x1 or the direction opposite to the direction x1.

According to the ninth embodiment, in addition to the same effects as those in the first embodiment which can naturally be expected, it is possible to produce a damping effect when the slider 18 is moving in either the pulling direction or the pressing direction.

In the ninth embodiment, the damping groove 15 is provided in the casing body 10 and the damping portion is provided in the slider 18. However, a damping portion may be provided in the casing body 10 and a damping groove may be provided in the slider 18 as in the case of the second embodiment.

In the ninth embodiment, the side faces of the damping groove 15 are formed as the tapering faces 17. However, one of the side faces may be a tapering face and the other may be a straight face, for example. Whichever the case, it is necessary to gradually lessen the inner width of the damping groove 15 in the depth direction or the opening direction of the damping groove 15. Note that in this case, the shape of the corresponding damping portion of the second moving member 20 must be changed to match the shape of the damping groove 15.

Further, in the foregoing the first and second inclined faces 24 and 63 are designed to be symmetrical with respect to a line, and likewise the third and fourth inclined faces 28 and 64 are designed to be symmetrical. However, a symmetrical design for the inclined faces is not necessarily required. The essential requirement is that the first and third inclined faces 24 and 28 should come into face-to-face contact with each other, to create a force pressing the second moving member 20. Further the second and fourth inclined faces 63 and 64 should come into face-to-face contact with each other to create a force pressing the second moving member 20. Moreover, when only one of the two sets consisting of the first and second inclined faces 24 and 63, and of the third and fourth inclined faces 28 and 64 is designed to be symmetrical, it is possible to provide a damping effect varying in accordance with whether the first moving member 19 is being pressed or pulled.

Further, a set consisting of the first inclined faces 24 of the first moving member 19 and the third inclined faces 28 of the second moving member 20, and equally a set consisting of the second inclined faces 63 of the first moving member 19 and the fourth inclined faces 64 of the second moving member 20, constitute the conversion mechanism according to the present invention, but the inclined faces may be provided in only one of the first and second moving members 19 and 20. In this respect, the ninth embodiment is the same as the first embodiment.

It goes without saying that the same effects as those in the first embodiment are to be expected in the ninth embodiment.

In FIG. 36 illustrating the ninth embodiment, the same components as those in the eighth embodiment are designated with the same reference numerals as those in the eighth embodiment.

Figure 37:
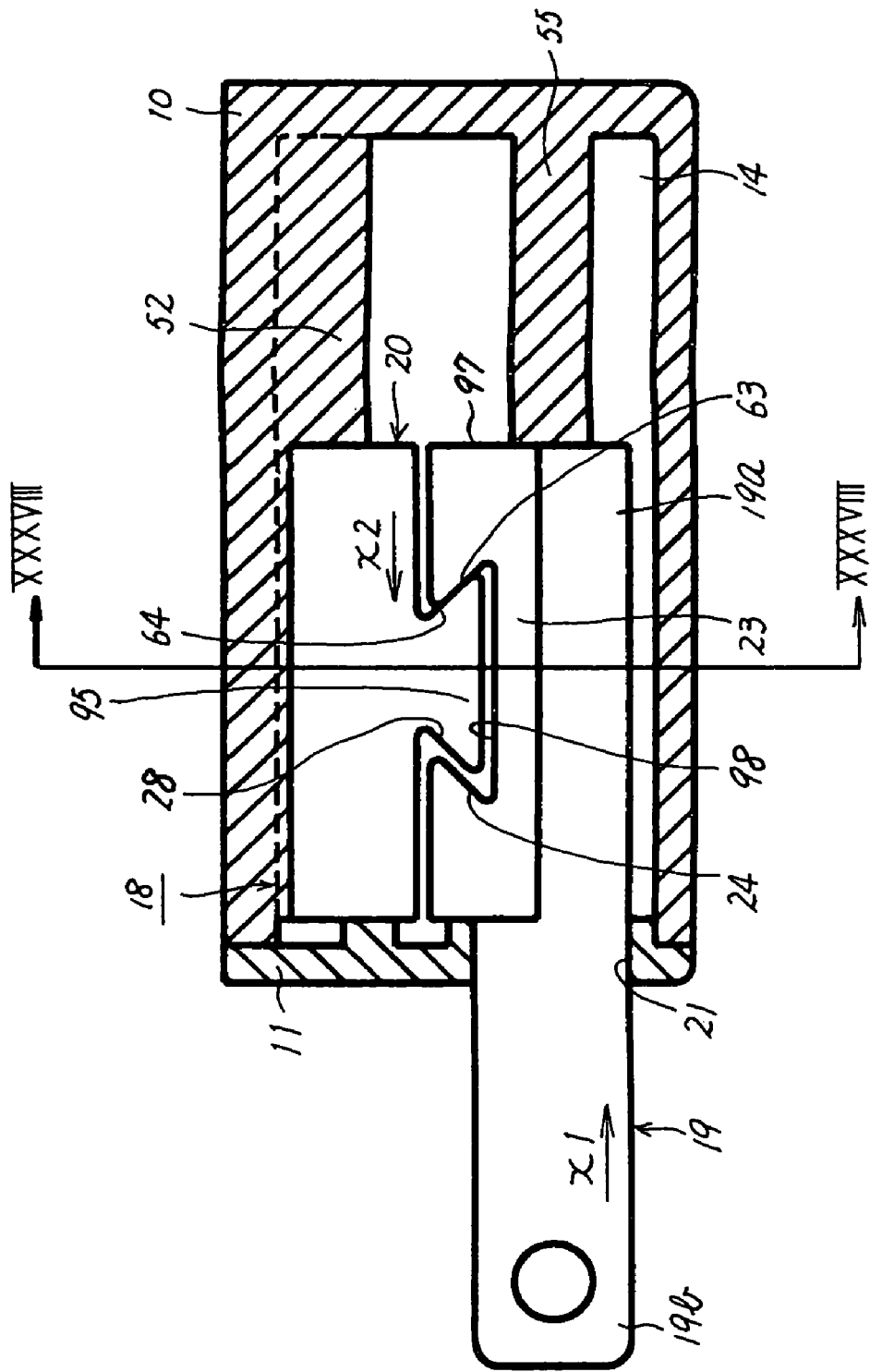
FIG. 37 is a partial sectional view of a tenth embodiment.
Figure 38:
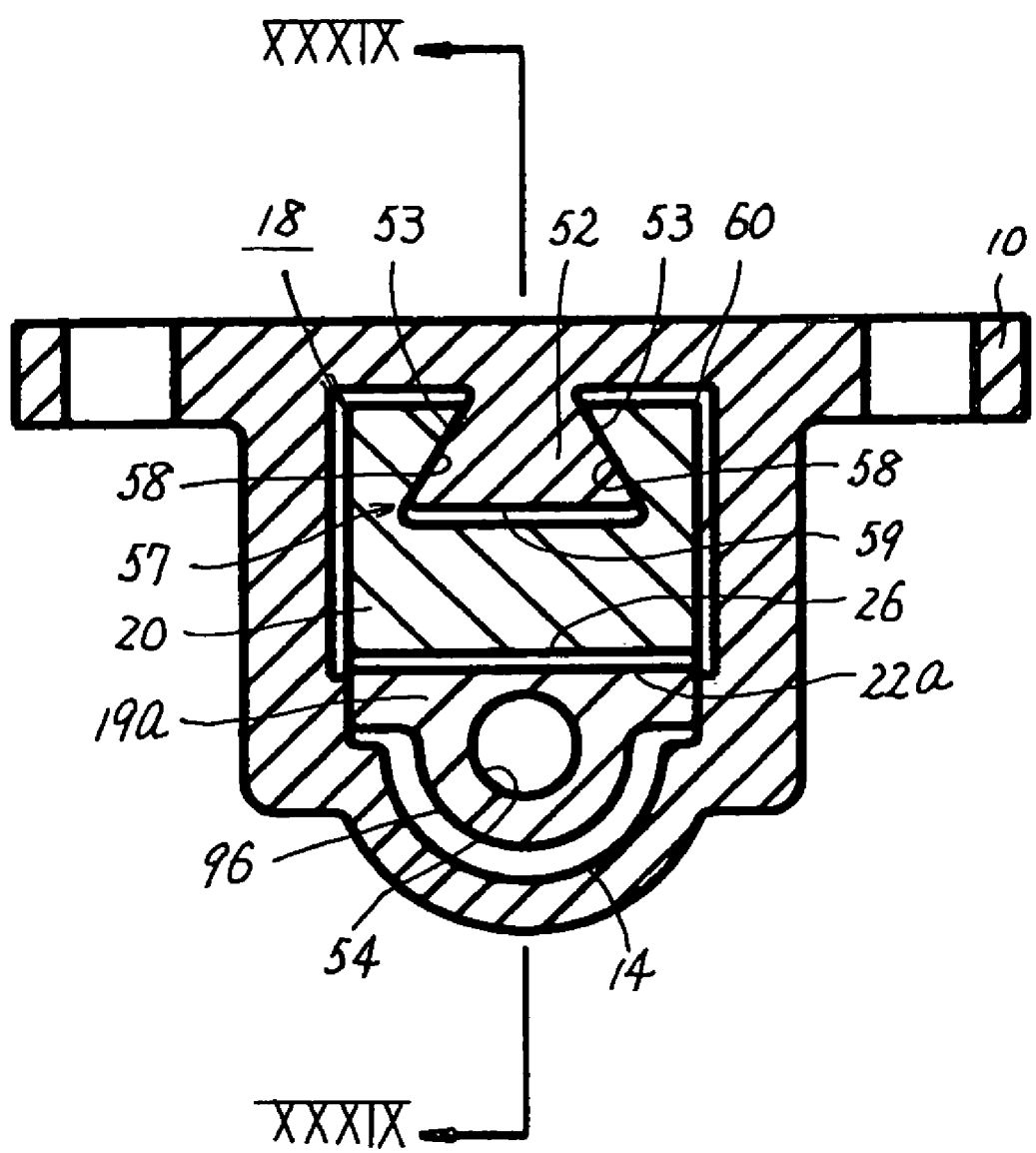
FIG. 38 is a sectional view through section XXXVIII-XXXVIII of FIG. 37.
Figure 39:
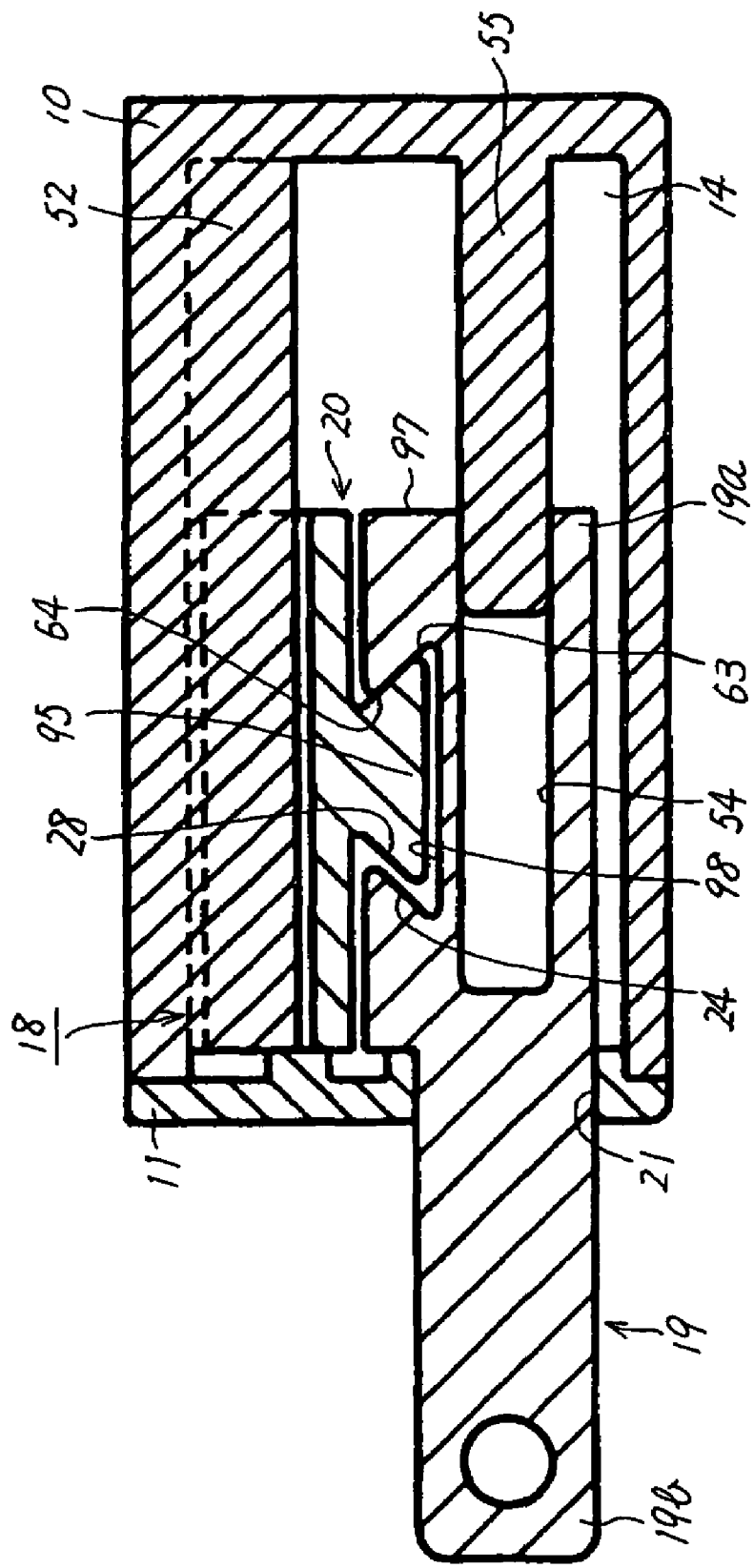
FIG. 39 is a sectional view through section XXXIX-XXXIX of FIG. 38.

FIG. 37 to FIG. 39 illustrate a tenth embodiment according to the present invention.

As shown in FIG. 37, in the tenth embodiment a casing according to the present invention is constituted of a cylindrical-shaped casing body 10 and a cap 11. The casing body 10 has a closed end and an open end having an opening closed with the cap 11.

The casing body 10 includes a cylindrical portion 14 extending in the axis direction thereof, and a damping portion 52 formed on the ceiling face thereof opposing the cylindrical portion 14. The cylindrical portion 14 and the damping portion 52 have the axes parallel to each other but the axis of the damping portion 52 is eccentric with respect to the cylindrical portion 14. The cylindrical portion 14 has an arc-shaped inner bottom portion formed opposite the damping portion 52.

As is seen clearly from FIG. 38, the damping portion 52 includes a projection projecting downward from the ceiling of the casing body 10. The damping portion 52 has the side faces formed as tapering faces 53 that diverge to gradually open up the distance between the tapering faces 53 toward the cylindrical portion 14 when the damping portion 52 is viewed in section.

A slider 18 is inserted into the casing body 10 with allowance for the sliding movement as illustrated in FIG. 37. The slider 18 includes a first moving member 19 and a second moving member 20.

The first moving member 19 has a coupling portion 19a and a working portion 19b acted upon by a force. The coupling portion 19a and the working portion 19b are integrally formed of a single shaft and naturally use the same axis. The working portion 19b protrudes toward the outside from a shaft hole 21 formed in the cap 11 when the first moving member 19 is fitted in the casing body 10.

A raised portion 97 is provided on the face of the coupling portion 19a of the first moving member 19 facing the second moving member 20. A recess 98 is formed in the raised portion 97. The recess 98 extends through the raised portion 97 in a direction at right angles to the axis so as to provide openings in the top surface of the raised portion 97 (i.e. the opposing face to the second moving member 20) and the side faces thereof. The shape of the opening formed in the side faces of the raised portion 97 is a trapezoid having a first inclined face 24 and a second inclined face 63. The first and second inclined faces 24 and 63 are inclined so as to taper the inner width of the recess 98 toward the second moving member 20, and are approximately symmetric with respect to a line.

As shown in FIG. 39, the first moving member 19 has a shaft hole 54 extending in the axis direction. The shaft hole 54 receives the insertion of a support shaft 55 fixed to the lower portion of the casing body 10, and allows for the relative movement of the support shaft 55. With the insertion of the support shaft 55 into the shaft hole 54 in this manner, the first moving member 19 is prevented from moving up toward the second moving member 20.

The second moving member 20 correspondingly includes a trapezoidal projection 95 formed on the face opposing the first moving member 19. As illustrated in FIG. 37, the trapezoidal projection 95 has a side shape trapezoidal in section, and a third inclined face 28 and a fourth inclined face 64 that are inclined so as to flare outward in width toward the first moving member 19 and are symmetric with respect to a line.

This trapezoidal projection 95 is geometrically similar to and slightly smaller in size than the trapezoid of the recess 98. As shown in FIGS. 37 and 39, when the trapezoidal projection 95 is fitted into the recess 98, a space is formed around the trapezoidal projection 95 and the first and third inclined faces 24 and 28 are parallel to each other and the second and fourth inclined faces 63 and 64 are parallel to each other.

As shown in FIG. 38, the second moving member 20 further includes a damping groove 57 formed in a sectional shape corresponding to that of the damping portion 52 formed on the ceiling portion of the casing body 10. Specifically, the side faces of the damping groove 57 are formed as tapering faces 58 between which the space tapers gradually toward the opening of the damping groove 57, that is, in the form of the so-called dovetail groove, when the damping groove 57 is viewed in section.

When the damping portion 52 is fitted into the damping groove 57 of the second moving member 20, a slight space 59 is formed between the bottom face of the damping groove 57 and the opposing face of the damping portion 52 as illustrated in FIG. 38. A space 60 is formed between the second moving member 20 and the ceiling face of the casing body 10. Because of this, the second moving member 20 is capable of moving within the spaces 59 and 60.

Further, a space 96 is formed between the arc-shaped bottom of the cylindrical portion 14 of the casing body 10 and the coupling and working portions 19a and 19b of the first moving member 19. In spite of the existence of the space 96, it is possible to reliably support the first moving member 19 by use of the support shaft 55 and the shaft hoe 21.

When the first moving member 19 and the second moving member 20 are inserted into the casing body 10 as described above, the first inclined face 24 of the first moving member 19 and the third inclined face 28 of the second moving member 20 are positioned face to face with each other and the third inclined face 63 of the first moving member 19 and the fourth inclined face 64 of the second moving member 20 are positioned face to face with each other. This combination of the moving members 19 and 20 constitutes the slider 18 of the present invention.

Then, the slider 18 is housed in the casing body 10: the coupling portion 19a and the working portion 19b of the first moving member 19 are inserted into the cylindrical portion 14, and the damping groove 57 of the second moving member 20 is fitted over the damping portion 52.

After completion of the insertion of the slider 18 into the casing body 10, the casing body 10 is closed by the cap 11. At this point, the working portion 19b protrudes from the shaft hole 21 of the cap 11. The pallets of the hooks (not shown) of the cap 11 are engaged with the engaging recesses (not shown) of the casing body 10 in order to prevent the cap 11 from disjoining from the casing body 10.

Next the operation in the tenth embodiment will be described.

When the slider 18 is in the position illustrated in FIG. 37, contact is made between the second and fourth inclined faces 63 and 64 and the space is maintained between the first and third inclined faces 24 and 28. Under these circumstances, the force in the direction x1 acts on the working portion 19b, whereupon the first moving member 19 moves in the direction x1. Thereupon, the first and third inclined faces 24 and 28 come into the contact state and the second and fourth inclined faces 63 and 64 are separated.

During such a contact state between the first and third inclined faces 24 and 28, if the first moving member 19 is moved further in the direction x1, the moving force is transferred via the first and third inclined faces 24 and 28 to the second moving member 20 so as to move the second moving member 20 together with the first moving member 19. The slide resistance thus produced between the damping portion 52 and the damping groove 57 affects the second moving member 20. As a result, the second moving member 20 is acted upon by the force in the direction x1 which is the moving force of the first moving member 19 and the force in the direction x2 which is provided by the slide resistance.

The force in the direction x1 and the force in the direction x2 are opposite to each other. Hence, the vertical force component and the horizontal force component are produced between the first and third inclined faces 24 and 28. Upon such action of the vertical force component on the second moving member 20, the second moving member 20 is pulled toward the first moving member 19. At this point, the first moving member 19 is supported by the support shaft 55 so as to be incapable of moving upward.

When the second moving member 20 is pulled toward the first moving member 19 in this manner, the contact force between the tapering faces 53 of the damping portion 52 and the tapering faces 58 of the damping groove 57 is increased in intensity. This intensified contact force results in a slide resistance on the part of the second moving member 20. This slide resistance on the part of the second moving member 20 is exerted also on the first moving member 19 as a slide resistance. Hence, the slide resistance produced at this point serves as a braking force to exert a damping effect.

However, this damping force varies with the magnitude of the force acting on the first moving member 19 and the moving speed. Specifically, with a large force and a high moving speed, the tapering faces 53 of the damping portion 52 and the tapering faces 58 of the damping groove 57 are strongly pressed in one stroke. Thus a large braking force, i.e., a damping force is exerted at a fast pace. On the other hand, when the force acting on the first moving member 19 is small and further the moving speed is slow, the tapering faces 53 of the damping portion 52 and the tapering faces 58 of the damping groove 57 are gradually pressed at a slow pace. Thus the braking force, i.e., the damping force gradually increases in accordance with the stroke.

The fact that the conditions of exerting the damping force vary with the moving speed and the magnitude of the force as described above means that it is possible to provide an appropriate damping force at all times according to the use of the damper or the circumstances of use.

When the slider 18 moves in the direction opposite to the direction x1 after moving in the direction x1, the first and third inclined faces 24 and 28 which have been in contact are separated, and the second and fourth inclined faces 63 and 64 come into contact with each other.

During the contact state between the second and fourth inclined faces 63 and 64, when the first moving member 19 is moved further in the direction opposite to the direction x1, the moving force is transferred via the second and fourth inclined faces 63 and 64 to the second moving member 20 so as to move the second moving member 20 together with the first moving member 19. At this point, the second moving member 20 is affected by the slide resistance produced between the damping portion and the damping groove 57. Thus, the second moving member 20 is acted upon by the force in the direction x1 which is the moving force of the first moving member 19 and the force in the direction x2 resulting from the slide resistance.

The force in the direction x1 and the force in the direction x2 are opposite to each other. Hence, a vertical force component and a horizontal force component are produced between the second and fourth inclined faces 63 and 64. Upon such action of the vertical force component on the second moving member 20, the second moving member 20 is pulled toward the first moving member 19.

When the second moving member 20 is pulled toward the first moving member 19 in this manner, the contact force between the tapering faces 53 of the damping portion 52 and the tapering faces 58 of the damping groove 57 is increased in intensity. This intensified contact force results in a slide resistance on the part of the second moving member 20. This slide resistance on the part of the second moving member 20 is exerted also on the first moving member 19 as a slide resistance. Hence, the slide resistance produced at this point serves as a braking force to exert a damping effect.

That is, in the tenth embodiment, a damping effect is yielded when the slider 18 is moved either in the direction x1 or in the direction opposite to the direction x1.

It goes without saying that the tenth embodiment offers the same effects as those in the first embodiment.

In the tenth embodiment, the side faces of the damping groove 57 are formed as a pair of tapering faces 58, but it is possible for one of the side faces to be formed as a tapering face, and for the other to be formed as a straight face, for example. In other words, what is required is for the width of the damping groove 57 to be gradually tapered in the opening direction thereof. In this case, the shape of the damping portion 52 must correspond to the shape of the damping groove 57.

Further, in the foregoing the first and second inclined faces 24 and 63 are designed to be symmetrical with respect to a line, and likewise the third and fourth inclined faces 28 and 64 are designed to be symmetrical. However, a symmetric design for the inclined faces is not necessarily required. The essential requirement is that the first and third inclined faces 24 and 28 should come into face-to-face contact with each other, to create a force pressing the second moving member 20 against the first moving member 19. Further the second and fourth inclined faces 63 and 64 should come into face-to-face contact with each other to create a force pressing the second moving member 20 against the first moving member 19. Moreover, when only one of the two sets consisting of the first and second inclined faces 24 and 63, and of the third and fourth inclined faces 28 and 64 is designed to be symmetrical, it is possible to provide the damping effect varying in accordance with whether the first moving member 19 is pressed or pulled.

Still further, a set consisting of the first inclined faces 24 of the first moving member 19 and the third inclined faces 28 of the second moving member 20, or alternatively a set consisting of the second inclined faces 63 of the first moving member 19 and the fourth inclined faces 64 of the second moving member 20, constitute the conversion mechanism according to the present invention, but the inclined faces may be provided in only one of the first and second moving members 19 and 20. In this respect, the tenth embodiment is the same as the first embodiment.

Figure 40:
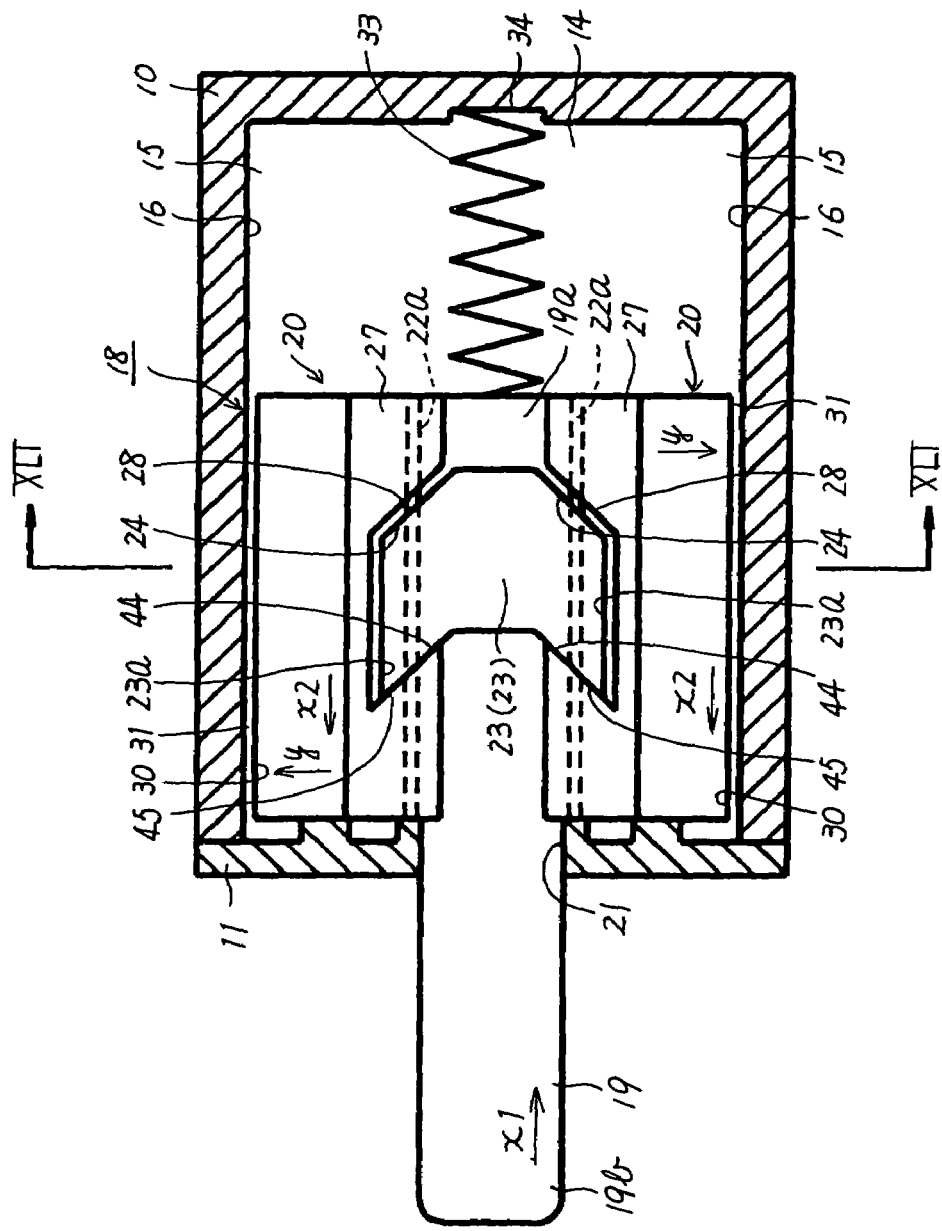
FIG. 40 is a partial sectional view of an eleventh embodiment.
Figure 41:
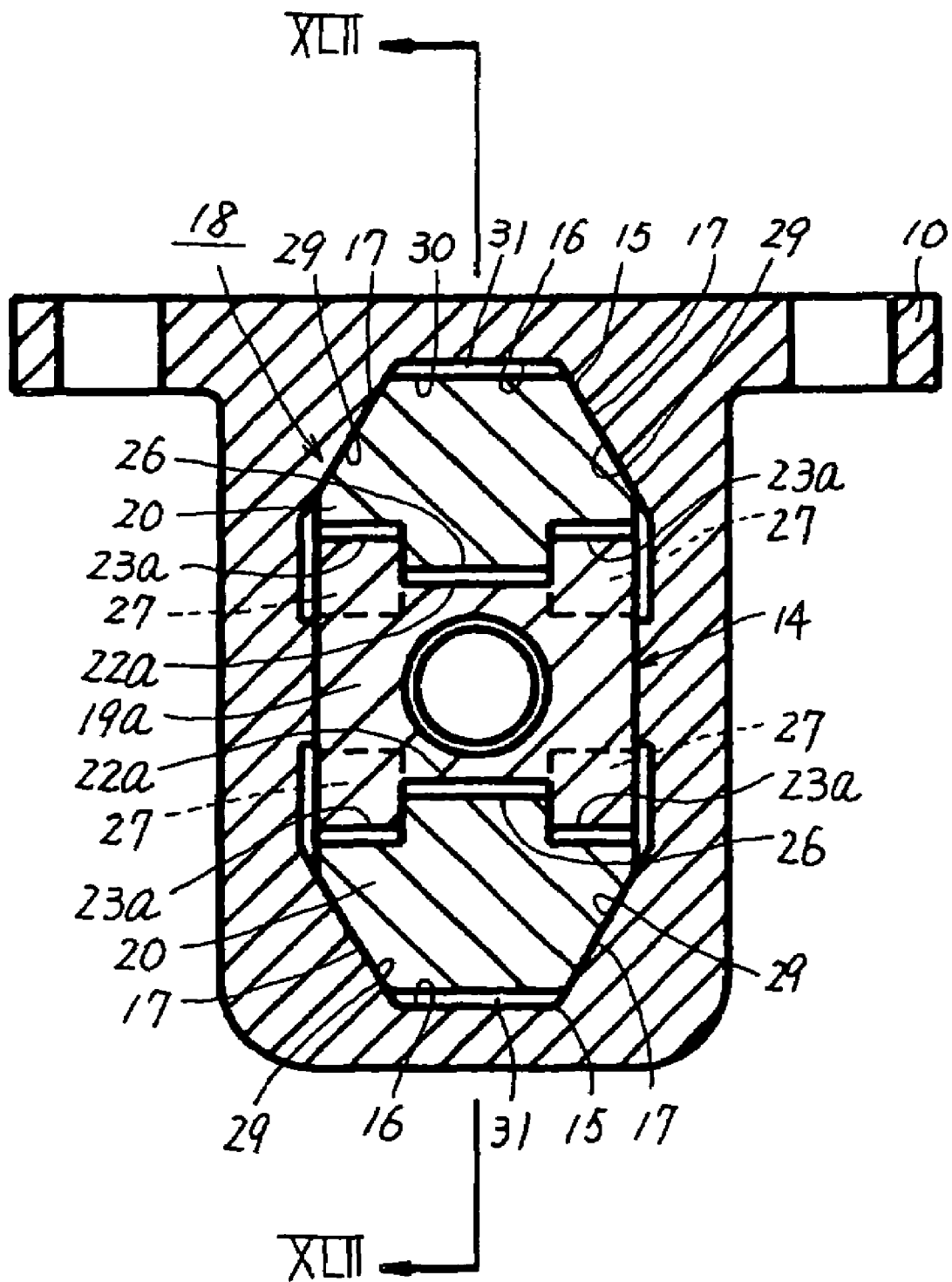
FIG. 41 is a sectional view through section XLI-XLI of FIG. 40.
Figure 42:
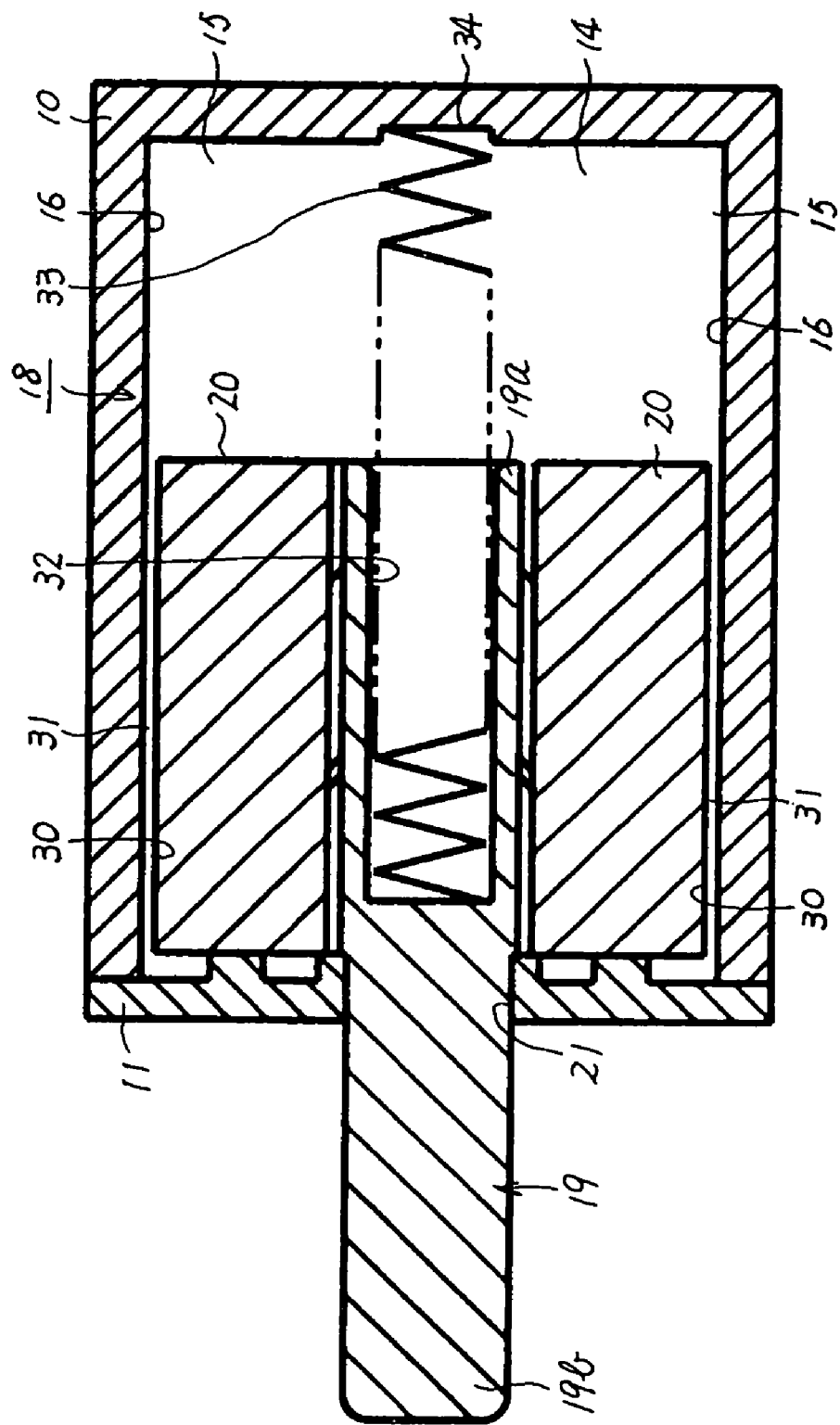
FIG. 42 is a sectional view through section XLII-XLII of FIG. 41.

FIG. 40 to FIG. 42 illustrate an eleventh embodiment according to the present invention.

As shown in FIG. 40, in the eleventh embodiment a casing according to the present invention is constituted of a cylindrical-shaped casing body 10 and a cap 11. The casing body 10 has a closed end and an open end having an opening closed with the cap 11.

As illustrated in FIG. 41, the casing body 10 has a cylindrical portion 14 approximately quadrangular in section formed on the same axis thereof, and further it has two damping grooves 15 formed individually in positions corresponding to the opposing sides of the quadrangle of the cylindrical portion 14. The cylindrical portion 14 and the damping grooves 15 have the axes extending parallel to each other but the axes of the damping grooves 15 are eccentric with respect to the cylindrical portion 14. The cylindrical portion 14 and the damping grooves 15 are connected continuously to each other in the vertical direction.

The two damping grooves 15 are identical in structure, and therefore one of the damping grooves 15 will be described below. As shown in FIG. 41, the damping groove 15 has a flat ceiling face 16 opposing the cylindrical portion 14 in the vertical direction. The side faces of the damping groove 15 are formed as two tapering faces 17 between which the space opens up gradually toward the cylindrical portion 14, i.e. the opening of the damping groove 15. In other words, the damping groove 15 tapers toward the ceiling face 16 to form a trapezoid in section.

A slider 18 is inserted into the casing body 10 with allowance for the sliding movement. The slider 18 includes a first moving member 19 and second moving members 20 as illustrated in FIG. 40.

The first moving member 19 has a coupling portion 19a and a working portion 19b acted upon by a force. The coupling portion 19a is shaped in a quadrangular section as illustrated in FIG. 41. Two projecting portions 23 illustrated in FIG. 40 are provided individually on faces 66 corresponding to the laterally opposing side faces of the coupling portion 19a.

Further, as shown in FIG. 41, the vertically opposing side faces of the coupling portion 19a are formed as flat sliding faces 22a. The paired projecting portions 23 are situated with sliding faces 22a in between. Each of the paired projecting portions 23 has a top 23a located at a higher level than each of the sliding faces 22a, that is, the paired projecting portions 23 protrude toward the second moving member 20.

A first inclined face 24 is formed continuously from the top 23a on each of the projecting portions 23, and inclined gradually down from the top 23a toward the end of the coupling portion 19a. On the reverse face of the first inclined face 24 of each projecting portion 23, a second inclined face 44 is formed parallel to the first inclined face 24.

As illustrated in FIG. 42, the first moving member 19 has a spring-receiving hole 32 extending along the axis thereof to receive the insertion of a spring 33. An end of the spring 33 inserted in the spring-receiving hole 32 is aligned with a recess 34 formed in the closed end of the casing body 10 in order to allow for the action of an initial load pressing the first moving member 19 toward the cap 11.

The working portion 19b is formed of a round bar-shaped shaft, which protrudes outward from the casing body 10 through the shaft hole 21 formed in the cap 11 as illustrated in FIG. 40.

As shown in FIG. 41, the second moving member 20 has a sliding face 26. The width of the sliding face 26 is equal to that of the sliding face 22a of the first moving member 19. Paired guiding portions 27 protrude individually adjacent to the sides of the sliding face 26. The space between the paired guiding portions 27 is approximately equal to the width of the sliding face 22a of the first moving member 19. In other words, when the first and second moving members 19 and 20 are laid over each other with an exact alignment between the sliding faces 22a and 26, the sliding face 22a is fitted between the paired guiding portions 27 with allowance for the sliding movement. Hence, during the relative movement of the first and second moving members 19 and 20, the positional relationship between the moving members 19 and 20 is maintained. Put another way, when the first and second moving members 19 and 20 are moved relatively, the axes of the moving members 19 and 20 are not displaced in the width direction of the sliding face 22a and the sliding face 26.

Each of the paired guiding portions 27 has a third inclined face 28 formed to face the corresponding first inclined face 24 formed on the first moving member 19 when the first and second moving members 19 and 20 are laid over each other, in which case the first and third inclined faces 24 and 28 are allowed to come into face-to-face contact with each other. Each of the paired guiding portions 27 further has a fourth inclined face 45 formed to face the corresponding second inclined face 44 formed on the first moving member 19 when the first and second moving members 19 and 20 are laid over each other. Each of the fourth inclined faces 45 is parallel to the corresponding third inclined face 28, and allowed to come in face-to-face contact with the second inclined face 44 of the first moving member 19 when the first and second moving members 19 and 20 are laid over each other.

In this respect, the first and third inclined faces 24 and 28 and the second and fourth inclined faces 44 and 45 form the relationship illustrated in FIG. 40: when the first and third inclined faces 24 and 28 are in contact with each other, the space between the second and fourth inclined faces 44 and 45 is maintained, whereas when the second and fourth inclined faces 44 and 45 are in contact with each other, a space is formed between the first and third inclined faces 24 and 28. Then when both the moving members 19 and 20 are in the normal position shown in FIG. 40, the second and fourth inclined faces 44 and 45 are in contact, and the first and third inclined faces 24 and 28 are separated to create the space.

As shown in FIG. 41, the second moving member 20 further has tapering faces 29 individually facing the tapering faces 17 formed on the casing body 10, and an opposing face 30 facing the ceiling face 16 formed on the casing body 10. That is, the second moving member 20 is shaped trapezoidal in section corresponding to the damping groove 15, and yet when the second moving member 20 is inserted in the damping groove 15, a slight space 31 is formed between the ceiling face 16 and the opposing face 30.

The tapering faces 29 and the opposing face 30 designed as described above form the damping portion of the present invention.

For the insertion of the first and second moving members 19 and 20 into the casing body 10 as described above, the sliding faces 22a and 26 of the moving members 19 and 20 are aligned with each other, and the first and third inclined faces 24 and 28 of the moving members 19 and 20 directly face each other, and similarly the second and fourth inclined faces 44 and 45 directly face each other. Under these circumstances, the first and second moving members 19 and 20 are combined (see FIG. 40). This combination of the moving members 19 and 20 constitutes the slider 18 of the present invention.

In the slider 18 thus structured, the spring 33 is pre-installed in the spring-receiving hole 32 formed in the first moving member 19 as shown in FIG. 42.

Then, the slider 18 is housed in the casing body 10: the coupling portion 19a and the working portion 19b of the first moving member 19 are inserted in the cylindrical portion 14 of the casing body 10, and the second moving member 20 with the extending spring 33 preinstalled in the spring-receiving hole 32 is fitted in the damping groove 15 of the casing body 10.

After completion of the insertion of the slider 18 into the casing body 10, the casing body 10 is closed by the cap 11. At this point, the working portion 19b protrudes from the shaft hole 21 of the cap 11.

Because the spring 33 inserted in the first moving member 19 is extended, the spring force of the spring 33 also acts on the second moving member 20 via the second and fourth inclined faces 44 and 45. Hence, each of the first and second moving members 19 and 20 is maintained in the normal position shown in FIG. 40 by the spring force of the spring 33. Put another way, in the normal position the second moving member 20 is in contact with the cap 11, and the working portion 19b protrudes outward from the shaft hole 21 formed in the cap 11.

The following is the relative relationship between the casing body 10 and each of the components of the slider 18 when the slider 18 is inserted in the casing body 10 as described above.

When the slider 18 is inserted into the casing body 10 in the foregoing manner, in the normal position shown in FIG. 40, the fourth inclined faces 45 of the second moving member 20 are in contact with the second inclined faces 44 formed on the first moving member 19, and the tapering faces 29 of the second moving member 20 are in contact with the tapering faces 17 formed on the casing body 10 as shown in FIG. 41.

The second moving member 20 is fitted in the damping groove 15 of the casing body 10, and the tapering faces 29 and the tapering faces 17 are in contact with each other. Under these circumstances, the space 31 is created between the ceiling face 16 formed in the damping groove 15 and the opposing face 30 formed on the second moving member 20 as described earlier. The formation of the space 31 allows the second moving member 20 to move in the depth direction of the damping groove 15.

Next, the operation in the eleventh embodiment will be described.

When the slider 18 is in the normal position illustrated in FIG. 40, contact is made between the second and fourth inclined faces 44 and 45 and the space is maintained between the first and third inclined faces 24 and 28. In this position, the force in the direction x1 acts on the working portion 19b, whereupon the first moving member 19 moves in the direction x1 against the spring force of the spring 33. Upon the movement of the first moving member 19, the first and third inclined faces 24 and 28 come into the contact state and the second and fourth inclined faces 44 and 45 are separated.

During such a contact state between the first and third inclined faces 24 and 28, if the first moving member 19 is moved further in the direction x1, the moving force is transferred via the first and third inclined faces 24 and 28 to the second moving member 20, to move the second moving member 20 together with the first moving member 19. The slide resistance thus produced between the damping portion and the damping groove 15 affects the second moving member 20. As a result, the second moving member 20 is acted upon by the force in the direction x1 which is the moving force of the first moving member 19 and the force in the direction x2 which is provided by the slide resistance.

The force in the direction x1 is opposite to the force in the direction x2. Hence, a vertical force component and a horizontal force component are produced between the first and third inclined faces 24 and 28. When the vertical force component thus acts on the second moving member 20, the second moving member 20 is pressed against the damping groove 15 of the casing body 10 by the force y.

When the force of pushing up the second moving member 20 toward the damping groove 15 comes into action, the tapering faces 29 of the second moving member 20, particularly in the front part of the second moving member 20 when viewed in the moving direction, are consequently pressed into the tapering faces 17 of the damping groove 15 on the same principle as in the case of driving in a wedge. The pressing force thus produced results in a slide resistance on the part of the second moving member 20. This slide resistance on the part of the second moving member 20 is exerted also on the first moving member 19 as a slide resistance. Hence, the slide resistance produced at this point serves as a braking force to exert a damping effect.

At this point, the damping force is produced by use of the two second moving members 20. Hence, the damping force is larger than a damping force produced by use of a single second moving member 20.

However, this damping force varies with the magnitude of the force acting on the first moving member 19 and the moving speed. Specifically, with a large force and a high moving speed, the second moving member 20 is strongly pressed against the damping groove 15 in one stroke. Thus, a large braking force, i.e., a damping force, is exerted at a fast pace. On the other hand, when the force acting on the first moving member 19 is small and the moving speed is slow, the second moving member 20 is gradually pressed against the damping groove 15 at a slow pace. Thus the braking force, i.e., the damping force, gradually increases in accordance with the stroke.

The fact that the conditions of exerting the damping force vary with the moving speed and the magnitude of the force as described above means that it is possible to provide an appropriate damping force at all times according to the use of the damper or the circumstances of use.

After the slider 18 has moved inside the casing body 10 while exerting the damper effect, the force acting on the working portion 19b decreases so as to be lower than the spring force of the spring 33. Thereupon, the spring force of the spring 33 moves the first moving member 19 in the direction of returning to the normal position illustrated in FIG. 40. At this point, the first inclined face 24 and the third inclined face 28 are separated, and the second inclined face 44 and the fourth inclined face 45 come into contact with each other. Thus, a vertical force component and a horizontal force component are exerted between the second and fourth inclined faces 44 and 45. In this regard, the vertical force component is opposite in direction to the force y shown in FIG. 40.

When the slider 18 is returned by the spring force of the spring 33, the second moving member 20 is acted upon by a force brining the moving member 20 closer to the moving member 19. This force serves as a force in the direction disengaging the second moving member 20 from the damping groove 15, to reduce the force pressing the second moving member 20 against the damping groove 15. Along with the reduction in the pressing force, the braking force is reduced. Thus, the slider 18 is able to return smoothly to the normal position by the spring force of the spring 33.

According to the eleventh embodiment just described, in addition to the same effects as those in the first embodiment which can naturally be expected, it is possible to achieve the further effect that at the returning stage the damping portion is separated from the damping groove 15 for the smooth movement of the slider 18. That is, it is possible to make the return speed faster to prepare for receiving the next impact force.

Further, the damping portions and the damping grooves 15 are provided in two sets, so that it is possible to offer an increased damping effect.

In the eleventh embodiment, the damping groove 15 is provided in the casing body 10 and the damping portion is provided in the slider 18. However, a damping portion may be provided in the casing body 10 and a damping groove may be provided in the slider 18 as in the case of the second embodiment.

In the eleventh embodiment, the side faces of the damping groove 15 are formed as a pair of tapering faces 17, but it is possible for one of the side faces to be formed as a tapering face, and for the other to be formed as a straight face, for example. In other words, what is required is for the width of the damping groove 15 to be gradually tapered in the depth direction or the opening direction thereof. In this case, the shape of the damping portion of the second moving member 20 must correspond to the shape of the damping groove 15.

Further, although the first inclined faces 24 of the first moving member 19 and the third inclined faces 28 of the second moving member 20 constitute the conversion mechanism according to the present invention, the inclined faces may be provided in only one of the first and second moving members 19 and 20. In this respect, the eleventh embodiment is the same as the first and second embodiments.

Still further, although the second inclined face 44 of the first moving member 19 and the fourth inclined face 45 of the second moving member 20 constitute the release mechanism according to the present invention, the inclined faces may be provided in only one of the first and second moving members 19 and 20 as in the case of the conversion mechanism. The relationship between the inclined faces 44 and 45 is the same as the relationship between the first and third inclined faces 24 and 28 forming the conversion mechanism.

Although in the foregoing the first inclined faces 24 and the second inclined faces 44 are designed to be parallel to each other and the third inclined faces 28 and the fourth inclined faces 45 are designed to be parallel to each other, the inclined faces are not necessarily required to be parallel to each other. The essential requirement is that the first inclined faces 24 should be face to face with the third inclined faces 28 and the first and third inclined faces 24 and 28 should be able to create a force pressing the second moving member 20 against the damping groove 15. Further the second inclined faces 44 should be face to face with the fourth inclined faces 45 and the second and fourth inclined faces 44 and 45 should be able to remove the pressing force.

Figure 43:
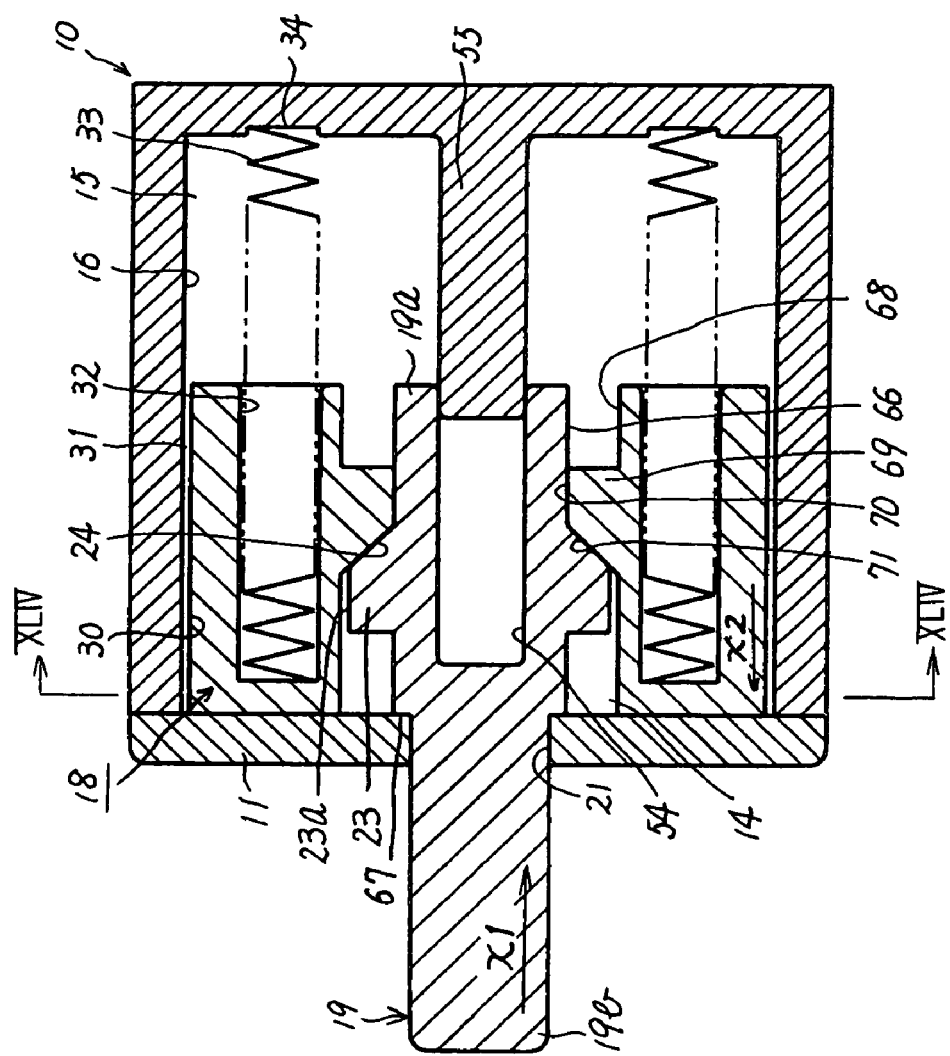
FIG. 43 is a sectional view through section XLIII-XLIII of FIG. 44 in a twelfth embodiment.
Figure 44:
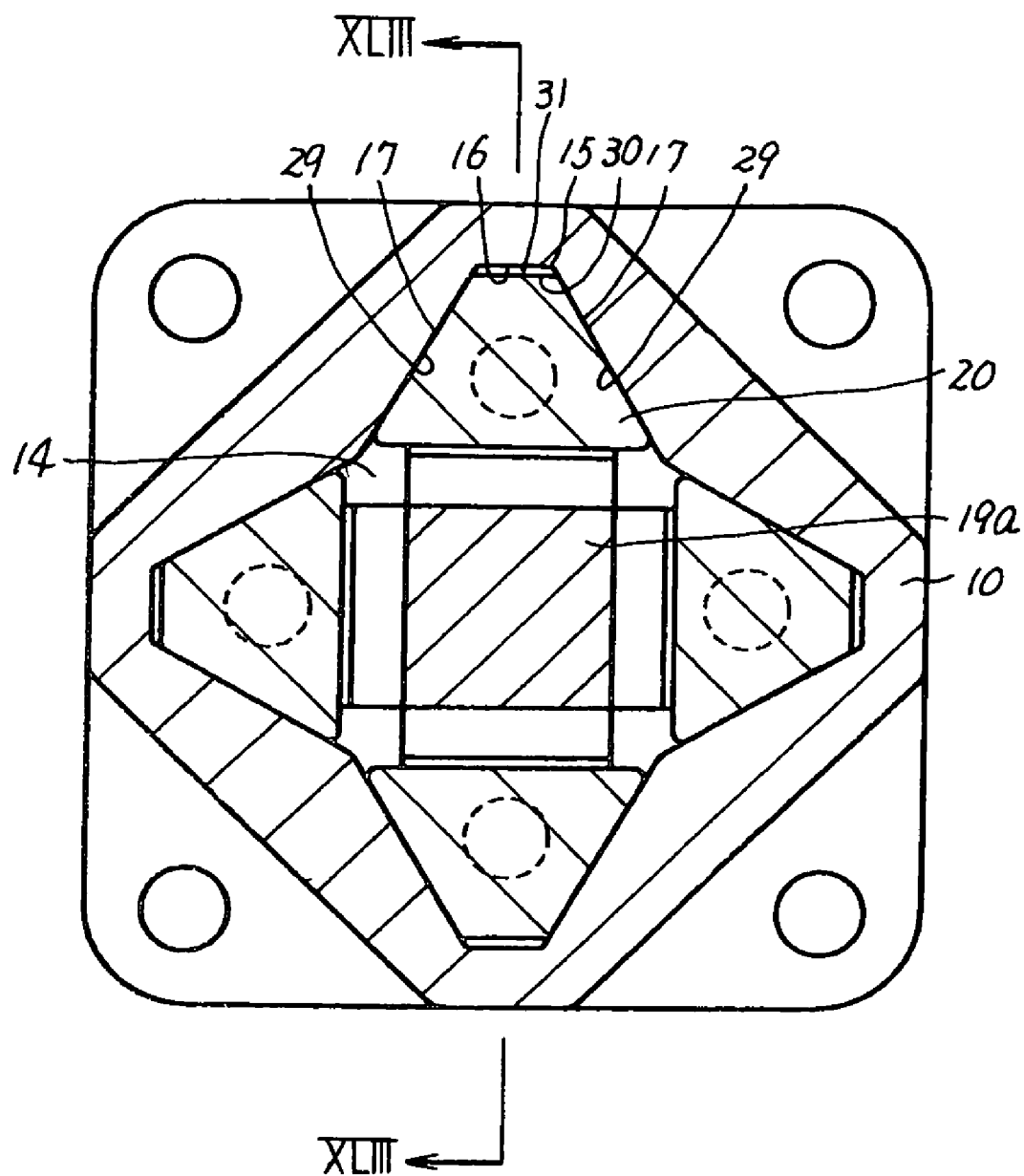
FIG. 44 is a sectional view through section XLIV-XLIV of FIG. 43.

FIGS. 43 and 44 illustrate a twelfth embodiment according to the present invention.

As shown in FIG. 43, a casing according to the present invention is constituted of a cylindrical-shaped casing body 10 and a cap 11. The casing body 10 has a closed end and an open end having an opening closed with the cap 11.

The casing body 10 has a quadrangular cross-section cylindrical portion 14 formed on the same axis thereof, and also has four damping grooves 15 formed individually in positions corresponding to the four sides of the quadrangle of the cylindrical portion 14. The cylindrical portion 14 and the damping grooves 15 have axes extending parallel to each other but the axes of the damping grooves 15 are eccentric with respect to the cylindrical portion 14. The cylindrical portion 14 and the damping grooves 15 are connected continuously to each other in the vertical direction of FIG. 43.

As shown in FIG. 44, the damping groove 15 has a flat ceiling face 16 opposing the cylindrical portion 14. The side faces of the damping groove 15 are formed as two tapering faces 17 between which the space opens up gradually toward the cylindrical portion 14, i.e. the opening of the damping groove 15. In other words, the damping groove 15 tapers toward the ceiling face 16 to form a trapezoid in section.

A slider 18 is inserted into the casing body 10 with allowance for the sliding movement. The slider 18 includes a first moving member 19 and second moving members 20.

The first moving member 19 has a coupling portion 19a and a working portion 19b acted upon by a force. The coupling portion 19a is shaped in a quadrangular section. Four projecting portions 23 are provided individually on faces 66 corresponding to the four side faces of the coupling portion 19a. The width of each of the projecting portions 23 is the same as that of the face 66.

Each of the projecting portions 23 formed on the coupling portion 19a has a top 23a located close to the damping portion 15, and an inclined face 24 formed continuously from the top 23a. The inclined face 24 is inclined gradually down from the top 23a toward the end of the coupling portion 19a.

The coupling portion 19a has a shaft hole 54 formed on the axis thereof. The shaft hole 54 has an opening formed at the end facing the closed end of the casing body 10. In a position corresponding to the shaft hole 54, a support shaft 55 is fixed to the closed end of the casing body 10, and inserted into the shaft hole 54 in such a way as to allow for the movement of the coupling portion 19a relative to the support shaft 55.

The working portion 19b is formed of a round bar-shaped shaft at the opposite end of the first moving member 19 from the opening of the shaft hole 54. The working portion 19b protrudes outward from the casing body 10 through the shaft hole 21 formed in the cap 11.

Thus the slider 18 is movably supported by the shaft hole 21 and the support shaft 55.

The coupling portion 19a and the working portion 19b of the slider 18 are combined and have the same axis, but are different in shape from each other so that a level-difference 67 is formed at the boundary between them. The level-difference 67 is up against to the cap 11 when the slider 18 is in the normal position shown in FIG. 43 in order to prevent the coupling portion 19a from coming out of the cap 11. The dimensional relationship between the opening portion of the shaft hole 54 and the leading end of the support shaft 55 inserted into the shaft hole 54 is determined with respect to the position when the level-difference 67 is in contact with the cap 11.

As shown in FIG. 44, the second moving member 20 has tapering faces 29 individually facing the tapering faces 17 formed on the casing body 10, and an opposing face 30 facing the ceiling face 16 formed on the casing body 10. That is, the second moving member 20 is shaped trapezoidal in section corresponding to the damping groove 15, and yet when the second moving member 20 is fitted in the damping groove 15, a slight space 31 is formed between the ceiling face 16 and the opposing face 30.

The second moving member 20 further includes a supporting projection 69 formed on a face 68 facing the face 66 of the first moving member 19. The supporting projection 69 has a top 70 formed thereon. The top 70 comes into contact with the face 66 of the first moving member 19 when the first and second moving members 19 and 20 are laid over each other.

The supporting projection 69 has an inclined face 71 formed thereon. The inclined face 71 and the inclined face 24 of the first moving member 19 are symmetric with respect to a point when the first and second moving members 19 and 20 are laid over each other, and are positioned face to face with each other.

Further, the second moving member 20 has a spring-receiving hole 32 formed along the axis thereof for receiving the insertion of a spring 33. The spring 33 in the spring-receiving hole 32 is positioned so as to align its end with a recess 34, formed in the closed end of the casing body 10, for the action of an initial load pressing the second moving member 20 against the cap 11.

When the slider 18 is in the normal position shown in FIG. 43, the level-difference 67 is kept up against the cap 11 through the action of the spring 33, and the leading end of the support shaft 55 is inserted into the opening portion of the shaft hole 54. Under these circumstances, the second moving member 20 is in contact with the cap 11 and all the inclined faces 24 and 71 are maintained in the contact state.

Next, the operation in the twelfth embodiment will be described.

When the slider 18 is in the normal position illustrated in FIG. 43, the force in the direction x1 acts on the working portion 19b, whereupon the entire first moving member 19 moves in the direction x1 which is the direction of the force.

Upon the movement of the first moving member 19, the moving force is transferred via the inclined faces 24 and 71 to the second moving members 20, to move the second moving members 20 against the spring force of the spring 33. Thus each of the second moving members 20 are acted upon by the force in the direction x1 which is the moving force of the first moving member 19 and the force in the direction x2 which is the spring force of the spring 33.

The force x1 is opposite in direction to the force x2. Hence, a vertical force component and a horizontal force component are produced between the inclined faces 24 and 71. When the vertical force component thus acts on the second moving member 20, the second moving member 20 is pressed against the damping groove 15 of the casing body 10. This is because the first moving member 19 is supported by the shaft hole 21 and the support shaft 55 so as to be incapable of moving further in the direction at right angles to the axis.

When the force of pushing up the second moving member 20 toward the damping groove 15 comes into action, the tapering faces 29 of the second moving member 20 are consequently pressed into the tapering faces 17 of the damping groove 15 on the same principle as in the case of driving in a wedge. The pressing force thus produced results in a slide resistance on the part of the second moving member 20. This slide resistance on the part of the second moving member 20 is exerted also on the first moving member 19 as a slide resistance. Hence, the slide resistance produced at this point serves as a braking force to exert a damping effect.

However, this damping force varies with the magnitude of the force acting on the first moving member 19 and the moving speed. Specifically, with a large force and a high moving speed, the second moving member 20 is strongly pressed against the damping groove 15 in one stroke. Thus, a large braking force, i.e., a damping force, is exerted at a fast pace. On the other hand, when the force acting on the first moving member 19 is small and the moving speed is slow, the second moving member 20 is gradually pressed against the damping groove 15 at a slow pace. Thus the braking force, i.e., the damping force gradually increases in accordance with the stroke.

The fact that the conditions of exerting the damping force vary with the moving speed and the magnitude of the force as described above means that it is possible to provide an appropriate damping force at all times according to the use of the damper or the circumstances of use.

According to the twelfth embodiment just described, in addition to the same effects as those in the first embodiment which can naturally be expected, the center of the first moving member 19 is prevented from deflecting because the first moving member 19 is supported by the shaft hole 21 and the support shaft 55. As a result it is possible to achieve to a stable movement of the first moving member 19.

Because of the stable movement of the first moving member 19, it is possible to stabilize the movements of all the second moving members 20 in association with the movement of the first moving member 19. This stabilized movement makes it possible to keep the braking forces of all the second moving members 20 constant and make the braking forces thereof equal to each other, resulting in the reliable provision of the required damping force.

Because a plurality of the second moving members 20 are provided radially around the first moving member 19, it is needless to say that the total damping force is increased in accordance with the increased number of second moving members 20.

In the twelfth embodiment, the damping groove 15 is provided in the casing body 10 and the damping portion is provided in the slider 18. However, a damping portion may be provided in the casing body 10 and a damping groove may be provided in the slider 18 as in the case of the second embodiment.

In the twelfth embodiment, the side faces of the damping groove 15 are formed as a pair of tapering faces 17, but it is possible for one of the side faces to be formed as a tapering face, and for the other to be formed as a straight face, for example. In other words, what is required is for the width of the damping groove 15 to be gradually tapered in the depth direction or the opening direction thereof. In this case, the shape of the damping portion of the second moving member 20 must correspond to the shape of the damping groove 15.

Further, the inclined faces 24 of the first moving member 19 and the inclined faces 71 of the second moving members 20 constitute the conversion mechanism according to the present invention, but the inclined faces may be provided in only one of the first and second moving members 19 and 20. In this respect, the twelfth embodiment is the same as the first and second embodiments.

Figure 45:
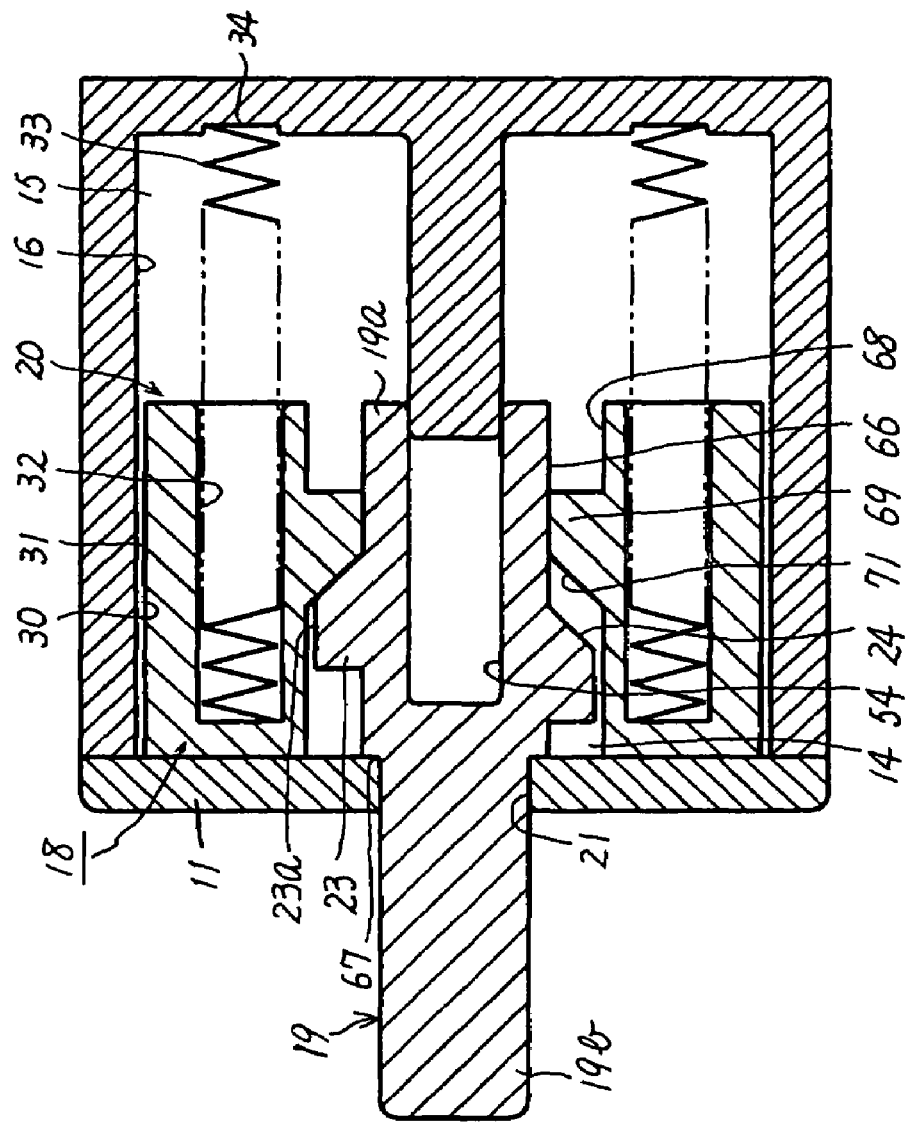
FIG. 45 is a sectional view of a thirteenth embodiment.

FIG. 45 illustrates a thirteenth embodiment according to the present invention. The thirteenth embodiment is identical with the twelfth embodiment in the radial formation of a plurality of second moving members 20, but differs from the twelfth embodiment in that when the slider 18 is in the normal position shown in FIG. 45, some of the inclined faces are in the contact state but some of the inclined faces are out of contact with each other. That is, taking an inclined face 24 and the opposing inclined face 71 as a pair, the pairs of inclined faces 24 and 71 are grouped into in-contact inclined-face pairs and out-of-contact inclined-face pairs.

The thirteenth embodiment implements the structure that the separated inclined faces 24 and 71 (i.e. the out-of-contact inclined-face pair) come into contact with each other during the movement of the first moving member 19 from the normal position in opposition to the spring force of the spring 33. This structure makes it possible to increase the braking force in accordance with the stroke. For example, one pair of inclined faces 24 and 71 are in contact with each other in the normal position, and the other pairs of inclined faces 24 and 71 come into the contact state one after another in accordance with the stroke of the first moving member 19. In this case, the damping force is increased sequentially in four stages according to the stroke of the moving slider 18.

Alternatively, two diagonally located pairs of inclined faces 24 and 71 can be in the contact state in the normal position, and the other two pairs of inclined faces 24 and 71 can be preset in the out-of-contact state. In this case, the damping force is increased in two stages. The two out-of-contact pairs or the two contact pairs of inclined faces 24 and 71 are not necessarily required to be located diagonally. However, such diagonal location has the advantage of improving the entire balance.

Besides the foregoing, the same effects as those in the twelfth embodiment can be also expected in the thirteenth embodiment.

The same components as those in the twelfth embodiment are designated with the same reference numerals as those in the twelfth embodiment.

In the thirteenth embodiment, the damping groove 15 is provided in the casing body 10 and the damping portion is provided in the slider 18. However, as in the case of the second embodiment, a damping portion may be provided in the casing body 10 and a damping groove may be provided in the slider 18.

Further, in the thirteenth embodiment, the side faces of the damping groove 15 are formed as a pair of tapering faces 17, but only one of the side faces may be formed as a tapering face and the other may be formed as a straight face, for example. In either case, it is necessary to gradually lessen the inner width of the damping groove 15 in the depth direction or the opening direction thereof. Note that in this case, the shape of the corresponding damping portion of the second moving member 20 must be changed to match the shape of the damping groove 15.

Further, the inclined faces 24 of the first moving member 19 and the inclined faces 71 of the second moving members 20 constitute the conversion mechanism according to the present invention, but the inclined faces may be provided in only one of the first and second moving members 19 and 20. In this respect, the thirteenth embodiment is the same as the first embodiment.

Further, the first embodiment to the thirteenth embodiment have the structure of providing inclined faces on the projecting portion of the first moving member 19 and the guiding portion of the second moving member 20, and making contact between the inclined faces. However, this structure is variable because the essential requirement is to transfer the moving force of the first moving member 19 to the second moving member 20. In other words, the contact face between the first moving member 19 and the second moving member 20 when the moving members 19 and 20 are moved relatively, must be inclined to allow for separation from each other or approach to each other. For example, if the sliding face of the first moving member 19 is formed as an inclined face and the sliding face of the second moving member 20 is formed as an inclined face, there is no need of specially providing a projecting portion or a guiding portion.

FIG. 46 to FIG. 49 illustrate a fourteenth embodiment according to the present invention.

Figure 46:
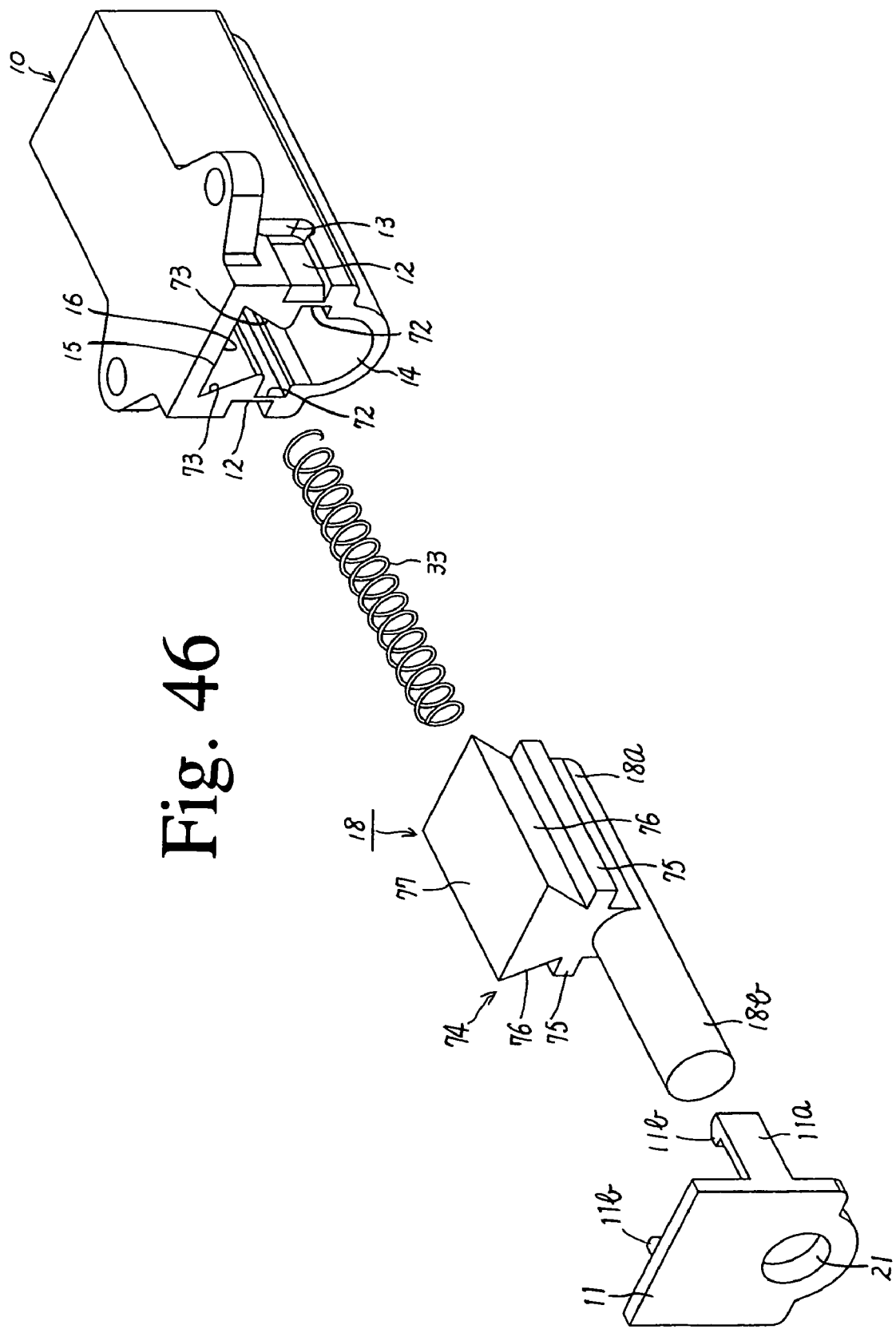
FIG. 46 is an exploded view of a fourteenth embodiment.

As shown in FIG. 46, a casing according to the present invention is constituted of a cylindrical-shaped casing body 10 having a closed end, and a cap 11 covering an open end of the casing body 10.

The cap 11 forming part of the casing has a pair of hooks 11a extending from the side faces of the cap 11. A pallet 11b is formed at the leading end of each hook 11a.

The casing 10 has, correspondingly, a pair of grooves 12 formed on both sides of the opening thereof. Each of the hooks 11a snugly fits into the corresponding groove 12 when the cap 11 is fitted on the casing body 10. The groove 12 has an engaging recess 13 formed for receiving the pallet 11b when the hook 11a is snugly fitted into the groove 12. The pallets 11b of the hooks 11a are respectively fitted into the engaging recesses 13 in this manner in order to prevent the cap 11 from disjoining from the opening of the casing body 10.

As is clear from FIG. 46, the casing body 10 includes a cylindrical portion 14, a damping groove 15, and guiding grooves 72 formed between the cylindrical portion 14 and the damping groove 15. The axes of the cylindrical portion 14 and the damping groove 15 are parallel to each other but the axis of the damping groove 15 is eccentric with respect to the cylindrical portion 14. The cylindrical portion 14 and the damping groove 15 are connected continuously via the guiding grooves 72 to each other.

The cylindrical portion 14 has an arc-shaped inner bottom portion which is the face opposing the damping groove 15. The damping groove 15 has a flat ceiling face 16 opposing the cylindrical portion 14. The side faces of the damping groove 15 are formed as two tapering faces 17 between which the space tapers gradually toward the cylindrical portion 14, i.e. the opening of the damping groove 15.

A slider 18 is inserted into the casing body 10 with allowance for the sliding movement. The slider 18 includes a coupling portion 18a, a shaft portion 18b, a damping portion 74, and projecting strips 75 provided between the coupling portion 18a and the damping portion 74.

The coupling portion 18a and the shaft portion 18b are integrally provided on the same axis, and combined to constitute the working portion of the present invention. The coupling portion 18a is continuous with the damping portion 74. The axes of the damping portion 74 and the coupling portion 18a are parallel to each other, but the axis of the damping portion 74 is eccentric with respect to the coupling portion 18a and the shaft portion 18b.

The damping portion 74 has the side faces formed as tapering faces 76 corresponding to the tapering faces 73 of the damping groove 15, and a top face 77 opposite to the ceiling face 16.

The following is the relative relationship between the casing body 10 and each of the components of the slider 18 when the coupling portion 18a is inserted into the cylindrical portion 14, the projecting strips 75 are fitted into the guiding grooves 72 and the damping portion 74 is fitted in the damping groove 15.

Figure 47:
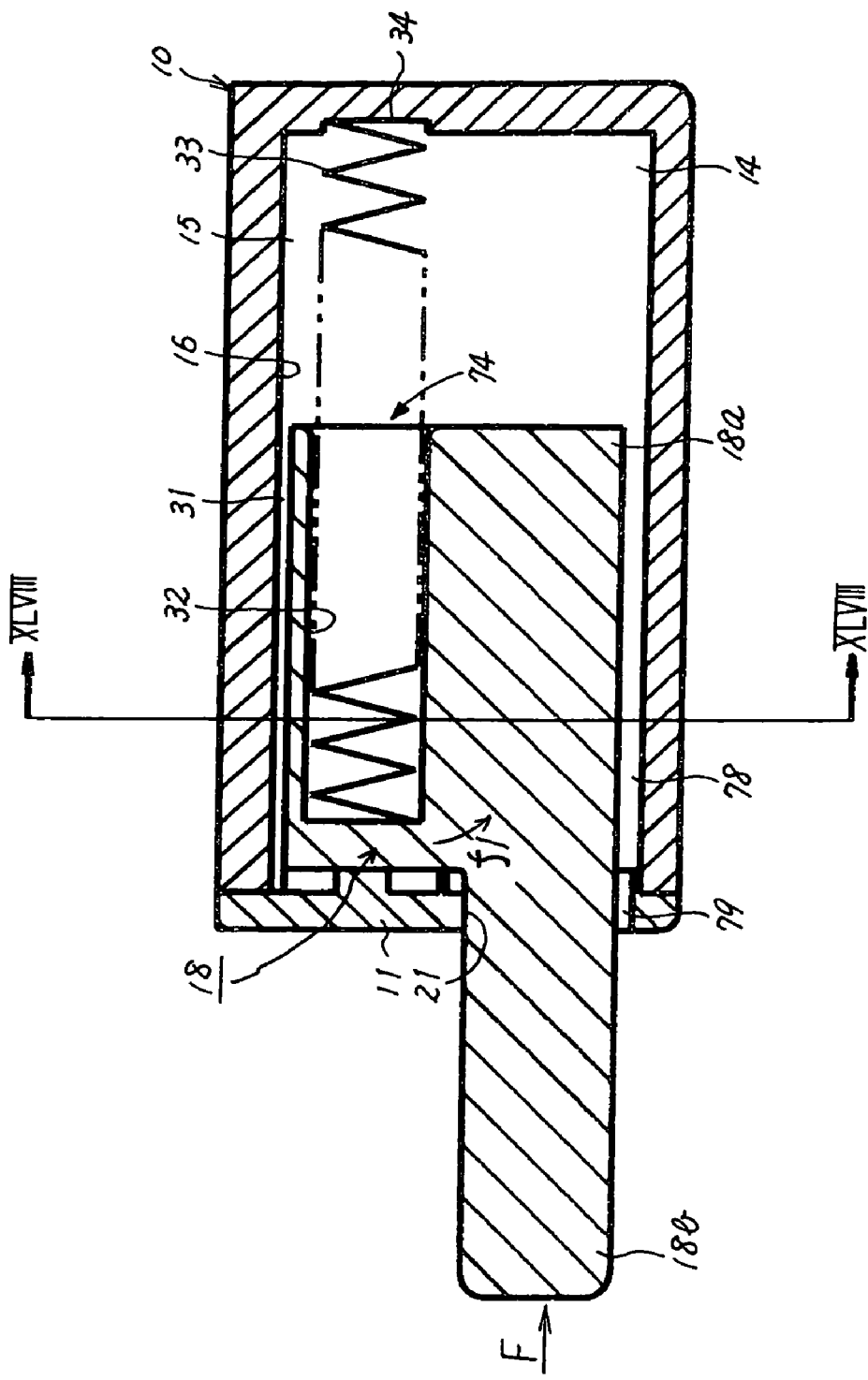
FIG. 47 is a sectional view of the fourteenth embodiment.
Figure 48:
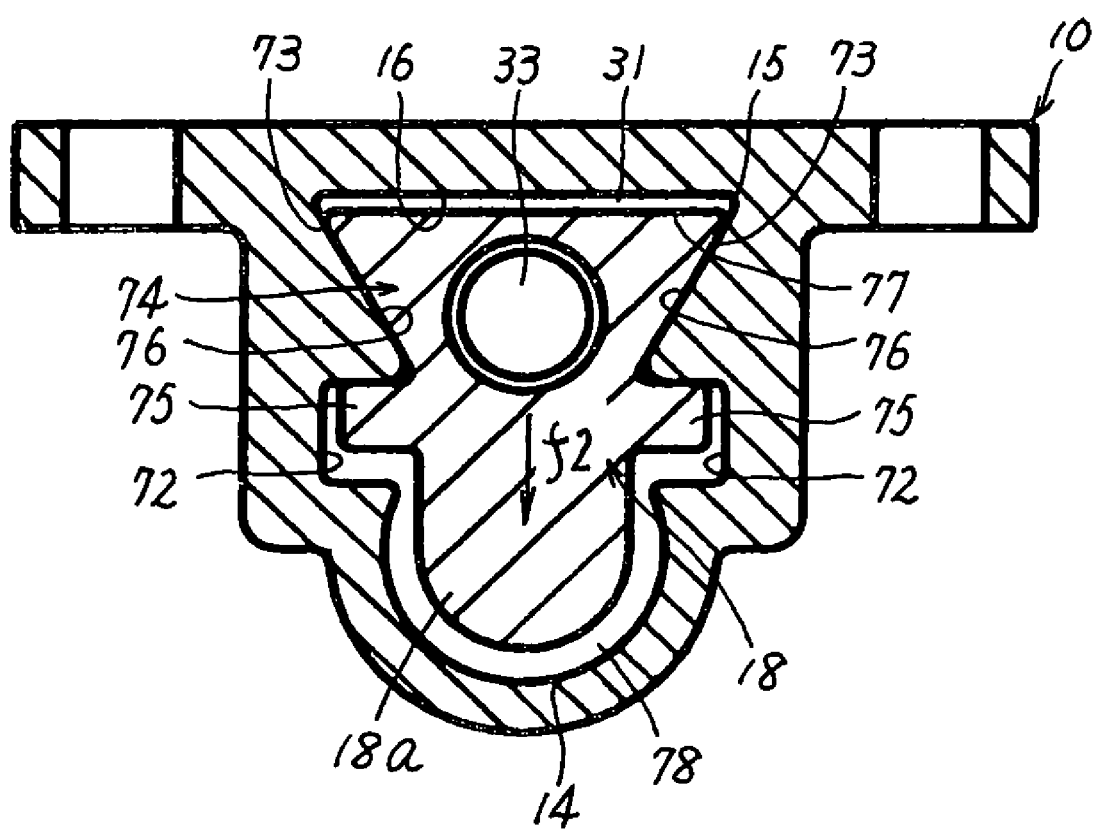
FIG. 48 is a sectional view through section XLVIII-XLVIII of FIG. 47.

When the slider 18 is inserted in the casing body 10 in the foregoing manner, in the positional relationship shown in FIGS. 47 and 48, the tapering faces 76 of the slider 18 are positioned opposite to the tapering faces 73 formed in the casing body 10. In this position, the top face 77 of the damping portion 74 face the ceiling face 16 of the damping groove 15.

When the damping portion 74 is fitted into the damping groove 15 such that the tapering faces 76 and the tapering faces 73 are in contact with each other, a space 31 is created between the top face 77 of the damping portion 74 and the ceiling face 16 formed in the damping groove 15.

The cylindrical portion 14 has an inner lower arc-shaped portion, and the lower portion of the coupling portion 18a is formed in an arc shape corresponding to the inner shape of the cylindrical portion 14. Note that when the slider 18 is inserted into the casing body 10 as described above, a space 78 is formed between the coupling portion 18a and the lower portion of the cylindrical portion 14.

Because the damping portion 74 is eccentric with respect to the shaft portion 18b, a force F in the axial direction shown in FIG. 47 applied to the shaft portion 18b is exerted as a deflection load on the damping portion 74. That is, the damping portion 74 is affected by a deflection load in the direction f1 of which support is on the contact point between the guiding grooves 72 and the projecting strips 75 situated at the end opposite to the shaft portion 18b.

Because of the deflection load in the direction f1, the damping portion 74 is slightly tilted about the contact point, and a pushing-down force in the direction f2 shown in FIG. 48 is exerted on the side opposite to the contact point. On the other hand, on the support point side, a pushing-up force in the direction opposite to the direction f2 is exerted. Therefore the pushing-down force presses the tapering faces 76 of the damping portion 74 into the tapering faces 73 of the damping groove 15 on the same principle as in the case of driving in a wedge. This pressing force results in a slide resistance to exert a damping effect on the damping portion 74, that is, the coupling portion 18a.

Further, as shown in FIG. 47, the damping portion 74 has a spring-receiving hole 32 formed on the axis thereof for supporting a spring 33. The spring 33 is inserted from one end into the spring-receiving hole 32 and supported at the other end by a recess 34 formed in the closed end of the casing body 10.

The spring 33 is provided in this manner, so that the slider 18 is maintained in the position illustrated in FIG. 47 when being in the normal state. Specifically, in this normal position, the coupling portion 18a and the damping portion 74 are up against the cap 11, and the shaft portion 18b protrudes outward from the shaft hole 21 formed in the cap 11.

Figure 49:
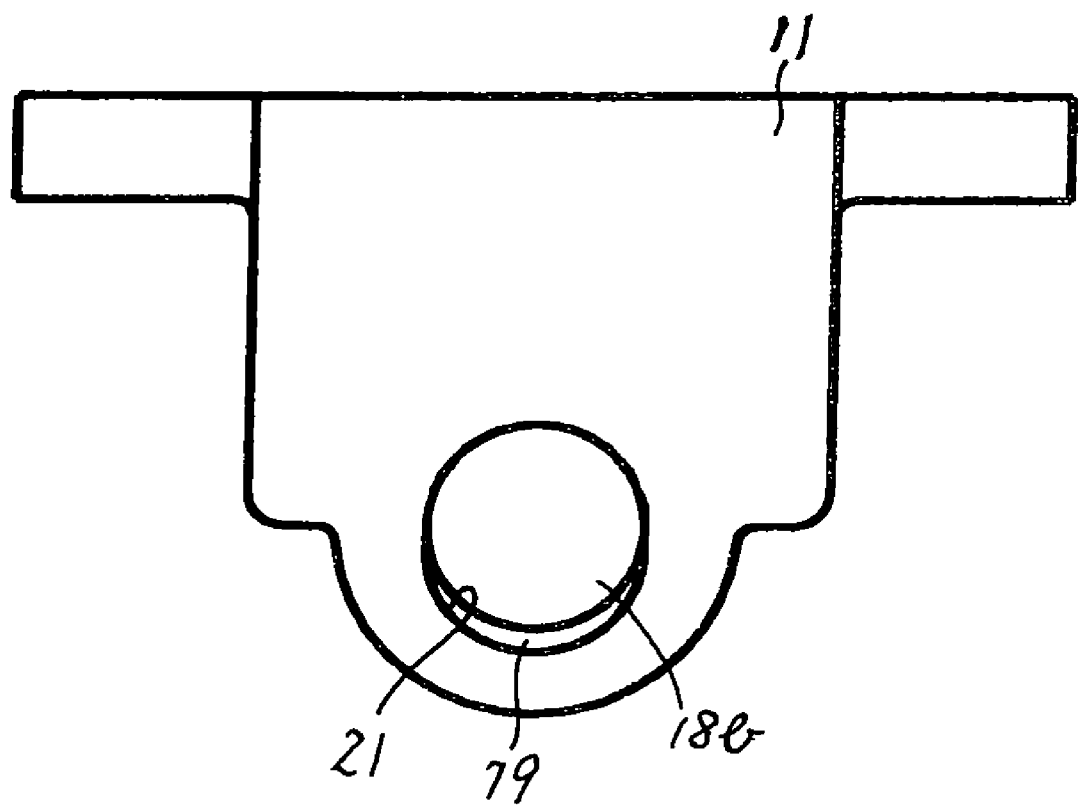
FIG. 49 is a diagram of FIG. 47 when viewed from the cap.

As is seen clearly from FIG. 49, the shaft hole 21 is opened in an oval shape, whereby a clearance 79 is ensured in order for the perfectly circular cross-section shaft portion 18 to move downward in a direction perpendicular to the axis. The clearance 79 makes it possible to tilt the entire slider 18 in the axis direction as described above when the force acts on the shaft portion 18b.

In the assembling process for the linear damper of the fourteenth embodiment as described above, first, grease is applied to the inner surface of the casing body 10, and then the slider 18 is inserted into the casing body 10. This pre-application of grease permits a somewhat sliding movement of the slider 18.

If grease is not applied, a high friction is produced between the slider 18 and the casing body 10 to make a smooth sliding movement of the slider 18 impossible. If the slider 18 is not able to slide, it is impossible to exert a damper effect. This can be easily understood if the situation where the tapering faces 76 of the damping portion 74 are tightly engaged into the tapering faces 73 of the damping groove 15 is assumed.

The formation of the spring-receiving hole 32 on the axis of the damping portion 74 aims to prevent the spring force of the spring 33 from acting on the center of the damping portion 74 so as to tilt the damping portion 74 in the normal position. However, the spring-receiving hole 32 is not necessarily required to be formed on the axis of the damping portion 74. Essentially, with consideration of a balance of the entire slider 18, a spring-receiving hole needs to be drilled in a position where the damping portion 74 is not tilted in the normal state.

The linear damper according to the fourteenth embodiment is in no need of viscous fluid used in conventional oil dampers. Hence, the linear damper is capable of being used in a place where use of oil is undesirable, for example, in a place where food is handled. This makes it possible to extend the boundaries of environmental condition for use of dampers.

The use of conventional air dampers involves a risk of gas leakage, and the use of conventional oil dampers involves a risk of oil leakage. However, the linear damper in the fourteenth embodiment without use of gas or oil has no risk of gas or oil leakage. That is, a sealing member for preventing such a leakage is unnecessary, leading to cost reduction. Further, because of no use of the sealing member, it is possible to avoid damper effect degradation caused by an adverse effect of the tightening force of the seal.

In addition, a high degree of accuracy of machining for prevention of gas or oil leakage is eliminated, resulting in a further reduction in costs.

Further, because there is no leak of gas or oil, the problem of degradation in damping effect being caused by oil or gas leakage is eliminated.

Still further, according to the fourteenth embodiment in which a damping force is produced by pressing the damping portion against the damping groove, it is possible to improve response as compared with the case of using a gas of high compression, such as an air damper.

In short, the linear damper described in the fourteenth embodiment is the first of its type, i.e. a newly-developed damper, operated without the use of either oil or gas, and moreover capable of ensuring the expected damping force, which represents a milestone.

In the fourteenth embodiment, the damping groove 15 is provided in the casing body 10 and the damping portion is provided in the slider 18. However, a damping portion may be provided in the casing body 10 and a damping groove may be provided in the slider 18.

Further, the side faces of the damping groove 15 are formed as paired tapering faces 73, but one of the side faces may be formed as a tapering face. Whichever the case, what is required is for the inner width of the damping groove 15 to be gradually tapered in the depth direction or the opening direction thereof. In this case, the shape of the damping portion 74 of the slider 18 must correspond to the shape of the damping groove 15.

FIGS. 50 to 53 illustrate a fifteenth embodiment according to the present invention.

Figure 50:
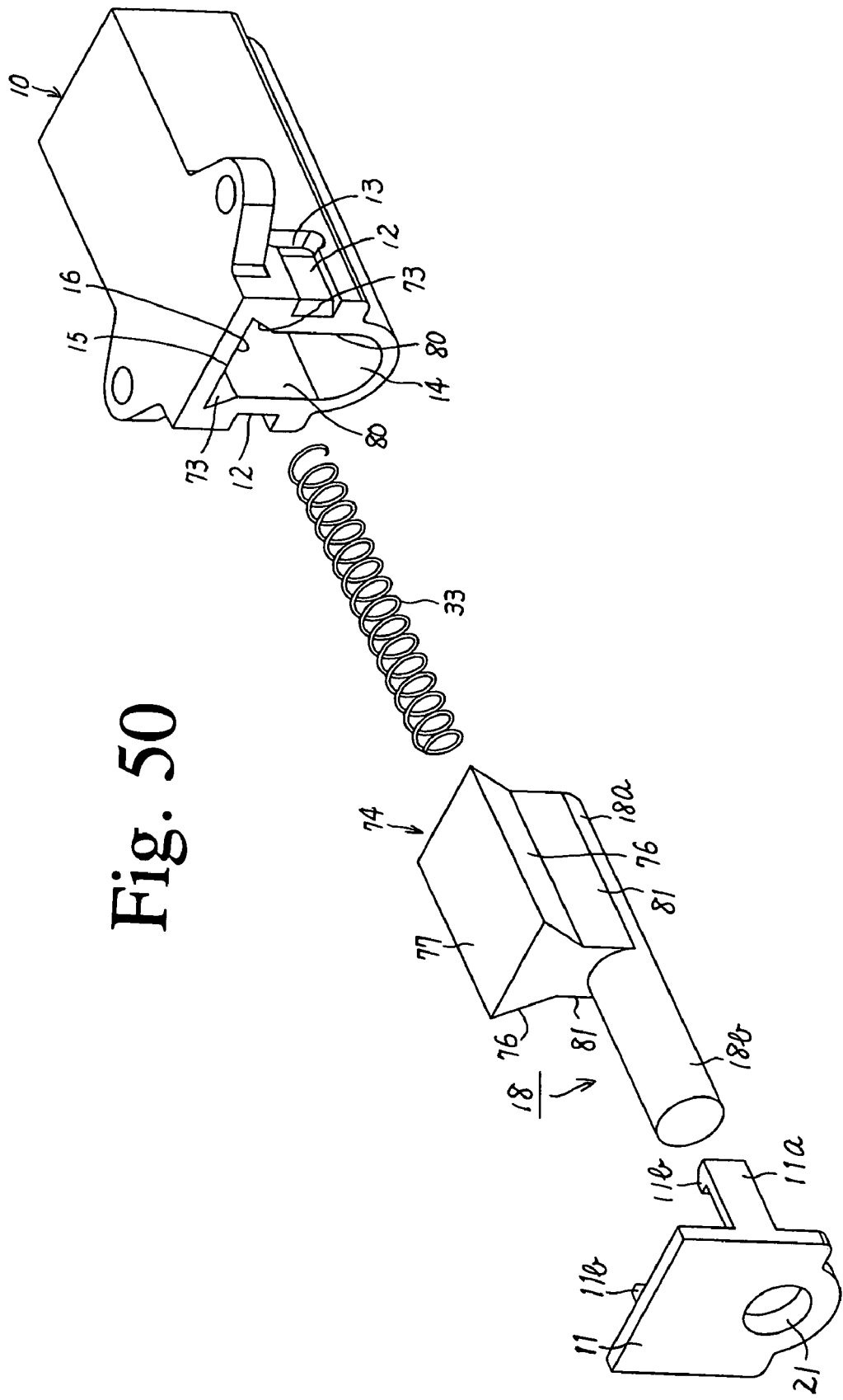
FIG. 50 is an exploded view of a fifteenth embodiment.

As shown in FIG. 50, a casing according to the present invention is constituted of a cylindrical-shaped casing body 10 having a closed end and an open end, and a cap 11 to cover the open end of the casing body 10.

The cap 11 forming part of the casing has a pair of hooks 11a extending from the side faces of the cap 11. A pallet 11b is formed at the leading end of each hook 11a.

The casing body 10 has, correspondingly, a pair of grooves 12 formed on both sides of the opening thereof. Each of the hooks 11a snugly fits into the corresponding groove 12 when the cap 11 is fitted on the casing body 10. The groove 12 has an engaging recess 13 formed for receiving the pallet 11b when the hook 11a is snugly fitted into the groove 12. The pallets 11b of the hooks 11a are respectively fitted into the engaging recesses 13 in this manner in order to prevent the cap 11 from disjoining from the opening of the casing body 10.

As is seen clearly from FIG. 50, the casing body 10 has a cylindrical portion 14 and a damping groove 15. The cylindrical portion 14 and the damping groove 15 have the axes extending parallel to each other but the axis of the damping groove 15 is eccentric with respect to the cylindrical portion 14. The cylindrical portion 14 and the damping groove 15 are continuous with each other with paired guiding portions 80 in between.

The cylindrical portion 14 has an arc-shaped inner bottom portion formed opposite the damping groove 15. The damping groove 15 has a flat ceiling face 16 opposing the cylindrical portion 14 and side faces formed as paired tapering faces 73 to constitute a so-called dovetail groove. The two tapering faces 73 are inclined so that the space between the faces 73 gradually tapers toward the cylindrical portion 14, i.e. the opening of the damping groove 15.

The guiding portions 80 between the cylindrical portion 14 and the damping groove 15 extend parallel to each other with a spacing approximately equal to the width of the opening of the damping portion 15.

A slider 18 is inserted into the casing body 10 with allowance for the sliding movement. The slider 18 includes a coupling portion 18a, a shaft portion 18b, a damping portion 74 and paired flat portions 81 provided between the coupling portion 18a and the damping portion 74.

The coupling portion 18a and the shaft portion 18b are formed integrally on the same axis and combined to form the working portion of the present invention. The coupling portion 18a is continuous with the damping portion 74. The axes of the coupling portion 18a and the damping portion 74 are parallel to each other but the damping portion 74 is eccentric with respect to the coupling portion 18a and shaft portion 18b.

The damping portion 74 has the side faces formed as paired tapering faces 76 corresponding to the tapering faces 73 of the damping groove 15, and a top face 77 facing the ceiling face 16.

The coupling portion 18a of the slider 18 is fitted into the cylindrical portion 14, the flat portions 81 are fitted between the guiding portions 80 and the damping portion 74 is fitted into the damping groove 15. At this point, the relative relationship between each component of the slider 18 and the casing body 10 is as follows.

Figure 51:
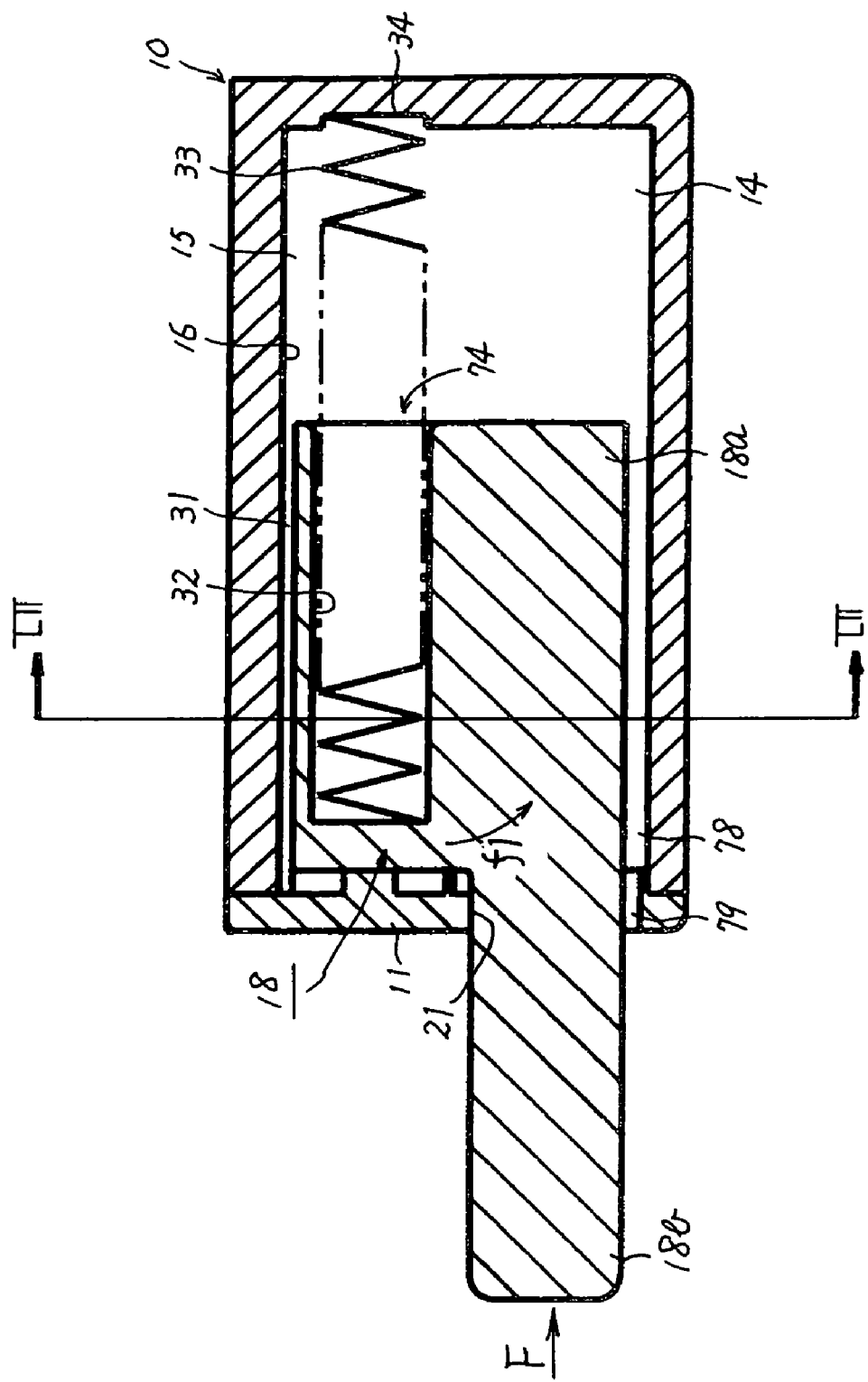
FIG. 51 is a sectional view of the fifteenth embodiment.
Figure 52:
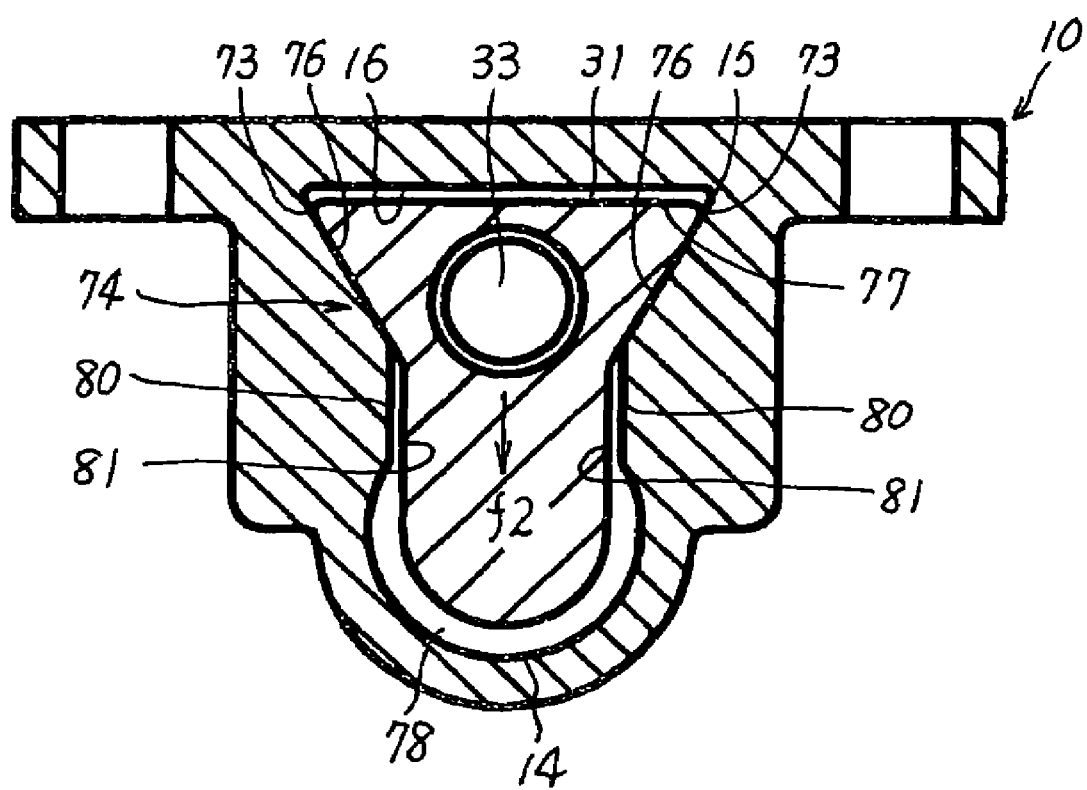
FIG. 52 is a sectional view through section LII-LII of FIG. 51.

When the slider 18 is inserted into the casing body 10 in this manner, in the positional relationship illustrated in FIGS. 51 and 52, the slider 18 brings, by the action of its own weight, the tapering faces 76 into contact with the tapering faces 73 of the casing body 10. At this point, the top face 77 of the damping portion 74 faces the ceiling face 16 of the damping groove 15.

When the damping portion 74 is fitted in the damping groove 15 so that the tapering faces 76 and 73 are in contact with each other, a space 31 is formed between the tope face 77 of the damping portion 74 and the ceiling face 16 formed in the damping groove 15.

The lower part of the coupling portion 18a is formed in an arc shape corresponding to the arc shape of the inner, lower part of the cylindrical portion 14. Note that when the slider 18 is inserted into the casing body 10, a space 78 is formed between the coupling portion 18a and the lower part of the cylindrical portion 14.

When a force F in the axis direction shown in FIG. 51 acts on the shaft portion 18b, because the damping portion 74 is eccentric with respect to the shaft portion 18b, the force F is exerted as a deflection load on the damping portion 74. That is, the damping portion 74 is affected by a deflection load in the direction f1 of which support is on the contact point between the ceiling face 16 and the top face 77 situated at the end opposite to the shaft portion 18b.

Because of the deflection load in the direction f1, the damping portion 74 is slightly tilted about the contact point, and a pushing-down force in the direction f2 shown in FIG. 52 is exerted on the side opposite to the contact point. On the other hand, on the support point side, a pushing-up force in the direction opposite to the direction f2 is exerted. Then, the pushing-down force presses the tapering faces 76 of the damping portion 74 into the tapering faces 73 of the damping groove 15 on the same principle as in the case of driving in a wedge. This pressing force results in a slide resistance to exert a damping effect on the damping portion 74, that is, the coupling portion 18a.

Further, as shown in FIG. 51, the damping portion 74 has a spring-receiving hole 32 formed on the axis thereof for supporting a spring 33. The spring 33 is inserted from one end into the spring-receiving hole 32 and supported at the other end by a recess 34 formed in the closed end of the casing body 10.

Because of this insertion of the spring 33, the slider 18 is maintained in the position illustrated in FIG. 47 when being in the normal state. Specifically, in this normal position, the coupling portion 18a and the damping portion 74 are up against the cap 11, and the shaft portion 18b protrudes outward from the shaft hole 21 formed in the cap 11.

Figure 53:
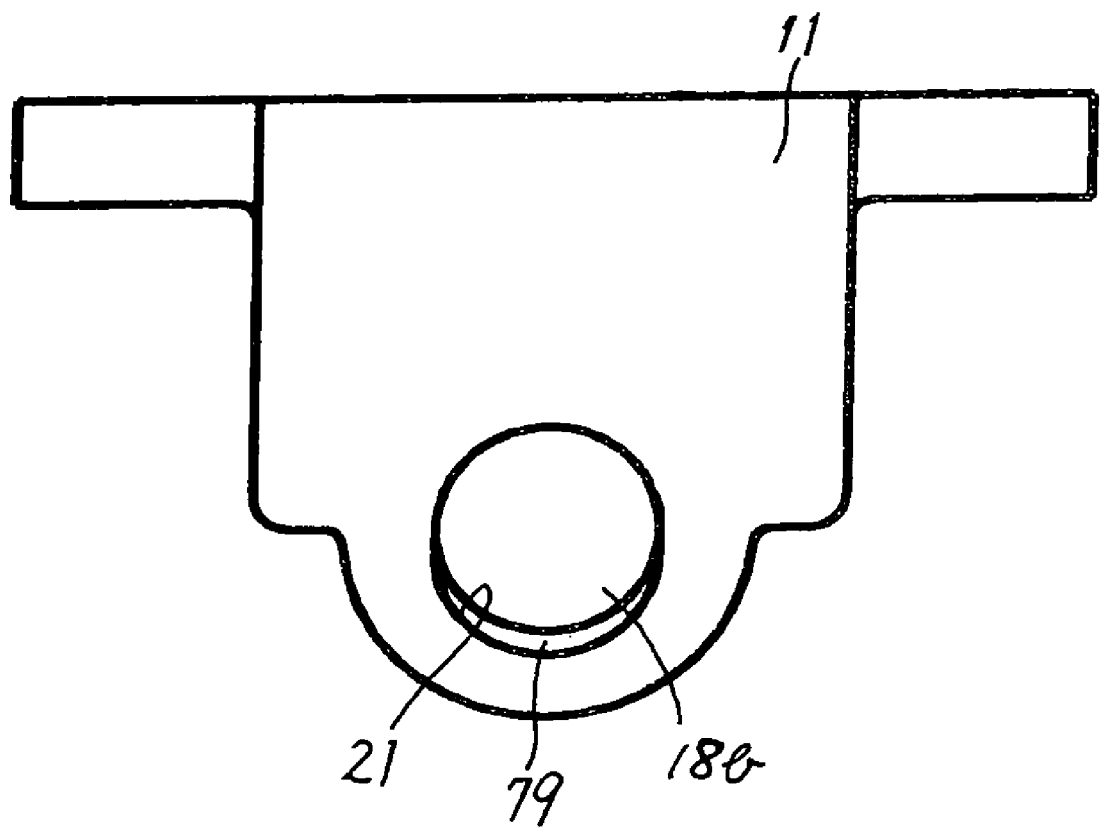
FIG. 53 is a diagram of FIG. 51 when viewed from the cap.

As is seen clearly from FIG. 53, the shaft hole 21 is formed in an oval shape, whereby a clearance 79 is ensured in order for the perfectly circular cross-section shaft portion 18b to move downward in the direction perpendicular to the axis. The clearance 79 makes it possible to tilt the entire slider 18 in the axis direction as described in the foregoing when the force acts on the shaft portion 18*b*.

In the assembling process for the linear damper of the fifteenth embodiment as described above, first, grease is applied to the inner surface of the casing body 10, and then the slider 18 is inserted into the casing body 10. This pre-coating of grease permits a somewhat sliding movement of the slider 18.

If grease is not applied, a high friction is produced between the slider 18 and the casing body 10 to make a smooth sliding movement of the slider 18 impossible. If the slider 18 is not able to slide, it is impossible to exert a damper effect. This can be easily understood if the situation where the tapering faces 76 of the damping portion 74 are tightly engaged into the tapering faces 73 of the damping groove 15 is assumed.

The formation of the spring-receiving hole 32 on the axis of the damping portion 74 aims to prevent the spring force of the spring 33 from acting on the center of the damping portion 74 so as to tilt the damping portion 74 in the normal position. However, the spring-receiving hole 32 is not necessarily required to be formed on the axis of the damping portion 74. Essentially, with consideration of a balance of the entire slider 18, a spring-receiving hole needs to be drilled in a position where tilting of the damping portion 74 is not caused in the normal state.

According to the fifteenth embodiment, it is possible to yield the same effects as those in the fourteenth embodiment.

Further, in the fifteenth embodiment the side faces of the damping groove 15 are formed as paired tapering faces 73, but only one of the side faces may be formed as a tapering face. Whichever the case, what is required is for the inner width of the damping groove 15 to be gradually tapered in the depth direction or the opening direction thereof. In this case, the shape of the damping portion 74 must correspond to the shape of the damping groove 15.

Figure 54:
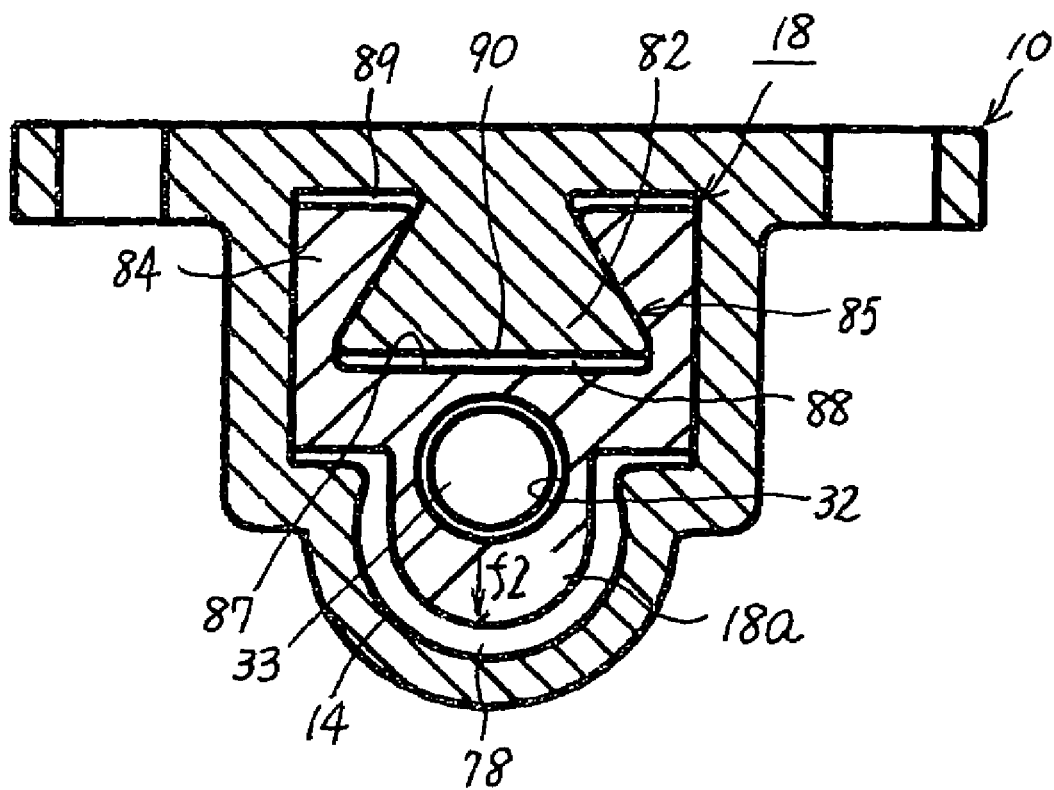
FIG. 54 is a sectional view of a sixteenth embodiment.
Figure 55:
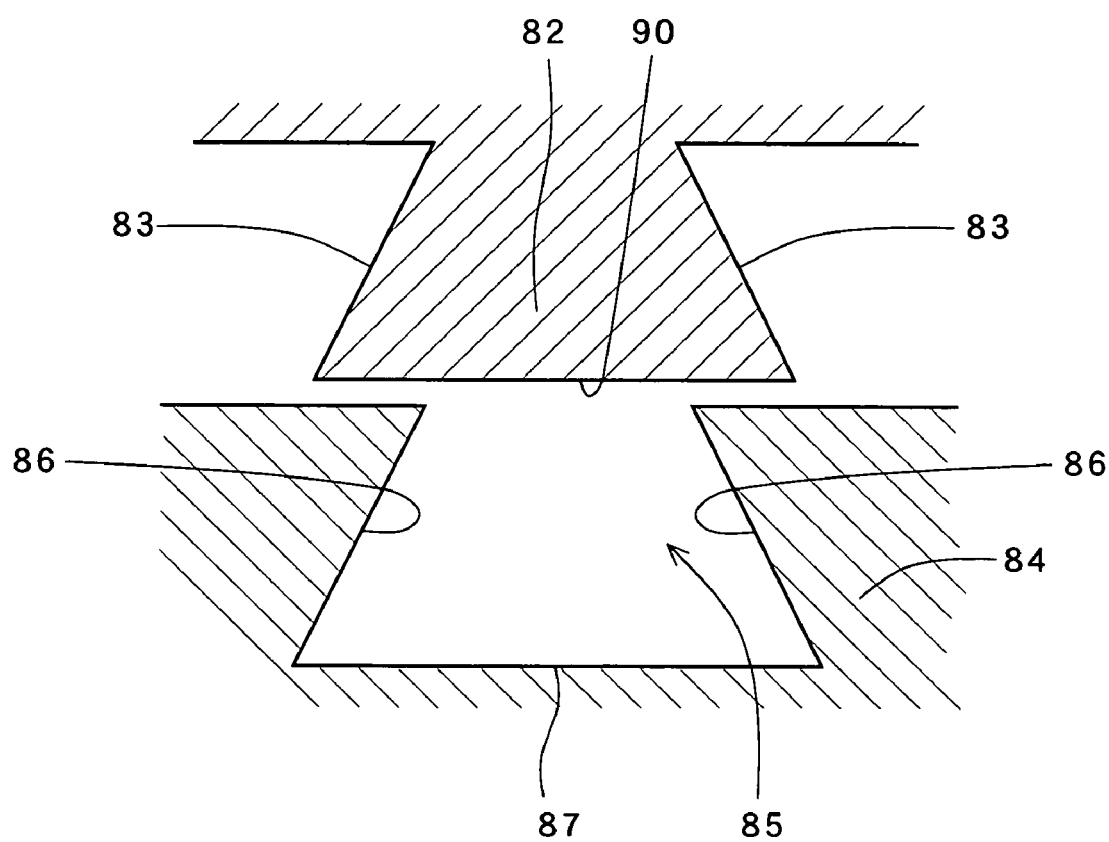
FIG. 55 is a diagram illustrating a damping portion and a damping groove in the sixteenth embodiment.
Figure 56:
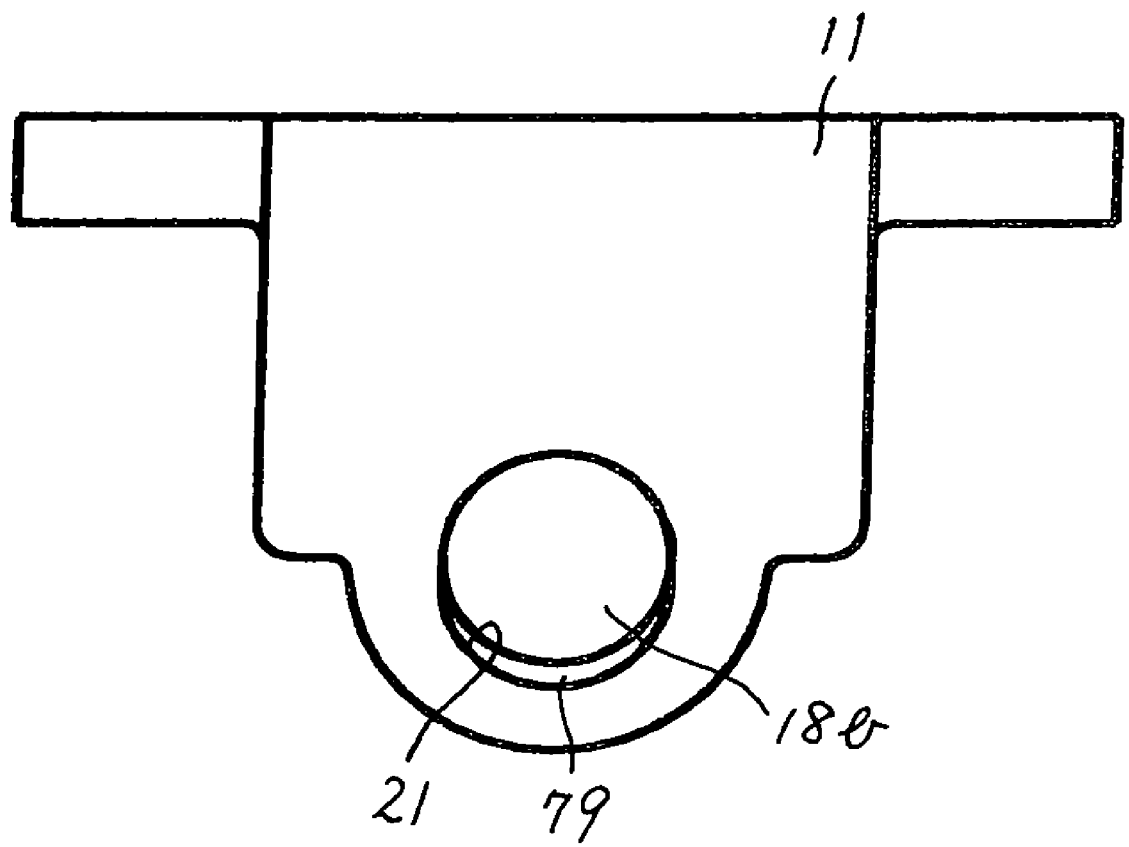
FIG. 56 is a diagram of the sixteenth embodiment when viewed from the cap.

FIG. 54 to FIG. 56 illustrate a sixteenth embodiment according to the present invention.

To form a casing of the present invention, in the sixteenth embodiment, a cylindrical-shaped casing body 10 having one closed end is covered with a cap 11 shown in FIG. 56.

As in the case of the fourteenth embodiment, the casing body 10 is formed in a cylindrical shape and the cap 11 is anchored to the casing body 10.

As illustrated in FIG. 54, the casing body 10 has a cylindrical portion 14 extending in the axis direction, and a damping portion 82 mounted on the ceiling face opposing the cylindrical portion 14. The axes of the cylindrical portion 14 and the damping portion 82 are parallel to each other, but the axis of the damping portion 82 is eccentric with respect to the cylindrical portion 14. The inner face of the bottom portion of the cylindrical portion 14 is opposite the damping portion 82 and formed in an arc shape.

As is seen clearly from FIG. 54, the damping portion 82 is formed of a projecting portion projecting downward from the ceiling of the casing body 10. As shown in FIG. 55, the side faces of the damping portion 82 are formed as paired tapering faces 83 that diverge downward to gradually open up the distance between the tapering faces 83 in the direction of the cylindrical portion 14 when the damping portion 82 is viewed in section.

A slider 18 is inserted into the casing body 10 with allowance for the sliding movement. The slider 18 includes a coupling portion 18*a*, a shaft portion 18*b* and a damping grooved portion 84.

The coupling portion 18*a* and the shaft 18*b* are integrally formed on the same axis and combined to form the working portion of the present invention.

The coupling portion 18*a* is continuous with the damping grooved portion 84. The axes of the coupling portion 18*a* and the damping grooved portion 84 are parallel to each other but the damping grooved portion 84 is eccentric with respect to the coupling portion 18*a* and shaft portion 18*b*.

As illustrated in FIG. 55, a damping groove 85 is formed in the damping grooved portion 84 in a sectional shape corresponding to that of the damping portion 82. That is, the side faces of the damping groove 85 are formed as paired tapering faces 86 that are inclined to constitute a so-called dovetail groove of which the inner width gradually tapers toward the opening of the damping groove 85, when the damping groove 85 is viewed in section.

When the damping portion 82 is fitted into the damping groove 85 of the slider 18, a slight space 88 is formed between the bottom face 87 of the damping groove 85 and the opposing face 90 of the damping portion 82 as shown in FIG. 55. A space 89 is also formed between the slider 18 and the ceiling face of the casing body 10. In consequent, the slider 18 is capable of moving within the range of the spaces 88 and 89.

The coupling portion 18*a* of the slider 18 is fitted into the cylindrical portion 14, and the damping groove 85 is fitted over the damping portion 82. At this point, the relative relationship between each component of the slider 18 and the casing body 10 is as follows.

When the slider 18 is inserted into the casing body 10 in this manner, in the positional relationship illustrated in FIG. 54, the slider 18 brings, by its own weight, the tapering faces 86 into contact with the tapering faces 83 of the casing body 10. At this point, the bottom face 87 of the damping groove 85 and the opposing face 90 of the damping portion 82 face each other, and the slider 18 and the ceiling face of the casing body 10 face each other.

When the tapering faces 83 are in contact with the tapering faces 86 after the damping portion 82 is fitted into the damping groove 85, the space 88 is created between the bottom face 87 of the damping groove 85 and the opposing face 90 of the damping portion 82, and the space 89 is created between the slider 18 and the ceiling face of the casing body 10.

The lower part of the coupling portion 18*a* is formed in an arc shape corresponding to the arc shape of the inner, lower part of the cylindrical portion 14. Note that in the casing body 10 with the slider 18 inserted as in the foregoing manner, a space 78 is formed between the coupling portion 18*a* and the lower part of the cylindrical portion 14.

When a force F in the axis direction is applied to the shaft portion 18*b*, for the reason that the damping portion 82 is eccentric with respect to the shaft portion 18*b*, the force F is exerted as a deflection load on the damping portion 82. That is, because of the deflection load, the slider 18 is slightly tilted about the contact point between the end of the bottom face 87 of the damping groove 85 and the end of the opposing face 90 of the damping portion 80.

If the slider 18 is slightly tilted by the deflection load, a pushing-down force in the direction f2 shown in FIG. 54 is exerted on the damping groove 85 on the side opposite to the contact point. On the other hand, on the contact point side, a pushing-up force in the direction opposite to the direction f2 is exerted.

If the pushing-down force acts on the damping groove 85, the contact force between the tapering faces 83 of the damping portion 82 and the tapering faces 86 of the damping groove 85 increased in magnitude, so that this contact force results in a slide resistance of the slider 18. Accordingly, the slide resistance serves as a braking force to exert a damping force.

Further, the slider 18 has a spring-receiving hole 32 formed on the axis thereof and around the border between the coupling portion 18*b* and the damping grooved portion 84, continuously connected to the portion 18*b*, for supporting a spring 33. The spring 33 is inserted from one end into the spring-receiving hole 32 and supported at the other end by the recess (not shown) formed in the closed end of the casing body 10.

Because of this insertion of the spring 33, the slider 18 is maintained in the normal position. Specifically, in this normal position, the coupling portion 18*a* and the damping portion 82 are up against the cap 11, and the shaft portion 18*b* protrudes outward from the shaft hole 21 formed in the cap 11.

As is seen clearly from FIG. 56, the shaft hole 21 is formed in an oval shape, whereby a clearance 79 is ensured in order for the perfectly circular cross-section shaft portion 18*b* to move downward in the direction perpendicular to the axis. The clearance 79 makes it possible to tilt the entire slider 18 in the axis direction as described in the foregoing when the force acts on the shaft portion 18*b*.

In the assembling process for the linear damper of the sixteenth embodiment as described above, first, grease is applied to the inner surface of the casing body 10, and then the slider 18 is inserted thereto. This pre-coating of grease permits a somewhat sliding movement of the slider 18.

If grease is not applied, an extremely high friction is produced between the slider 18 and the casing body 10 to make a smooth sliding movement of the slider 18 impossible. If the slider 18 is not able to slide, it is impossible to exert a damper effect. This can be easily understood if the situation where the tapering faces 83 of the damping portion 82 are tightly engaged into the tapering faces 86 of the damping groove 85 is assumed.

The formation of the spring-receiving hole 32 on the axis of the slider 18 aims to prevent the spring force of the spring 33 from acting on the center of the slider 18 so as to tilt the damping groove 85 in the normal position. However, the spring-receiving hole 32 is not necessarily required to be formed on the axis of the slider 18. Essentially, with consideration of a balance of the entire slider 18, a spring-receiving hole needs to be drilled in a position where tilting of the damping groove 85 is not caused in the normal state.

According to the sixteenth embodiment, the same effects as those in the fourteenth embodiment are expected.

In the sixteenth embodiment, the side faces of the damping groove 85 are formed as the paired tapering faces 86. However, one of the side faces may be a tapering face and the other may be a straight face, for example. Whichever the case, it is necessary to gradually lessen the inner width of the damping groove 85 in the opening direction. Note that in this case, the shape of the corresponding damping portion 82 must be changed to match the shape of the damping groove 85.

In the fourteenth, fifteenth and sixteenth embodiments, the slider 18 is made of a high-rigid metal, but may be made of a resin having somewhat elasticity. In the case of employing the resin, the entire slider 18 becomes flexible to a certain extent. If the entire slider can bend to a certain extent, when slider 18 is pressed against the casing body 10, the slider 18 comes into contact with the damping groove 15 while being bending. Hence, it is possible to increase the contact area between the slider 18 and the damping groove 15 as compared with the structure in which the slider 18 is simply tilted about one point. With increasing the contact area between the slider 18 and the damping groove 15, the damping effect exerted is higher.

In the first to sixteenth embodiments, the working portion is constituted of a shaft, but not necessarily of a shaft as long as the working portion is capable of exerting the moving force directly to the slider. If, for example, a pin is formed on an apparatus or the like subjected to a damping control for pressing the slider, the moving force can affect the slider without using the shaft. In this case, the coupling portion serves as the working portion.

What is claimed is:

1. A linear damper, comprising:
    a casing;
    a slider inserted into the casing and moving relatively to the casing, and having a working portion;
    a damping groove provided in one of the casing and the slider, and having tapering faces formed on the side faces of the damping groove and inclined to taper an inner width of the damping groove in one of a depth direction and an opening direction;
    a damping portion provided in the other of the casing and the slider to be fitted in the damping groove with allowance for a sliding movement, and having tapering faces facing the tapering faces of the damping groove;
    a conversion mechanism for producing a force pressing the damping portion in a direction tapering the inner width of the damping groove when a force is applied to the working portion to move the slider in the axis direction; and
    wherein said damper portion is structured and arranged to be engaged in said damping groove when said damping portion is pressed in a direction of the tapering inner width of said damping groove to provide a wedge effect.

2. A linear damper according to claim 1,
    wherein the slider includes a first moving member provided with the working portion, and a second moving member formed independently of the first moving member and provided with one of the damping groove and the damping portion; and
    wherein the conversion mechanism moves the second moving member in conjunction with a movement of the first moving member in the axis direction, to produce the force pressing the damping portion in the direction tapering the inner width of the damping groove.

3. A linear damper according to claim 2,
    wherein the second moving member is provided movably in the depth direction of the damping groove; and
    wherein the conversion mechanism includes inclined faces provided in one of the first and second moving members, and contact portions provided in the other moving member to come into contact with the individual inclined faces, and exerts a moving force of the first moving member on the second moving member via the inclined faces, so that when the moving force of the first moving member is exerted on the second moving member, the second moving member is moved in the depth direction of the damping groove to press the damping portion in the direction tapering the inner width of the damping groove.

4. A linear damper according to claim 2, further comprising:
    in addition to the conversion mechanism, a release mechanism provided for removing the force pressing the damping portion in the direction tapering the inner width of the damping groove, and including inclined faces provided in at least one of the first and second moving members, and contact portions provided in the other moving member to come into contact with the individual inclined faces, wherein the inclined face of the release mechanism is inclined in the same direction as that of the inclined face of the conversion mechanism.

5. A linear damper according to claim 4, wherein when the first moving member is moved in one of forward and backward directions of the axis of the first moving member, the conversion mechanism moves the second moving member in the depth direction of the damping groove to produce the force pressing the damping portion in the direction tapering the inner width of the damping groove, and when the first moving member is moved in the other direction of the forward and backward directions of the axis, the release mechanism removes the force pressing the damping portion in the direction tapering the inner width of the damping groove, further comprising a spring for exerting a spring force in a direction removing the pressing force on the first moving member.

6. A linear damper according to claim 2, wherein the second moving members are provided in plural around the first moving member, wherein the inclined face is provided in one of the first and second moving member, and the contact portion is provided in the other moving member to come into contact with the inclined face, the inclined face provided in one of the first and second moving members and the contact portion provided in the other moving member facing each other.

7. A linear damper according to claim 1, wherein the slider is integrally formed by combining the working portion and one of the damping portion and the damping groove, and the axis of the working portion is eccentric to the axis of the one of the damping portion and the damping groove.

8. A linear damper according to claim 7, wherein the damping groove provided in the casing is shaped in form of a dovetail groove, and the damping portion provided in the slider is fitted into the dovetail groove with allowance for a sliding movement.

9. A linear damper according to claim 8, wherein the working portion of the slider has a shaft portion, and the casing has a shaft hole through which the shaft portion passes, and a clearance for allowing the shaft portion to move in a direction opposite to the damping portion.

10. A linear damper according to claim 8, wherein when the slider is moved one of forward and backward directions of the axis of the slider, the conversion mechanism exerts the force pressing the damping portion in the direction tapering the inner width of the damping groove, further comprising a spring provided for exerting a spring force in a direction returning the damping portion to a normal position on the damping portion.

* * * * *